United States Patent
Shiroishi

(10) Patent No.: US 9,105,279 B2
(45) Date of Patent: Aug. 11, 2015

(54) MICROWAVE ASSISTED MAGNETIC RECORDING AND MAGNETIC STORAGE DEVICE

(71) Applicant: Hitachi, Ltd., Tokyo (JP)

(72) Inventor: Yoshihiro Shiroishi, Hachioji (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/920,267

(22) Filed: Jun. 18, 2013

(65) Prior Publication Data

US 2013/0335847 A1    Dec. 19, 2013

(30) Foreign Application Priority Data

Jun. 18, 2012  (JP) .................................. 2012-137210

(51) Int. Cl.
*G11B 5/02* (2006.01)
*G11B 5/60* (2006.01)
*G11B 5/00* (2006.01)

(52) U.S. Cl.
CPC *G11B 5/02* (2013.01); *G11B 5/607* (2013.01); *G11B 2005/001* (2013.01); *G11B 2005/0024* (2013.01)

(58) Field of Classification Search
None
See application file for complete search history.

(56) References Cited

U.S. PATENT DOCUMENTS

| 7,095,577 B1* | 8/2006 | Codilian et al. ................. 360/46 |
| 7,616,412 B2 | 11/2009 | Zhu et al. |
| 8,588,037 B2* | 11/2013 | Yamada et al. ............. 369/13.14 |
| 2008/0043359 A1 | 2/2008 | Chung et al. |
| 2009/0021860 A1 | 1/2009 | Fukushinma |
| 2009/0213486 A1* | 8/2009 | Takahashi ........................ 360/75 |
| 2011/0128648 A1* | 6/2011 | Ezawa et al. .................... 360/75 |
| 2011/0216436 A1 | 9/2011 | Igarashi et al. |

FOREIGN PATENT DOCUMENTS

| JP | 2006-73176 | 3/2006 |
| JP | 2008-47277 | 2/2008 |
| JP | 2010-231866 | 10/2010 |
| JP | 2011-113621 | 6/2011 |
| WO | WO 2010/053187 A1 | 11/2009 |

* cited by examiner

*Primary Examiner* — Daniell L Negron
(74) *Attorney, Agent, or Firm* — Baker Botts L.L.P.

(57) ABSTRACT

Disclosed is a technique of providing a large-capacity magnetic storage device at high device manufacturing yield while keeping the reliability, the magnetic storage device enabling recording on a perpendicular magnetic recording medium having distribution of characteristics in the circumferential direction as well at high track density of 500 kTPI or more that would be expected from the average characteristics of the medium. A recording condition from is selected for each sector from a parameter table that stores a set of at least two types of recording conditions by a microwave assisted magnetic recording head including a magnetic recording pole and a high-frequency magnetic field oscillator in the magnetic storage device, and information is recorded for each sector based on the condition.

7 Claims, 36 Drawing Sheets

Fig. 7
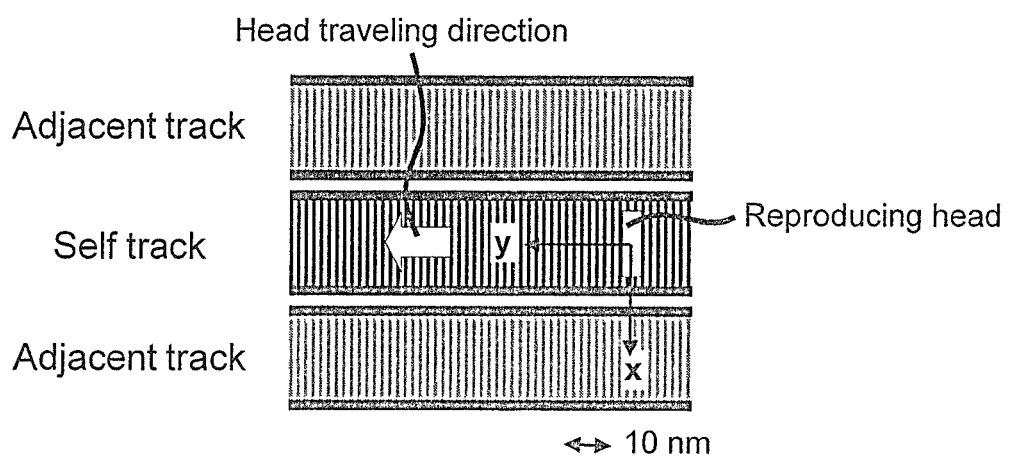
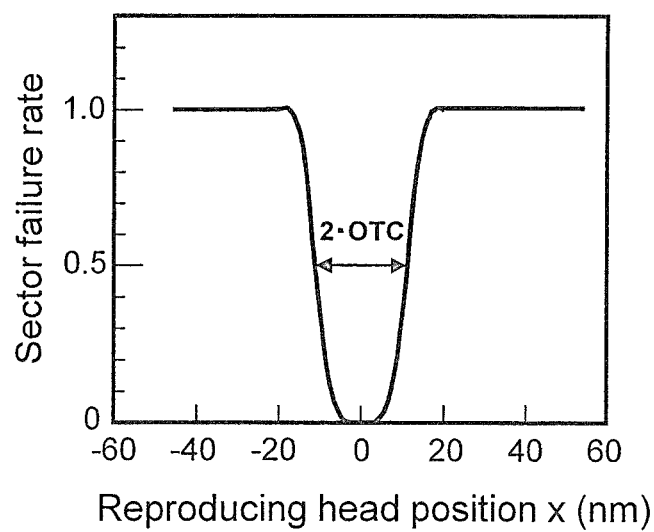

Fig. 12

Table 1

| | $II_{STO}(k,1)$ | $II_{STO}(k,2)$ | ·· | $II_{STO}(k,n)$ | ·· | $II_{STO}(k,N)$ |
|---|---|---|---|---|---|---|
| $II_{WB}(k,1)$ | | | | | | |
| . | | | | | | |
| $II_{WB}(k,m)$ | | | | $II_{WB}(k,m), II_{STO}(k,n)$ | | |
| . | | | | | | |
| $II_{WB}(k,M)$ | | | | | | |

$II_{WB}(m) < II_{WB}(m+1)$
$II_{STO}(n) < II_{STO}(n+1)$
$m=1,2,\cdots,M-1$
$n=1,2,\cdots,N-1$

Fig. 13

Table 2

| Magnetic head $H_k$ | Zone $Z_p$ | Sector $S_j$ | TFC input power | B mode | | A mode | |
|---|---|---|---|---|---|---|---|
| | | | | Bias recording current | STO driving current | Bias recording current | STO driving current |
| $H_k$ | $Z_1$ | $S_1$ | $P_{TFC}(k,1)$ | $BI_{WB}(k,1,1)$ | $BI_{STO}(k,1,1)$ | $AI_{WB}(k,1,1)$ | $AI_{STO}(k,1,1)$ |
| | | $S_2$ | | $BI_{WB}(k,1,2)$ | $BI_{STO}(k,1,2)$ | $AI_{WB}(k,1,2)$ | $AI_{STO}(k,1,2)$ |
| | | . | | . | . | . | . |
| | | $S_N$ | | $BI_{WB}(k,1,N)$ | $BI_{STO}(k,1,N)$ | $AI_{WB}(k,1,N)$ | $AI_{STO}(k,1,N)$ |
| | $Z_2$ | $S_1$ | $P_{TFC}(k,2)$ | $BI_{WB}(k,2,1)$ | $BI_{STO}(k,2,1)$ | $AI_{WB}(k,2,1)$ | $AI_{STO}(k,2,1)$ |
| | | $S_2$ | | $BI_{WB}(k,2,2)$ | $BI_{STO}(k,2,2)$ | $AI_{WB}(k,2,2)$ | $AI_{STO}(k,2,2)$ |
| | | . | | . | . | . | . |
| | | $S_N$ | | $BI_{WB}(k,2,N)$ | $BI_{STO}(k,2,N)$ | $AI_{WB}(k,2,N)$ | $AI_{STO}(k,2,N)$ |
| | . | . | . | . | . | . | . |
| | $Z_P$ | $S_1$ | $P_{TFC}(k,P)$ | $BI_{WB}(k,P,1)$ | $BI_{STO}(k,P,1)$ | $AI_{WB}(k,P,1)$ | $AI_{STO}(k,P,1)$ |
| | | $S_2$ | | $BI_{WB}(k,P,2)$ | $BI_{STO}(k,P,2)$ | $AI_{WB}(k,P,2)$ | $AI_{STO}(k,P,2)$ |
| | | . | | . | . | . | . |
| | | $S_N$ | | $BI_{WB}(k,P,N)$ | $BI_{STO}(k,P,N)$ | $AI_{WB}(k,P,N)$ | $AI_{STO}(k,P,N)$ |

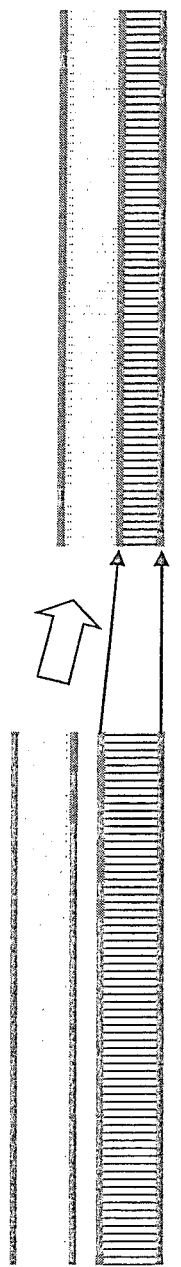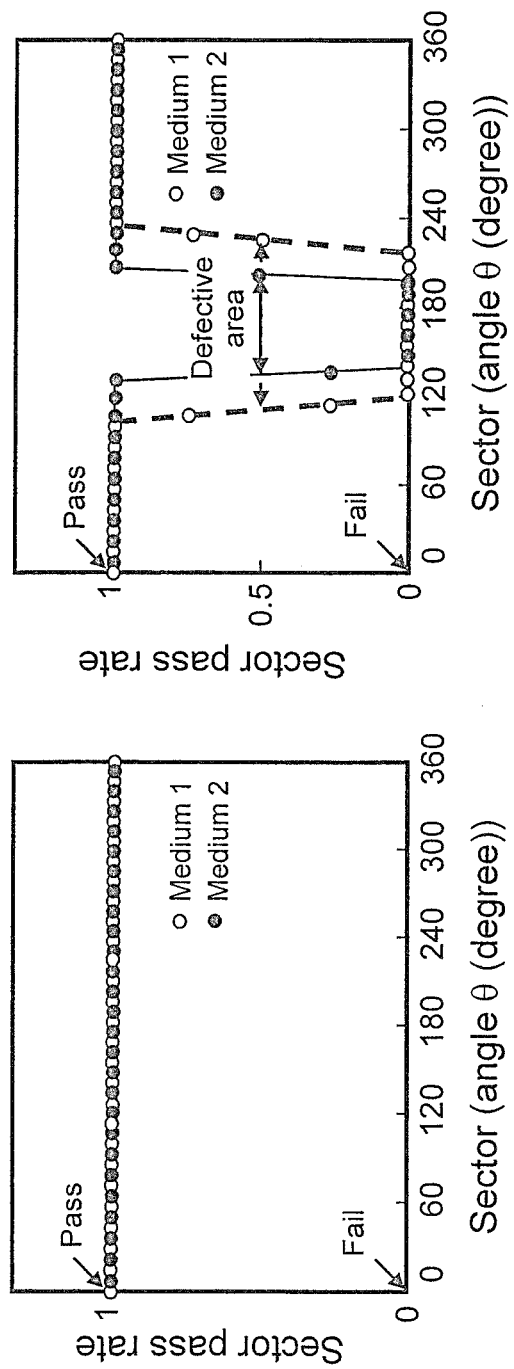
Fig. 14
Fig. 15

Fig. 21

Table 3

| Head $H_k$ | Zone $Z_p$ | Sector $S_j$ | TFC input power | Bias recording current | B mode STO driving current | A mode STO driving current |
|---|---|---|---|---|---|---|
| $H_k$ | $Z_1$ | $S_1$ | $P_{TFC}(k,1)$ | $BI_{WB}(k,1)$ | $BI_{STO}(k,1,1)$ | $AI_{STO}(k,1,1)$ |
| | | $S_2$ | | | $BI_{STO}(k,1,2)$ | $AI_{STO}(k,1,2)$ |
| | | . | | | . | . |
| | | $S_N$ | | | $BI_{STO}(k,1,N)$ | $AI_{STO}(k,1,N)$ |
| | $Z_2$ | $S_1$ | $P_{TFC}(k,2)$ | $BI_{WB}(k,2)$ | $BI_{STO}(k,2,1)$ | $AI_{STO}(k,2,1)$ |
| | | $S_2$ | | | $BI_{STO}(k,2,2)$ | $AI_{STO}(k,2,2)$ |
| | | . | | | . | . |
| | | $S_N$ | | | $BI_{STO}(k,2,N)$ | $AI_{STO}(k,2,N)$ |
| | . | . | . | . | . | . |
| | $Z_P$ | $S_1$ | $P_{TFC}(k,P)$ | $BI_{WB}(k,P)$ | $BI_{STO}(k,P,1)$ | $AI_{STO}(k,P,1)$ |
| | | $S_2$ | | | $BI_{STO}(k,P,2)$ | $AI_{STO}(k,P,2)$ |
| | | . | | | . | . |
| | | $S_N$ | | | $BI_{STO}(k,P,N)$ | $AI_{STO}(k,P,N)$ |

Fig. 26

Table 4

| Head $H_k$ | Zone $Z_p$ | Sector $S_j$ | TFC input power | STO driving current | B mode Bias recording current | A mode Bias recording current |
|---|---|---|---|---|---|---|
| $H_k$ | $Z_1$ | $S_1$ | $P_{TFC}(k,1)$ | $BI_{STO}(k,1)$ | $BI_{WB}(k,1,1)$ | $AI_{WB}(k,1,1)$ |
| | | $S_2$ | | | $BI_{WB}(k,1,2)$ | $AI_{WB}(k,1,2)$ |
| | | . | | | . | . |
| | | $S_N$ | | | $BI_{WB}(k,1,N)$ | $AI_{WB}(k,1,N)$ |
| | $Z_2$ | $S_1$ | $P_{TFC}(k,2)$ | $BI_{STO}(k,2)$ | $BI_{WB}(k,2,1)$ | $AI_{WB}(k,2,1)$ |
| | | $S_2$ | | | $BI_{WB}(k,2,2)$ | $AI_{WB}(k,2,2)$ |
| | | . | | | . | . |
| | | $S_N$ | | | $BI_{WB}(k,2,N)$ | $AI_{WB}(k,2,N)$ |
| | . | . | . | . | . | . |
| | $Z_P$ | $S_1$ | $P_{TFC}(k,P)$ | $BI_{STO}(k,P)$ | $BI_{WB}(k,P,1)$ | $AI_{WB}(k,P,1)$ |
| | | $S_2$ | | | $BI_{WB}(k,P,2)$ | $AI_{WB}(k,P,2)$ |
| | | . | | | . | . |
| | | $S_N$ | | | $BI_{WB}(k,P,N)$ | $AI_{WB}(k,P,N)$ |

STO driving current

Fig. 30

Table 5

| Head $H_k$ | Zone $Z_p$ | Sector $S_j$ | TFC input power | Bias recording current | B mode STO driving current | A mode STO driving current |
|---|---|---|---|---|---|---|
| $H_k$ | $Z_1$ | $S_1$ | $P_{TFC}(k,1)$ | $BI_{WB}(k,1)$ | 0 | $AI_{STO}(k,1,1)$ |
| | | $S_2$ | | | | $AI_{STO}(k,1,2)$ |
| | | . | | | | . |
| | | $S_N$ | | | | $AI_{STO}(k,1,N)$ |
| | $Z_2$ | $S_1$ | $P_{TFC}(k,2)$ | $BI_{WB}(k,2)$ | 0 | $AI_{STO}(k,2,1)$ |
| | | $S_2$ | | | | $AI_{STO}(k,2,2)$ |
| | | . | | | | . |
| | | $S_N$ | | | | $AI_{STO}(k,2,N)$ |
| | . | . | . | . | 0 | . |
| | $Z_P$ | $S_1$ | $P_{TFC}(k,P)$ | $BI_{WB}(k,P)$ | 0 | $AI_{STO}(k,P,1)$ |
| | | $S_2$ | | | | $AI_{STO}(k,P,2)$ |
| | | . | | | | . |
| | | $S_N$ | | | | $AI_{STO}(k,P,N)$ |

Fig. 36

Table 6

| Magnetic head $H_k$ | Zone $Z_p$ | Sector $S_j$ | TFC input power | STO driving current | C mode Bias recording current | B mode Bias recording current | A mode Bias recording current |
|---|---|---|---|---|---|---|---|
| $H_k$ | $Z_1$ | $S_1$ | $P_{TFC}(k,1)$ | $AI_{STO}(k,1)$ | $CI_{WB}(k,1,1)$ | $BI_{WB}(k,1,1)$ | $AI_{WB}(k,1,1)$ |
| | | $S_2$ | | | $CI_{WB}(k,1,2)$ | $BI_{WB}(k,1,2)$ | $AI_{WB}(k,1,2)$ |
| | | . | | | . | . | . |
| | | $S_N$ | | | $CI_{WB}(k,1,N)$ | $BI_{WB}(k,1,N)$ | $AI_{WB}(k,1,N)$ |
| | $Z_2$ | $S_1$ | $P_{TFC}(k,2)$ | $AI_{STO}(k,2)$ | $CI_{WB}(k,2,1)$ | $BI_{WB}(k,2,1)$ | $AI_{WB}(k,2,1)$ |
| | | $S_2$ | | | $CI_{WB}(k,2,2)$ | $BI_{WB}(k,2,2)$ | $AI_{WB}(k,2,2)$ |
| | | . | | | . | . | . |
| | | $S_N$ | | | $CI_{WB}(k,2,N)$ | $BI_{WB}(k,2,N)$ | $AI_{WB}(k,2,N)$ |
| | . | . | . | . | . | . | . |
| | $Z_P$ | $S_1$ | $P_{TFC}(k,P)$ | $AI_{STO}(k,P)$ | $CI_{WB}(k,P,1)$ | $BI_{WB}(k,P,1)$ | $AI_{WB}(k,P,1)$ |
| | | $S_2$ | | | $CI_{WB}(k,P,2)$ | $BI_{WB}(k,P,2)$ | $AI_{WB}(k,P,2)$ |
| | | . | | | . | . | . |
| | | $S_N$ | | | $CI_{WB}(k,P,N)$ | $BI_{WB}(k,P,N)$ | $AI_{WB}(k,P,N)$ |

Fig. 42

Table 7

| Head $H_k$ | Zone $Z_p$ | Sector $S_j$ | Servo track $_{STW}$ number (m=1,··,N) | Servo track $_{HDD}$ | |
|---|---|---|---|---|---|
| | | | | $RRO_L$ correction amount | $RRO_H$ correction amount |
| $H_k$ | $Z_1$ | $S_1$ | m | L(k,m,1) | H(k,m,1) |
| | | $S_2$ | | L(k,m,2) | H(k,m,2) |
| | | . | | . | . |
| | | $S_N$ | | L(k,m,N) | H(k,m,N) |
| | $Z_2$ | $S_1$ | m | L(k,m,1) | H(k,m,1) |
| | | $S_2$ | | L(k,m,2) | H(k,m,2) |
| | | . | | . | . |
| | | $S_N$ | | L(k,m,N) | H(k,m,N) |
| | . | . | m | . | . |
| | $Z_P$ | $S_1$ | m | L(k,m,1) | H(k,m,1) |
| | | $S_2$ | | L(k,m,2) | H(k,m,2) |
| | | . | | . | . |
| | | $S_N$ | | L(k,m,N) | H(k,m,N) |

MICROWAVE ASSISTED MAGNETIC RECORDING AND MAGNETIC STORAGE DEVICE

CLAIM OF PRIORITY

The present application claims priority from Japanese patent application JP 2012-137210 filed on Jun. 18, 2012, the content of which is hereby incorporated by reference into this application.

BACKGROUND OF THE INVENTION

1. Field of the Invention

The present invention relates to a magnetic storage device equipped with a function of assisting magnetization reversal of a perpendicular magnetic recording medium by applying high-frequency magnetic field, and a method for controlling the same.

2. Background Art

The growth of the Internet environment and newly provided data centers along with penetration of cloud computing have increased the amount of information generated in recent years. There is no doubt that magnetic storage devices such as magnetic disk devices (HDD) having the highest recording density and excellent bit cost play the leading role for storage in the "age of big data". To this end, magnetic storage devices have to have larger capacity and further increasing recording density supporting this is must.

As a magnetic recording technique for higher-density recording, microwave assisted magnetic recording (MAMR) has been proposed, in which high-frequency magnetic field in a microwave band is applied to a perpendicular magnetic recording medium so as to excite precession of medium magnetization for magnetic recording on a perpendicular magnetic recording medium having large magnetic anisotropy while reducing the switching magnetic field. In recent years, practical and micro-structured high-frequency Spin Torque Oscillator (STO) has been proposed by U.S. Pat. No. 7,616,412 B2, for example, which is configured to rapidly rotate spins by spin torque, thus generating high-frequency magnetic field. WO 2010/053187 A1 then discloses a method of making a high-frequency magnetic field oscillator generate high-frequency magnetic field (circularly polarized high-frequency magnetic field) rotating in the direction of the precession of the magnetization of the perpendicular magnetic recording medium to be magnetization-reversed so as to be suitable for the polarity of the magnetic recording field, thus effectively inducing the magnetization reversal. In this way, research and development for implementation of the microwave assisted magnetic recording has become active.

Thus the pace of research and development for implementation of the microwave assisted magnetic recording has been hastened in recent years, and JP 2011-113621 A discloses, in order to achieve the reliability of a high-frequency oscillator necessary to implement such microwave assisted magnetic recording and to keep such oscillation with reliability, a magnetic head driving control apparatus configured to, in a state of applying magnetic recording field, supply a high-frequency oscillator driving signal at a level higher than an ordinary level only for a prescribed effective time in response to an input write gate.

As techniques for perpendicular magnetic recording media, JP 2010-231866 A and JP 2006-73176 A, for example, propose a method for manufacturing a perpendicular magnetic recording medium, capable of yielding favorable magnetic properties and recording/reproducing properties, in which the direction of exhausting material gas used for sputtering film formation and the position of erosion (eroded area to be sputtered) of a target material are devised so as to improve the in-plane distribution of the magnetic properties without degrading productivity or increasing cost.

As techniques for magnetic recording devices, JP 2008-47277 A discloses a data recording method including the steps of: measuring coercive force distribution of a magnetic recording medium, and then when the ambient temperature is higher than a room temperature, preferentially selecting a recording area having a relatively high coercive force for data recording and when the ambient temperature is lower than a room temperature, preferentially selecting a recording area having a relatively low coercive force for data recording, whereby reliability of data recording can be maintained without changing the magnetic recording field of the magnetic head and irrespective of a change in temperature.

SUMMARY OF THE INVENTION

The current perpendicular magnetic recording is approaching a practical limit relating to alignment with the track density of 500 kTPI and with the recording density of 1 Tb/in$^2$ and thermal fluctuation, and so perpendicular magnetic recording media tend to have increased magnetic anisotropy energy and such coercive forces. This makes it increasingly difficult to perform recording using a current perpendicular magnetic recording head. Especially a perpendicular magnetic recording medium has distribution in magnetic properties in the circumferential direction as described in JP 2010-231866 A and JP 2006-73176 A, and if a perpendicular magnetic recording medium has an insufficient recording area or a weak write area, such a perpendicular magnetic recording medium in combination with a magnetic head of poor recording ability causes a big problem during mass production of magnetic storage devices. That is, problems such as degraded servo quality and deterioration in error rate occur at such an area, and an attempt to perform recording at this area will lead to recording at an easy-recording area with excessive magnetic field intensity, and so will fail to achieve high TPI by shortening the distance between recording tracks because of adjacent track write (ATW) or adjacent track erase (ATE) by side recording or side erasing. This problem may be solved at a room temperature by strictly selecting magnetic heads. However, when the device is operated in low-temperature environment, a problem of the weak write will occur at an area beyond the recording ability of the recording head, and in high-temperature environment, a problem of the ATE or the ATW will occur, and so design margin of magnetic heads and magnetic storage devices is very limited, thus causing problems of lower manufacturing yield of magnetic heads and magnetic storage devices. To solve this, another proposal has been made as in JP 2008-47277 A to use a recording area suitable for the environment temperature. Such a proposal, however, has a problem of low performance because it always takes extra time to access an appropriate area during recording/reproducing.

To solve such a problem, an attempt has been made to optimize the recording current intensity at each area. Such an attempt, however, causes a problem about reliability because heat generated at a magnetic core increases with the recording current intensity, thus making a magnetic pole protrude and so increasing the frequency of contact with the perpendicular magnetic recording medium. Another attempt has been made using a clearance controller (TFC: Thermal Fly Height Controller) based on thermal expansion, and such an attempt also has a problem that the control is very difficult due to different time constants of clearance response and irregular variation of the clearance induced, and so durability reliability is further degraded. This problem may be alleviated by increasing the average clearance, which also is not favorable because of deterioration in error rate.

The error rate to determine the recording density of a magnetic storage device is determined by not the average property of the perpendicular magnetic recording medium but the area having the worst recording performance where the errors occur the most. Thus a perpendicular magnetic recording medium having an area where errors are concentrated, i.e., a sector having a poor error rate is the big problem to achieve better yield.

It is an object of the present invention to provide a large-capacity magnetic storage device at high manufacturing yield so as to achieve a clearance without posing a problem about reliability for a perpendicular magnetic recording medium having the distribution of characteristics as well and to achieve high recording density that would be expected from the average characteristics.

A magnetic recording method according to the present invention includes the steps of: acquiring a recording condition on a perpendicular magnetic recording medium including sectors and having distribution of characteristics, the recording condition being for each sector and depending on the distribution of characteristics; setting a recording current and/or a driving current to be applied to a microwave assisted magnetic recording head for each sector in accordance with the recording condition, the microwave assisted magnetic recording head including a magnetic recording pole and a high-frequency magnetic field oscillator, the recording current exciting the magnetic recording pole and the driving current being applied to the high-frequency magnetic field oscillator; and performing a recording operation with the set recording current and driving current.

A magnetic storage device of the present invention includes: a perpendicular magnetic recording medium including sectors and having distribution of characteristics; a microwave assisted magnetic recording head including: a recording head including a magnetic recording pole that generates magnetic recording field for writing on the perpendicular magnetic recording medium and a high-frequency magnetic field oscillator that generates high-frequency magnetic field; a reproducing head including a reproducing sensor that reads information from the perpendicular magnetic recording medium; and a thermal expansion element (clearance controller) that controls clearance between the recording head or the reproducing head and the perpendicular magnetic recording medium; a drive controller that controls a recording operation by the recording head and a reproducing operation by the reproducing head; and a parameter table that stores a set of at least two types of recording conditions for each sector of the perpendicular magnetic recording medium. The drive controller records information on the perpendicular magnetic recording medium while controlling the recording head in accordance with a recording condition stored in the parameter table for each sector.

According to the invention, microwave assisted magnetic recording practically most suitable for each sector is enabled while keeping appropriate clearance, and so a servo information quality and an error rate can be made the most favorable for the sector. Thus, a large-capacity and reliable magnetic storage device can be provided at high manufacturing yield and with high track density.

Problems, configurations, and advantageous effects other than those described above will be made clear by the following description of embodiments.

BRIEF DESCRIPTION OF THE DRAWINGS

FIG. 7 shows an exemplary evaluation result of off-track characteristics (OTC).

FIG. 12 shows a parameter table (Table 1) to optimize $H_{WB}$ and $II_{STO}$.

FIG. 13 shows an exemplary parameter table (Table 2) to adjust a set of $II_{WB}$ and $II_{STO}$ for each sector to record data.

FIG. 14 shows an example where a sector pass rate changes for each sector when recording is performed under the optimum condition on a perpendicular magnetic recording medium having distribution of characteristics.

FIG. 15 shows an example where a sector pass rate changes for each sector when recording is performed in a one-side adjacent squeezing (one-side squeezing) manner on the perpendicular magnetic recording medium of FIG. 14.

FIG. 21 is an exemplary parameter table (Table 3) to record data while adjusting $I_{STO}$ for each sector.

FIG. 26 is an exemplary parameter table (Table 4) to record data while adjusting $I_{WB}$ for each sector.

FIG. 30 is an exemplary parameter table (Table 5) to record data while adjusting $I_{STO}$ for each sector.

FIG. 36 is an exemplary table to organize parameters to divide normal and defective sectors as well as optimum recording parameters for both of the sectors (Table 6).

FIG. 42 shows an exemplary parameter table (Table 7) to provide servo correction information to record information along the rotary center in a perpendicular magnetic recording medium that is mounted at a magnetic storage device in an eccentric manner.

DESCRIPTION OF A PREFERRED EMBODIMENT OF THE INVENTION

Figure 1:
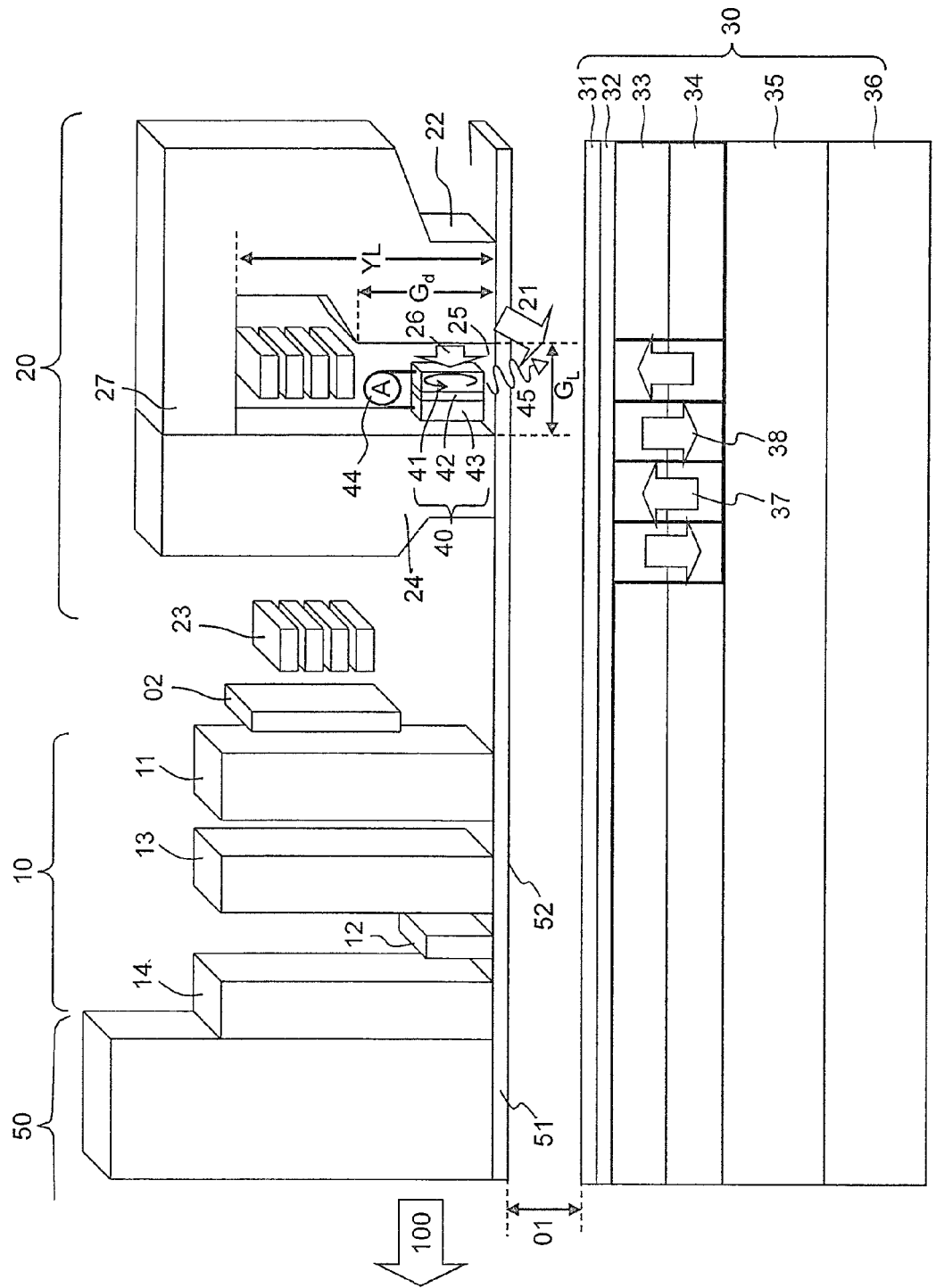
FIG. 1 is a conceptual diagram showing exemplary microwave assisted magnetic recording head and perpendicular magnetic recording medium.

In the following, embodiments of the invention are described with reference to the drawings.
[Embodiment 1]
The following describes embodiments of a microwave assisted magnetic recording head and a magnetic storage device of the present invention, with reference to the drawings.
(Microwave Assisted Magnetic Recording Head)
FIG. 1 is a conceptual diagram showing an exemplary microwave assisted magnetic recording head and such a perpendicular magnetic recording medium. A magnetic head includes a reproducing head part 10, a recording head part 20 and a thermal expansion element (TFC) 02 for clearance control or the like formed on a slider 50 traveling in the direction of an arrow 100 while keeping clearance 01 over a perpendicular magnetic recording medium 30. Herein, the TFC 02 includes a heat-generation resistive element thin film of about 50 to 150Ω made of a material having high specific resistance and a high thermally expandable property, such as NiCr or W and insulated with alumina film, and has a function of adjusting the clearance between the recording head part 20 or the reproducing head part 10 and the perpendicular magnetic recording medium 30 to be about 0.5 to 2 nm. The TFC may be provided at two or more positions, and in such a case, wiring for connection of the TFCs may be provided independently or in series. Wiring for power supply is not illustrated in the drawing. A head protective layer 51 is made of Chemical Vapor Deposition Carbon (CVDC), Filtered Cathodic Arc Carbon (FCAC) or the like, and a bottom face 52 is an Air Bearing Surface (ABS) of the magnetic head.

The slider 50 is made of $Al_2O_3$—TiC ceramic or the like and is subjected to etching so that negative pressure is generated at the ABS face, thus allowing the floating amount of the pole part of the magnetic head to be about 5 to 10 nm across the entire perimeter of the perpendicular magnetic recording medium. The slider 50 is mounted on a suspension having element driving wiring, and is mounted at the magnetic storage device as a Head Gimbal Assembly (HGA). The present embodiment uses a slider of femto-type measuring 0.85 mm×0.7 mm×0.23 mm, which may be a thin femto type measuring about 0.2 mm in height or a long femto type measuring about 1 mm in length depending on its use. The perpendicular magnetic recording medium 30 of the present embodiment moves relative to the magnetic head so that the reproducing head part 10 is on the leading side and the recording head part 20 is on the trailing side, which may be reversed, and the head protective layer may be omitted.

The reproducing head part 10 includes: a magnetic shield layer 11 that provides magnetically shielding from the recording head part 20; a reproduction sensor element 12; an upper magnetic shield 13 and a lower magnetic shield 14 to enhance reproduction resolution. The reproduction sensor element 12 plays a role of reproducing a signal from the medium, and may be configured to exert a Tunneling Magneto-Resistive (TMR) effect, a Current Perpendicular to Plane (CPP)—Giant Magneto-Resistance (GMR) effect or an Extraordinary Magneto-Resistive (EMR) effect or may be a sensor utilizing a Spin Torque Oscillator (STO) effect or of a $CO_2Fe(Al_{0.5}Si_{0.5})/Ag/Co_2Fe(Al_{0.5}Si_{0.5})$ or $Co_2Mn(Ge_{0.75}Ga_{0.25})/Ag/Co_2Mn(Ge_{0.75}Ga_{0.25})$ scissors type including the lamination of Heusler alloy or a differential type. The element width, the element height and the shield gap (reproduction gap) may be designed or processed suitably for recording track density and recording density as a target, and the element width may be about 50 nm to 5 nm, for example. FIG. 1 does not illustrate a leading terminal of the reproduction output.

The recording head part 20 includes: a first magnetic recording pole 22 and a second magnetic recording pole 24 to generate magnetic recording field 21 and intense and uniform STO oscillation control magnetic field 26 at a recording gap 25; a high-frequency magnetic field oscillator (STO) 40 that is provided in the recording gap 25; a coil 23 to excite the magnetic recording poles and the like. High-frequency magnetic field 45 generated by the STO 40 is controlled by the STO oscillation control magnetic field 26 for the rotation direction and the oscillation frequency. In this example, the first magnetic recording pole 22 and the second magnetic recording pole 24 are configured to have a large volume in the vicinity of the recording gap 25 and have a substantially magnetically-symmetrical ring-shape structure. In this example, the coil 23 made of a Cu thin film, for example, is wound around the magnetic recording pole 24, which may be wound around a rear-end part 27 of the magnetic recording pole or around the first magnetic recording pole 22, or may be multilayer winding. The recording gap 25 may be made of a non-magnetic thin film such as an $Al_2O_3$ or $Al_2O_3$—$SiO_2$ film formed by sputtering or CVD.

For uniform and intense magnetic field at the recording gap, magnetic layers of the magnetic poles in the vicinity of the gap have thicknesses of 40 nm to 3 μm. The recording gap length $G_L$ is determined with consideration given to the thickness of STO 40, uniformity and intensity of the STO oscillation control magnetic field 26 in the recording gap, intensity and recording field gradient of the magnetic recording field 21, a track width, a gap depth $G_d$ and the like. The gap depth is preferably larger than the track width and/or the gap length of the magnetic recording poles in terms of the uniformity of magnetic field, and so the track width of the second magnetic recording pole 24 is 40 to 250 nm, the gap depth is 40 to 700 nm and the gap length is 20 to 200 nm. For improved frequency response, smaller yoke length YL and smaller number of coil turns are preferable, and so the yoke length is 0.5 to 10 μm and the number of coil turns is 2 to 8. Especially in the case of a magnetic head for high-speed transferring magnetic storage device used for a server or enterprise, the yoke length is 4 μm or less, and if needed, the magnetic head preferably has a multilayer structure including the lamination of high-saturation magnetic flux density magnetic thin films via a magnetic intermediate layer with high specific resistance or via a non-magnetic intermediate layer.

The first magnetic recording pole 22 includes a high-saturation magnetic flux density soft magnetic film made of FeCoNi, CoFe, NiFe alloy or the like, which is formed by a thin-film formation process such as plating, sputtering or ion beam deposition to be a single layer or a multilayer. The width $T_{ww}$ of the first magnetic recording pole 22 may be designed suitably for the magnetic recording field and the recording density as targets and be processed by a semiconductor process, and may be about 200 nm to 30 nm in size. The magnetic pole in the vicinity of the recording gap may be a film that is flat and parallel to the recording gap face or may surround the STO. More preferably, a high-saturation magnetic flux density material is used in the vicinity of the recording gap for improved magnetic recording field intensity, and the shape thereof is narrowed toward the recording gap. Similarly to the first magnetic recording pole 22, the second magnetic recording pole 24 also may include a soft magnetic alloy thin film made of CoNiFe alloy, NiFe alloy or the like, and may have a controlled shape.

The STO 40 includes: a high-frequency magnetic field generation layer (FGL) 41; an intermediate layer 42, a spin injection layer 43 to give spin torque to the FGL and the like. The FGL 41 is made of soft magnetic alloy such as FeCo or NiFe, hard magnetic alloy such as CoPt or CoCr, magnetic alloy having negative perpendicular magnetic anisotropy such as $Fe_{0.4}Co_{0.6}$, $Fe_{0.01}Co_{0.99}$ or $Co_{0.8}Ir_{0.2}$, Heusler alloy such as CoFeAli, CoFeGe, CoMnGe, CoFeAl, CoFeSi or CoMnSi, Re-TM amorphous alloy such as TbFeCo, or magnetic artificial super-lattice such as Co/Fe, Co/Ir, Co/Ni or CoFeGe/CoMnGe. The intermediate layer 42 is made of a non-magnetic conductive material such as Au, Ag, Pt, Ta, Ir, Al, Si, Ge, Ti, Cu, Pd, Ru, Cr, Mo or W.

Materials, structures and magnetic anisotropy of these magnetic layers are decided so that the spin injection efficiency, the high-frequency magnetic field intensity, the oscillation frequency, effective magnetic anisotropy including demagnetizing field and the like can be most suitable for microwave assisted recording. For instance, since high-frequency magnetic field increases in proportion to the saturation magnetization of the FGL, the FGL layer preferably has higher saturation magnetization Ms. Although a larger thickness of the FGL leads to higher high-frequency magnetic field, a too thick film makes the magnetization receptive to disturbance, and so the thickness of 1 to 100 nm is preferable. It is confirmed that intense STO oscillation control magnetic field applied using the above-stated ring shape magnetic pole enables stable oscillation with any of a soft magnetic material, a hard magnetic material and a negative perpendicular magnetic anisotropy material.

The FGL 41 may have a width $W_{FGL}$ that is designed and processed suitably for the magnetic recording field and the recording density as targets, and the width is 50 nm to 5 nm in one example. For a larger $W_{FGL}$, more intense STO oscillation control magnetic field is preferable. In the case of combination with Shingled Magnetic Recording (SMR) as described later, $W_{FGL}$ is preferably two or three times the recording track width. The intermediate layer 42 preferably has a thickness of about 0.2 to 4 nm for high spin injection efficiency. The spin injection layer 43 preferably is made of an artificial magnetic material such as Co/Pt, Co/Ni, Co/Pd or CoCrTa/Pd because such a material having perpendicular magnetic anisotropy enables stable oscillation of the FGL. For stabilization of high-frequency magnetic rotation of the FGL 41, a rotation guide ferromagnetic layer having a structure similar to that of the spin injection layer 43 may be provided adjacent to the FGL 41. The stacking order of the spin injection layer 43 and the FGL 41 may be reversed.

Although not illustrated in FIG. 1, an under layer and a cap layer may be further provided to improve the controllability of film properties and film characteristics of the spin injection layer and the FGL, the oscillation efficiency and reliability, where these layers may be made of a single layer thin film, an alloy thin film or a lamination thin film made of Cu, Pt, Ir, Ru, Cr, Ta, Nb and the like.

A driving current source (or voltage source) and an electrode part of the STO are schematically represented with reference numeral 44, and the magnetic recording poles 22 and 24 may be used as electrodes by magnetically coupling the magnetic recording poles 22 and 24 at the rear-end part 27 of the magnetic head but electrically insulating and further by electrically connecting them with the side face of the STO at the gap. Except under the special circumstances, current is applied to the STO from a DC power supply (voltage driven or current driven) 44 from the side of the spin injection layer, thus driving microwave oscillation of the FGL. The drawing exemplifies current driving, and constant-voltage driving is preferable for improved reliability because the current density can be made constant.

(Perpendicular Magnetic Recording Medium)

The perpendicular magnetic recording medium 30 shown in FIG. 1 includes the lamination on a super-smooth and heat-resisting non-magnetic substrate 36 made of glass, Si, plastics, NiP plated Al alloy or the like, the lamination including a soft magnetic under layer 35, first and second recording layers 34, 33, a protective layer 32 and a lubricant layer 31, for example. The soft magnetic under layer 35 is made of FeCoTaZr and the like. The first and second recording layers 34, 33 include magnetic films that are mainly made of CoCrPt, $L1_2$-$Co_3$Pt base alloy, $L1_2$-$(CoCr)_3$Pt base alloy, $L1_1$-$Co_{50}Pt_{50}$ base alloy, m-$D0_{19}$ base $Co_{80}Pt_{20}$ base alloy, $CoCrSiO_2$/Pt, CoB/Pd magnetic artificial super-lattice, $L1_0$ FePt or the like, to which an additive such as $SiO_2$, $TiO_2$, C, B, Ag, Cu, Au, Ni, Fe, Cr, Mn or Pd is added as needed. The protective layer 32 is made of C or FCAC. These layers are formed by magnetron sputtering facility including an ultrahigh vacuum chamber, protective film formation facility, lubricant layer formation facility and the like. The perpendicular magnetic recording layer is formed by mixing appropriate oxide, carbide, nitride or boride of Ti, Nb, Zr, Cu, Cr, Co, Si, Al or the like or the mixture thereof to a target material and adjusting film formation conditions, thus segregating a 0.5 to 2 nm-thick non-magnetic material in crystalline grain boundary, and thus controlling magnetic exchange coupling among crystalline grains. Arrows 37, 38 indicate upward and downward magnetization recorded in the perpendicular magnetic recording medium, respectively. Since the magnetic film has increased average magnetic anisotropy field and so has a high coercive force, sufficient recording cannot be performed with magnetic field from a conventional main pole type magnetic head, and the configuration is particularly suitable for narrow track magnetic recording.

The perpendicular magnetic recording layer is not limited to a two-layered structure, but may be single-layer structured, gradient composition film structured or multilayer-structured including three or more layers as long as it has a high coercive force. It may further include an intermediate layer between the layers as needed to control magnetic coupling. When the structure and magnetic characteristics of perpendicular magnetic recording are close to those of a single-layered medium, the resonant frequency of the magnetization and the oscillation frequency of the high-frequency magnetic field of the STO 40 are preferably not different so much. In the case of a multilayered structure, a damping constant α of the magnetic layer may be relatively made larger, whereby flexibility of energy absorption from the high-frequency magnetic field can be adjusted, and so the oscillation frequency of the STO can be made lower.

At least one layer that is a non-magnetic layer for characteristics control may be provided between the soft magnetic under layer 35 and the substrate 36, and further at least one layer that is a non-magnetic intermediate layer for characteristics control made of Ru or the like as well as an intermediate layer made of a non-magnetic or magnetic member may be provided between the soft magnetic under layer 35 and the magnetic layer 34 to improve crystalline grain orientation, grain size (diameter) and magnetic characteristics and the uniformity of the magnetic layers 34 and 33. The soft magnetic under layer 35 further may be two-layer structured via Ru or the like to improve the soft magnetic characteristics and the uniformity. Although FIG. 1 shows the example of the magnetic layers 33, 34 disposed on a single side of the substrate 36, they may be disposed on double sides of the non-magnetic substrate 36. The present embodiment shows an example of the magnetic layers as continuous films in the perpendicular magnetic recording medium 30, which may be a discrete track film or a patterned film provided with magnetic patterns of about 10 nm on the substrate.

Figure 2:
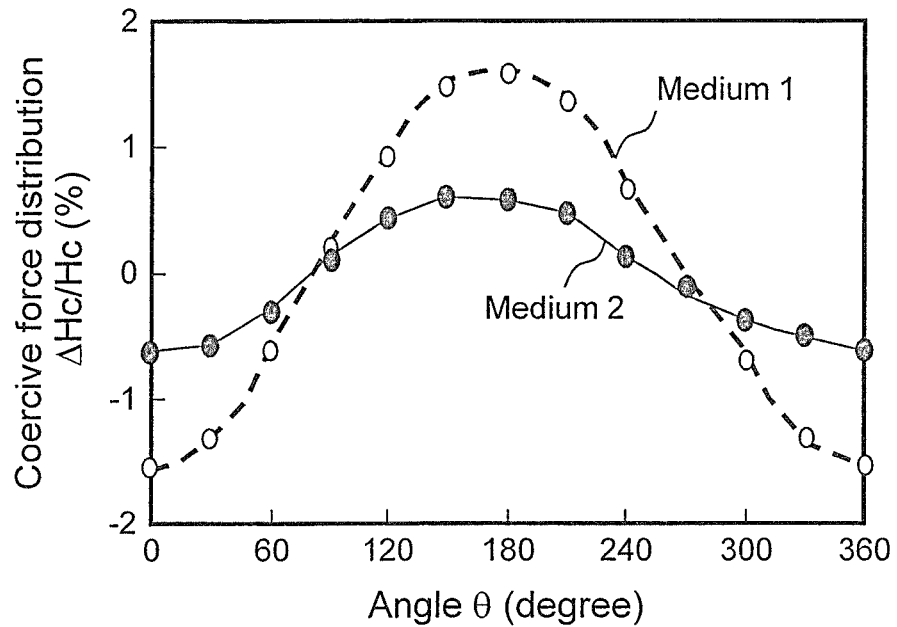
FIG. 2 shows exemplary distribution of a coercive force in a perpendicular magnetic recording medium.
Figure 3:
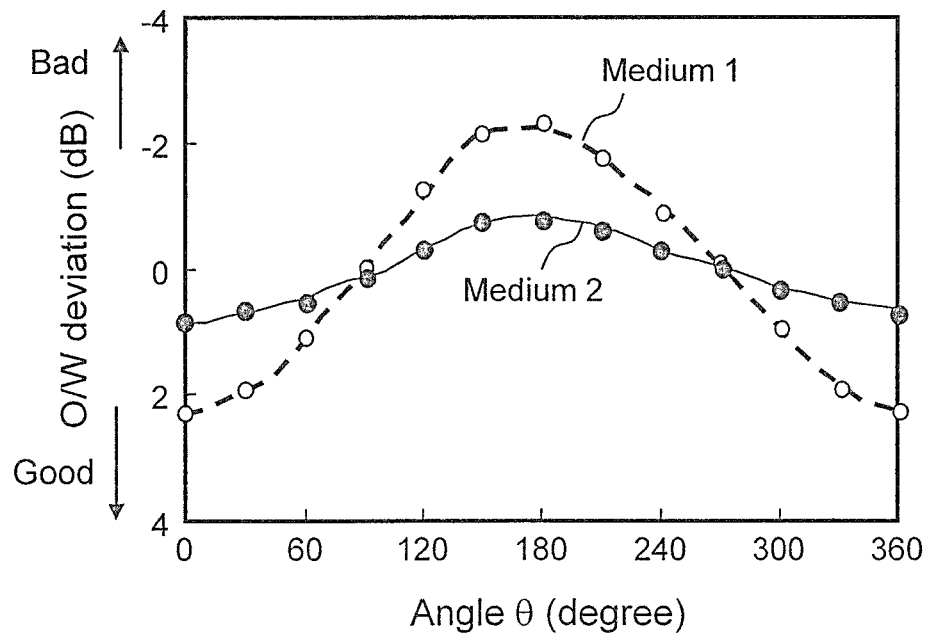
FIG. 3 shows exemplary distribution of overwrite characteristics of a perpendicular magnetic recording medium.

Although the high-coercivity perpendicular magnetic recording medium of the present embodiment has improved uniformity in characteristics, the perpendicular magnetic recording medium still has the distribution of characteristics depending on the position in the circumferential direction at the inner radius, the middle radius and the outer radius under the aforementioned conditions achieving necessary performance, and has the distribution of 0.05% or more and 25% or less. Herein, the distribution of characteristic A is defined as $(A_{MAX}-A_{MIN})/(A_{MAX}+A_{MIN})$ where $A_{MAX}$ denotes the maximum value and $A_{MIN}$ denotes the minimum value. FIG. 2 shows a typical example, where medium 1 has the coercivity distribution of ±1.6% and medium 2 has ±0.6%. The average coercive force of one round is 5 to 9 kOe, and 5.5 kOe or more means favorable recording/reproducing characteristics. Such distribution causes distribution of the recording/reproducing characteristics as well, and for example, the overwrite characteristic also has positional dependence in the circumferential direction of ±0.8 dB (medium 2) and ±1.2 dB (medium 1) as shown in FIG. 3. Other types of distribution affecting the recording/reproducing characteristics include, in addition to magnetic characteristics such as a coercive force, film thicknesses of the magnetic films, the protective/lubricant films, the magnetic under film and the like and undulations of the substrate, for example.

(Magnetic Storage Device)

Figure 4:
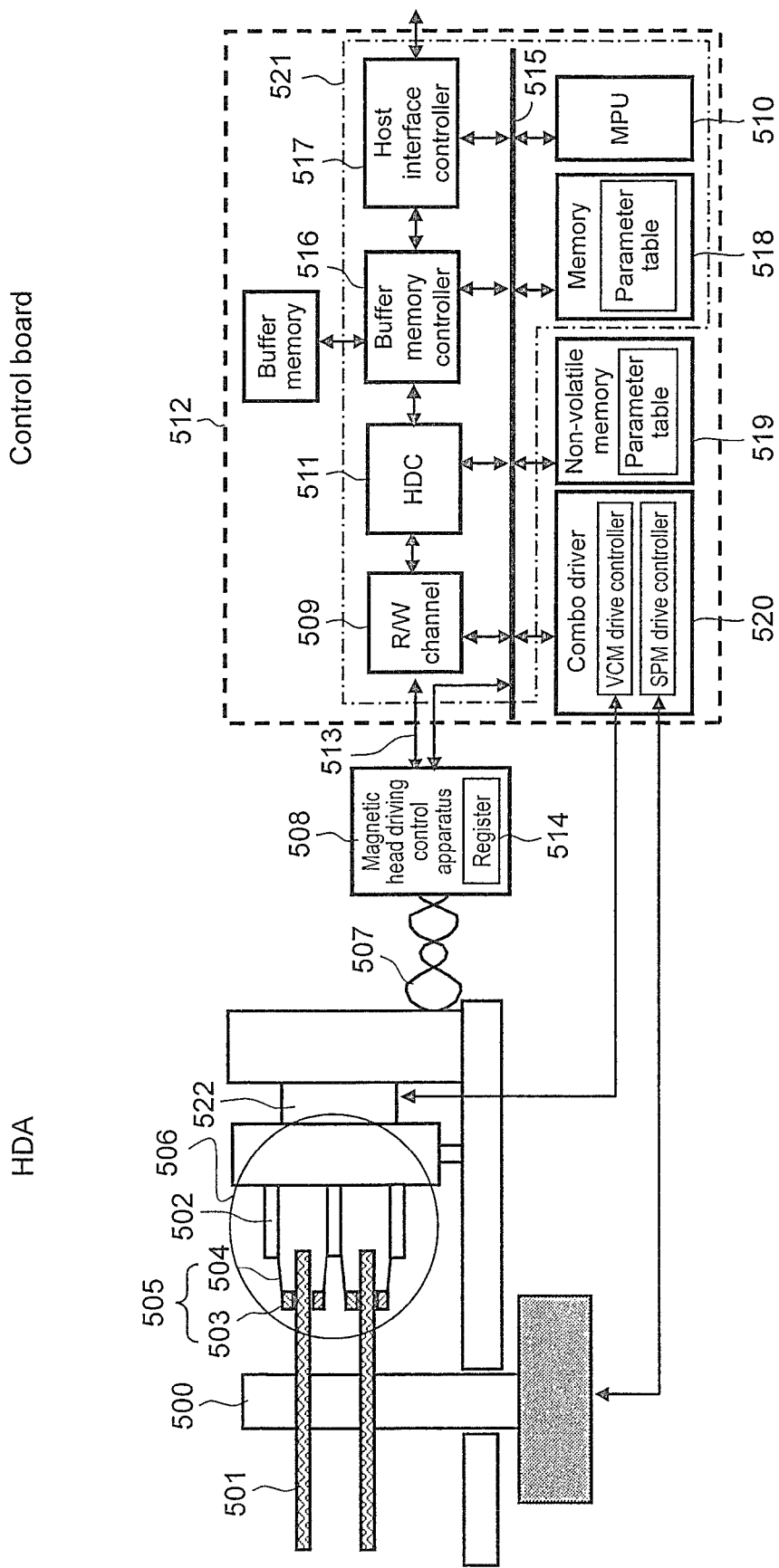
FIG. 4 is a conceptual diagram showing an exemplary configuration of a magnetic storage device.

FIG. 4 is a conceptual diagram showing an exemplary configuration of a magnetic storage device of the present embodiment. The magnetic storage device includes: a spindle motor 500; perpendicular magnetic recording media 501; a high-rigidity arm 502; a HGA (this may be simply called a magnetic head) 505; a Head Stack Assembly (HSA) 506; a magnetic head driving control apparatus (R/W-IC) 508; a R/W channel 509; a microprocessor (MPU) 510; a disk controller (HDC) 511; a buffer memory controller 516 that controls buffer memory; a host interface controller 517; a memory 518 including a RAM or the like to store a control program and control data (parameter table); a non-volatile memory 519 such as a flash memory, a FROM or the like to store a control program and control data (parameter table); a combo driver 520 including a VCM (Voice Coil Motor) driver, a spindle motor (SPM) driver or the like; a bus 515 of the MPU and the like. The perpendicular magnetic recording medium 501 has distribution of characteristics.

The HGA 505 includes a magnetic head slider 503 including a STO, a recording/reproducing element, a TFC and the like, and a high-rigidity suspension 504. The magnetic head driving control apparatus 508 has a STO driving control function to generate a driving signal (driving current signal or driving voltage signal) to drive the STO, and includes a recording amplifier and a reproducing preamplifier. The R/W channel 509 functions as a recording modulation unit and a signal processing, reproducing modulation unit of a Reed Solomon (RS) channel using Reed-Solomon codes as one kind of forward-direction error-correcting code or a non Reed-Solomon (non-RS) channel using the newest Low Density Parity Check (LDPC) code.

The HGA 505 is connected to the magnetic head driving control apparatus 508 via a signal line, and selects one of the magnetic heads in response to a head selector signal based on a recording instruction or a reproducing instruction from a host (not illustrated) as a higher-level device for recording and reproducing. The R/W channel 509, the MPU 510, the HDC 511, the buffer memory controller 516, the host interface controller 517 and the memory 518 are configured as one LSI (SoC: System on Chip) 521. A control board 512 includes, as well as this, a driving controller, a non-volatile memory and the like mounted thereon. If needed, the high-rigidity suspension and the high-rigidity arm may be made of a vibration-absorbing and suppressing body, to which a damper may be attached for further vibration suppression. The high-rigidity suspension 504 and the slider 503 may be preferably provided with a micro-position movement adjustment mechanism (dual stage actuator, micro stage actuator) including a piezoelectric element, an electromagnetic element, a thermal deformation element or the like, because it enables high-speed and high-precision positioning for high-track density.

The MPU 510 is a main controller of the magnetic storage device, and performs servo control required for recording/reproducing operations and positioning of the magnetic heads. For instance, the MPU sets parameters required for such an operation at a register 514 included in the magnetic head driving control apparatus 508. Each register, as described later, includes parameters set independently as needed, the parameters including a predetermined temperature, a clearance control value for each area of a perpendicular magnetic recording medium (corresponding to TFC input power value), a STO driving current value, a recording current value, their overshoot values, timings, time constants for environmental change and the like.

The R/W channel 509 is a signal processing circuit. The R/W channel 509 outputs a signal 513 that is obtained by encoding recording information transferred from the disk controller 511 to the magnetic head driving control apparatus 508 during information recording, and outputs reproduction information, which is a reproduction signal output from the magnetic head 505 that is amplified by the magnetic head driving control apparatus 508 and then is decoded, to the HDC 511 during information reproduction.

The HDC 511 outputs a write gate to instruct the starting (timing for recording) of information recording of the recording data 513 on the perpendicular magnetic recording medium to the R/W channel 509, thereby performing transfer control of recording/reproducing information, conversion of data format, ECC (Error Check and Correction) processing and the like.

The magnetic head driving control apparatus 508 is a driving integrated circuit that, in response to the input of a write gate, generates at least one type of recording signal (recording current) at least corresponding to the recording data 513 supplied from the R/W channel 509 and supplies the recording signal together with a STO driving signal with a controlled current-application timing to the magnetic head. The magnetic head driving control apparatus 508 includes a head driving circuit, a head driving current supplying circuit, a STO delay circuit, a STO driving current supply circuit, a STO driving circuit and the like, and has a register including values set by the MPU, such as a recording current value, a STO driving current value, a TFC input power value and an operation timing. Each register value can be changed for each condition such as an area of the perpendicular magnetic recording medium, environment temperature, pressure or the like. The magnetic head driving control apparatus 508 functions as a main controller of the magnetic storage device to control recording/reproducing operations such as transferring of recording/reproducing data and supply bias recording current to the magnetic heads in response to a direct instruction from the MPU that executes positioning servo control of the magnetic heads and preferably has a function to start a recording operation at timing of the write gate output from the HDC as well.

In this way, the magnetic head driving control apparatus of the present embodiment can freely set operation timing of means that supplies bias recording current and recording signals and STO driving control means in response to the input from the MPU instructing an operation of the magnetic storage device and the input of a write gate instructing information recording, their current waveforms and current values, clearance control power, recording current and the like. A temperature sensor is provided in the HDA, for example.

FIG. 4 shows the case of including two perpendicular magnetic recording media and four magnetic head sliders, but one magnetic head slider may be provided for one perpendicular magnetic recording medium, or the number of the perpendicular magnetic recording medium or the magnetic head may be plural as needed suitably for the purpose.

(How to Adjust Magnetic Storage Device)

Firstly microwave assisted magnetic recording heads are selected using magnetic recording/reproducing characteristics evaluation equipment. The magnetic recording/reproducing characteristics evaluation equipment of the present embodiment includes: a servo information recording/reproducing controller that controls the recording operation by a magnetic recording pole and a high-frequency oscillator for each magnetic head and the reproducing operation by a magnetic reproduction element; a thermal expansion element controller that controls the operation of a thermal expansion element for each magnetic head; a mechanism to enclose a magnetic head, a perpendicular magnetic recording medium and a mechanical unit with a sealing cover and then charges He therein during servo information recording as in FIG. 35 or FIG. 37 described later in detail; a function of learning a control parameter for the control for the perpendicular magnetic recording medium in the environment containing He for evaluation of characteristics for each sector and selecting a recording condition from at least two types of recording conditions for each sector depending on the characteristics of the sector to form a servo pattern under the recording condition suitable for the sector; and a recording/reproducing controller that performs recording at least for each sector on the perpendicular magnetic recording medium based on the servo pattern and reproducing/decoding processing for each sector by a non-RS channel using LDPC code.

The ABS face of the magnetic head slider is designed so as to float at the substantially same degree between the environment of air and He, and the magnetic recording/reproducing characteristics evaluation equipment of the present embodiment is filled with He to be about 0.5 to 1 atmospheric pressure. Then, by the method of Embodiments 8 to 10 described later, the same servo information as that of the magnetic storage device is recorded at a predetermined area of the perpendicular magnetic recording medium under the He environment using a microwave assisted magnetic recording head while setting the clearance at 1.5 nm. Since the recording position of the servo information gradually is shifted due to thermal expansion during recording of the servo information, at least a low-frequency shifting component is learned and recorded similarly to Embodiments 10 and 12 described later in detail.

The servo information used enables high positioning accuracy that is equivalent or more to that of the magnetic storage device, and the recording/reproducing characteristics of a magnetic head are evaluated as follows while setting the clearance during recording and reproducing at 1.5 nm and 1 nm, respectively, for the selection. For the recording/reproducing, appropriate TFC profile is found for each of the recording and the reproducing, which are then stored in a parameter table for use as needed. The evaluation of recording/reproducing characteristics is more favorably performed under the He environment.

Figure 5:
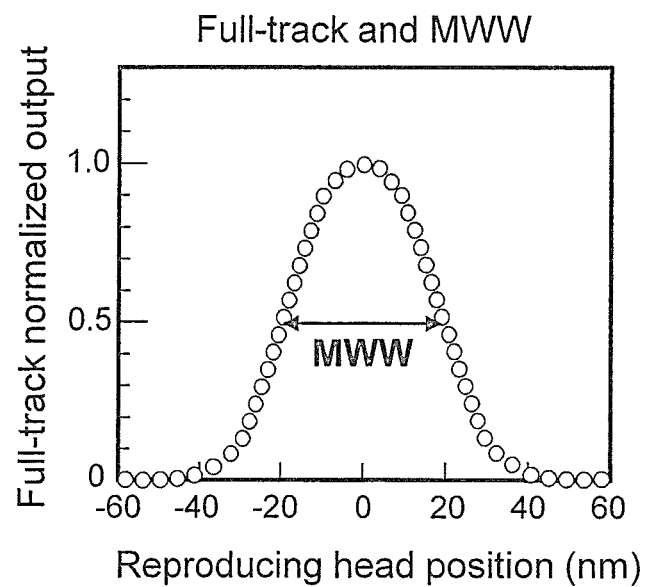
FIG. 5 shows an exemplary evaluation result of MWW.
Figure 6:
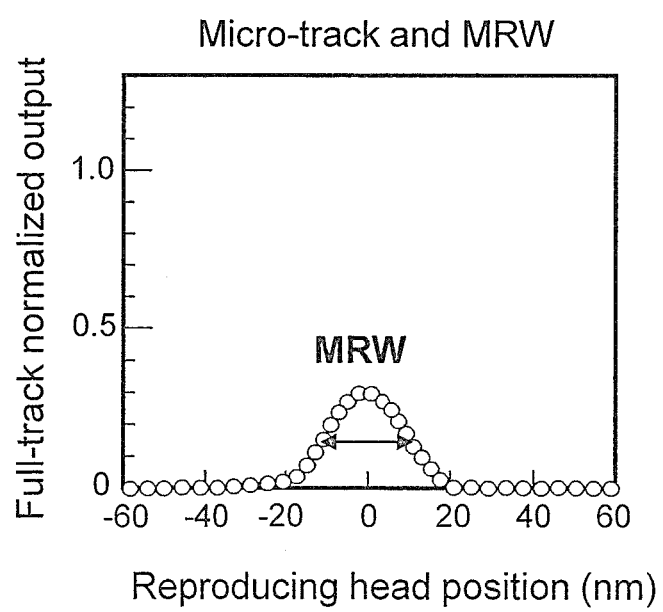
FIG. 6 shows an exemplary evaluation result of MRW.

Firstly optimum values $P_{TFC}(0,1)$, $I_{WB}(0,1)$ and $I_{STO}(0,1)$ for the TFC input power, the bias recording current and the STO driving current, respectively, with magnetic head $H_0$ and at zone $Z_1$ are stored in a register of a head driver. Then, a microwave assisted magnetic recording head is driven using the data, and a predetermined recording pattern based on servo information is recorded at a predetermined track of zone $Z_1$ at a predetermined frequency and under predetermined recording track environment, thus evaluating the following characteristics for each sector or for one round of the track. As shown in FIG. 5, a recording track is recorded at the frequency of about 10 to 20% of the maximum frequency (full track), and a recording track width or Magnetic Write Width (MWW) (0,1) is determined as a half-value width of the profile. Then, as shown in FIG. 6, the recording track recorded at the above frequency is partially erased from both sides (see FIG. 7 and FIG. 15) to create a narrow track having the signal intensity of 10 to 30% (called a micro-track), and a magnetic reproduction track or Magnetic Read Width (MRW) (0,1) is determined as a half-value width thereof.

Figure 8:
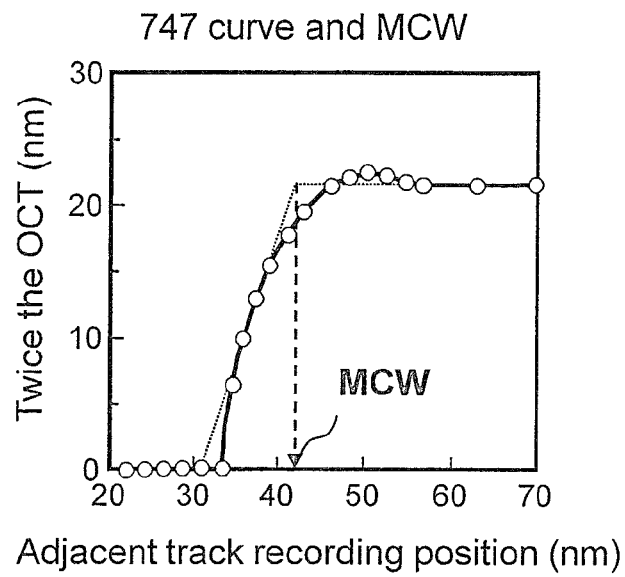
FIG. 8 shows an exemplary evaluation result of MCW (747 curve).

Since the recording/reproducing characteristics evaluation device of the present embodiment uses a non-RS channel using LDPC code, the error rate can be evaluated only after error correction. Since the error rate after error correction typically has very small probability of occurrence (about $10^{-9}$), it is not possible to precisely evaluate an error rate in short-time evaluation for the selection test or the like. Then, as shown in FIG. 7, off-track margin is evaluated as follows using a sector failure rate for recording at adjacent tracks. That is, recording is performed with predetermined linear recording density BPI at adjacent tracks of a center recording track (self track) while changing the amount of squeezing from one of the sides, thus measuring a sector failure rate after error correction. Then, a relationship between this sector failure rate and the track position, called a bath-tub curve, is found, and off-track capability (OTC) is evaluated using the bath-tub curve width having the sector failure rate of 50%. Next, as shown in FIG. 8, dependence of the OTC on the adjacent squeezing interval is evaluated (747 curve evaluation), and the adjacent track interval that is a limit where the off-track characteristics of the center recording track are not changed is extrapolated, thus finding Magnetic Core Width (MCW) (0, 1).

As a result of the recording/reproducing characteristics evaluation as stated above, microwave assisted magnetic recording heads capable of yielding a favorable error rate with MWW of 39 nm, MCW of 42 nm and MRW of 19 nm are selected in the present embodiment. Herein, when evaluation is performed using a perpendicular magnetic recording medium having large characteristics distribution, a magnetic head having poor characteristics at the acceptance boundary will be accepted in the selection test. This is not favorable in terms of the yield of a device and a magnetic head and reliability thereof because the failure rate of the magnetic storage device increases by about 10 points and magnetic heads to be accepted are erroneously determined as failures by about 2 points. For the evaluation, the error rate correction ability of the non-RS channel using LDPC code may be limited so that the error rate is intentionally evaluated under the condition where error easily occurs. For reproduction, appropriate TFC profile may be found separately, which may be stored as a parameter table, and a register of the magnetic head driving control apparatus may be set appropriately and may be applied during reproduction, whereby recording characteristics are evaluated at an appropriate clearance, e.g., at 1 nm.

It is particularly preferable that, in the above, a high-coercivity perpendicular magnetic recording medium for magnetic head selection test having the characteristics distribution of ±0.5% or less is manufactured by a special method such as rotating film formation or by selecting from products for use because this can shorten the evaluation time.

Figure 9:
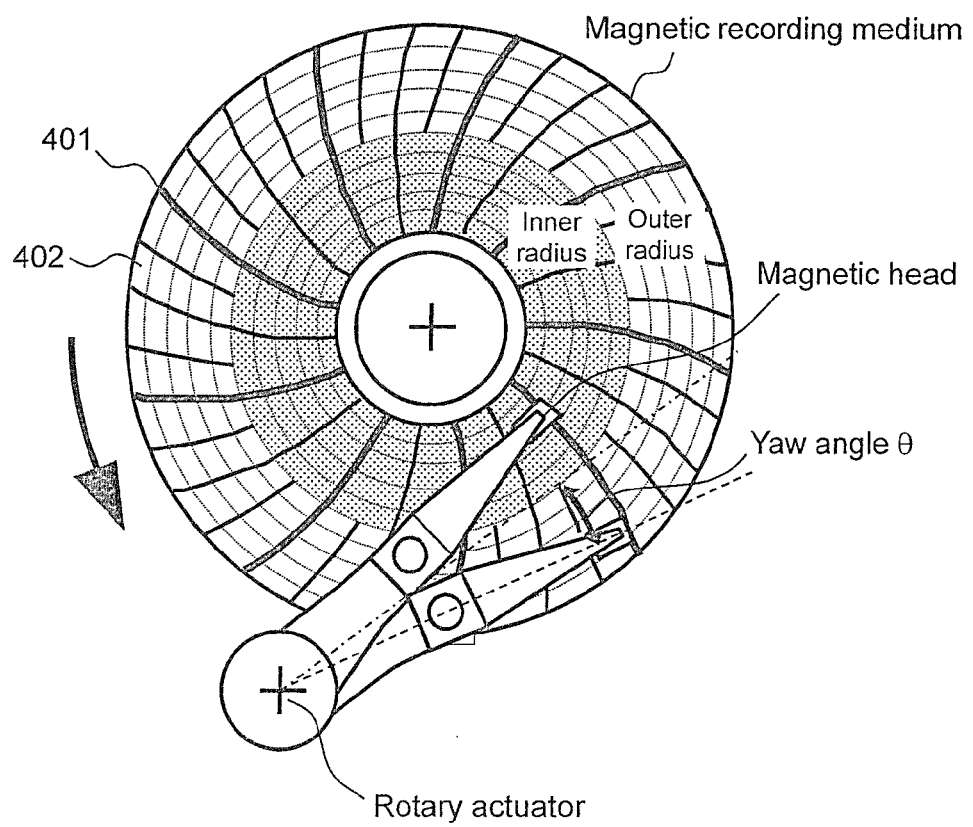
FIG. 9 is a conceptual diagram showing a servo area, a zone and a sector in a magnetic storage device.

Next, four of the microwave assisted magnetic recording heads accepted in the above selection test and two perpendicular magnetic recording media having the distribution of characteristics are mounted at 2.5" or 3.5" type HDA or magnetic storage device shown in FIG. 4, and predetermined servo information as shown in FIG. 9 is recorded at a servo area 401 by a servo track writer or by a self servo write method. This drawing simply shows an example of the divided zones including two zones of inner radius and outer radius in a data sector 402, and considering the upper limit of the number of tracks per zone, 1.8", 2.5" and 3.5" type devices having the zone number of 15 to 20, to 25, and 20 to 40, respectively, are considered in the present embodiment.

In the above servo information recording step, a servo track at a specific track pitch is formed in accordance with a specific track width of the magnetic head. In the present embodiment, however, the magnetic storage device includes a plurality of magnetic heads each having a different recording track width, and so the track pitch is not always an optimum track pitch of another magnetic head having a different recording track width. Then, squeeze characteristics, Adjacent Track Interference (ATI) characteristics, 747 characteristics and the like are evaluated for each magnetic head in the manufacturing process of a magnetic storage device, thus determining an optimum data track pitch (track profile) and finding a conversion equation from the servo track profile, and then a data track profile of a perpendicular magnetic recording medium is determined in accordance with this conversion equation. At this data track, user data are recorded/reproduced by a magnetic head positioned by the servo information and this conversion equation, and the data track is made up of a plurality of data sectors $S_j$ including a preamble servo part, a data part of 512B or 4 kB, a parity, an ECC and CRC part and a data sector gap part.

Figure 10:
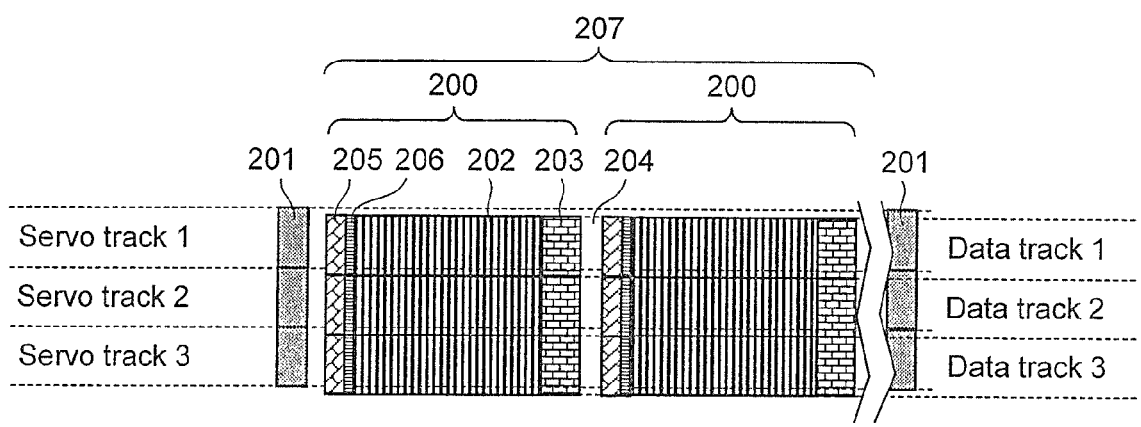
FIG. 10 is a conceptual diagram showing a servo track, a servo sector, a data track and a data sector.

FIG. 10 schematically shows the relationship among a servo track, a servo sector, a data track and a data sector in an example of 512 B including a several data sectors 200 in a servo sector 207. In the case of 4 kB, they have a reversed relationship. In this example, a data track is made up of: a preamble servo part 201; a plurality of data sectors 200 including a data part 202 of 512B or 4 kB; a parity, an ECC and CRC part 203 and a data sector gap part 204; and a plurality of servo sectors 207 divided by a servo area including the preamble servo part. The preamble servo part 201 as the partition of servo sectors includes: a gain reference part; a preamble part, a Servo Address Mark (SAM) part; a gray code part; a servo burst (position burst) part; a post servo part indicating correction data such as eccentricity correction amount of the servo sector; and a pad part, for example. At the beginning of the data sector 200 mainly configuring data, a synchronization part 205 and a Data Address Mark (DAM) part 206 are provided. A data track may be divided into a former half and a latter half across the servo part 201. In this case, at each of the divided former half and latter half, a synchronization part and a DAM part are provided.

Finally, margin is given to each other among magnetic heads and zones so that the error rate becomes substantially uniform at the entire zone for all magnetic heads in the range giving predetermined areal recording density, and their track density and linear recording density profile are determined (adaptive formatting) so as to achieve the best performance for the magnetic storage device as a whole. Then, such a parameter is stored in a memory as needed, thus configuring a magnetic storage device having predetermined capacity.

Figure 11:
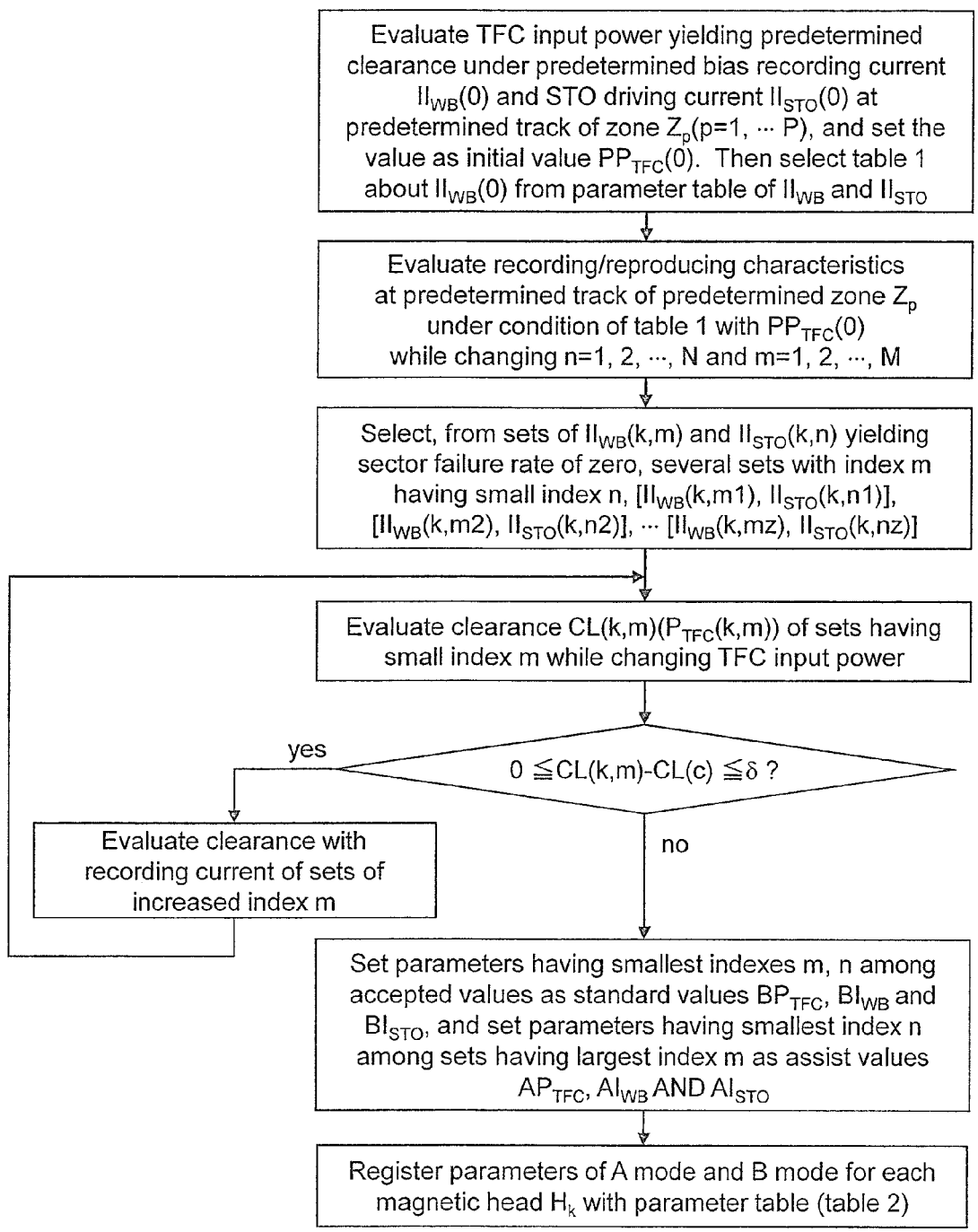
FIG. 11 shows an exemplary flowchart to set parameters of Head $H_k$.

In the above, parameters necessary for the device operation for each magnetic head $H_k$ (k=1, ..., K) are learned as shown in FIG. 11. That is, (1) firstly, using a perpendicular magnetic recording medium and a microwave assisted magnetic recording head of the present invention, bias recording current $I_{WB}$(k, p, j) and STO driving current $I_{STO}$(k, p, j) are found so as to achieve the most favorable characteristic for each sector Sj at a predetermined track of zone $Z_p$(p=1, ... P) of the perpendicular magnetic recording medium with TFC input power $P_{TFC}$(k, p) (clearance) and predetermined linear recording density. Then, considering characteristic variations, a set of bias recording current $II_{WB}$(k, m) and STO driving current $II_{STO}$(k, n) to be examined is stored appropriately for each zone $Z_p$ in predetermined memory of FIG. 4 as a parameter table (Table 1) shown in FIG. 12;

(2) when a HGA is mounted at a magnetic storage device, the floating posture of the magnetic head typically changes, and so clearance-TFC profile changes. Then, TFC input power yielding predetermined clearance is evaluated at a predetermined track of a predetermined zone $Z_p$ p=1, ... P) under conditions of predetermined bias recording current $II_{WB}(0)$ and predetermined STO driving current $II_{STO}(0)$, and the value thereof is set as the initial value $PP_{TFC}(0)$, and the clearance-TFC profile is calibrated using this value, where index k is omitted for simplicity;

(3) recording/reproducing characteristics such as an error rate of a magnetic head $H_k$ (k=1, ... K) are evaluated at predetermined zone $Z_p$ (p=1, ... P) for each sector $S_j$ at predetermined linear recording density and at the thus calibrated TFC input power $P_{TFC}(k, p)$ (p=1, ... P) in accordance with the parameter table of Table 1 and further in accordance with the combination of $II_{WB}(k, m)$ and $II_{STO}(k, n)$ as arrows in the table. In the present embodiment, a non-RS channel using LDPC code is used, and evaluation is performed using a sector error rate as an index;

(4) among the sets of $II_{WB}(k, m)$ and $II_{STO}(k, n)$ free from failures other than at a defective part and having the sector failure rate of 0, a plurality of sets of bias recording current having small STO driving current (i.e., small index n) are selected for all sectors;

(5) under the magnetic head operation condition of such a combination, clearance CL and TFC input power $PP_{TFC}$ at that time are evaluated;

(6) a plurality of sets having the value of the above clearance CL that is minimum clearance CL(c) or more to achieve predetermined reliability and is not more than CL(c)+δ are selected, and a parameter having the smallest m and n within the above-mentioned accepted values (the smallest bias recording current and STO driving current) is set as standard values $BP_{TFC}$, $BI_{WB}$ and $BI_{STO}$, i.e., parameters of B mode. Then, among the set having the largest index m, a parameter having the minimum index n (the maximum bias recording current and the minimum STO driving current) is set as assist enhancement value $AP_{TFC}$, $AI_{WB}$ and $AI_{STO}$, i.e., parameters of A mode; and (7) these A mode B mode parameters are stored for each magnetic head $H_k$ in the parameter table of FIG. 13 (Table 2).

In the above, it is preferable that the bias recording current in the range of 5 to 60 mA and the STO driving current in the range of 1 to 15 mA are examined, and overshoot $II_{WOV}$ and $II_{SOV}$ are provided for the bias recording current and the STO driving current, respectively, for fast rising, thus optimizing the aforementioned various characteristics. It is further preferable that, in the above, a threshold to divide the recording mode is divided into three or more as in A, B, C . . . .

The non-RS channel method using LDPC code as in the present embodiment does not have an idea of ECC, and an error is corrected by repeated decoding algorithm in the Reed channel. Then, an error rate after error correction only can be measured, and so recording performance is evaluated using the sector failure rate as an index. On the other hand, when the error correction ability in the non-RS channel using LDPC code is limited to be under a condition where an error easily occurs or when a RS channel is used, evaluation may be performed using a normal error rate as an index. A parameter for each zone $Z_p$ may be set at a predetermined track of typical three zones including inner radius, middle radius and outer radius, values thereof may be stored in a parameter table, and parameters for other zones may be obtained by correction of these values using a conversion equation found beforehand. More preferably TFC profile during recording and reproducing may be obtained by adjusting TFC for each track using this correction as needed for the parameter correction at each track.

Next, the distribution of characteristics variations for each sector of a perpendicular magnetic recording medium is evaluated as follows. Firstly recording is performed at a self-track using B-mode parameters that are the aforementioned standard conditions at a predetermined track position of a predetermined zone (e.g., the innermost radius zone $Z_0$), and recording is then performed at an adjacent track (tracks) on one side or both sides of the self-track at predetermined linear recording density BPI with an optimum predetermined squeezing amount to evaluate the characteristics distribution found beforehand by an experiment, thus evaluating a sector failure rate after error correction. FIGS. 14 and 15 show the sector position dependence of sector failure rates before and after the one-side adjacent track squeezing recording of the self track. That is, as shown in FIG. 14, an error does not occur at each sector in an on-track state when recording under the optimum conditions, whereas as shown in FIG. 15, when the self-track is narrowed from the adjacent track, then a sector with less margin (recording is not sufficient) will be a defective sector. Herein, medium 2 having smaller distribution of characteristics has a smaller area composed of defective sectors (defined as a defective area) having the acceptance rate (sector pass rate) not larger than 0.5 than medium 1, and as can be seen from the comparison between FIG. 2 and FIG. 15, both of these defective areas have lower overwrite performance, which correspond to a medium area having difficulty in writing. As a result of the evaluation of ATI characteristics that evaluates resistance to errors after recording at the position of the adjacent track few hundreds or few thousands times, similar sector dependence is shown, although the degree of influences is less.

Instead of narrowing the self-track from the adjacent track as stated above, bias recording current and/or STO driving current may be made smaller intentionally for recording under the insufficient conditions.

In this way, a normal sector and a defective sector are separated at each zone, and sector information thereon or the sector areas are registered, which are used for recording/reproducing operations of the magnetic storage device. Since the defective sectors are distributed continuously in the substantially radius direction of the perpendicular magnetic disk, the above evaluation on distribution may be performed at typical sectors of inner radius, middle radius and outer radius, and based on the data, the distribution at other zones may be found by interpolation.

(Control of Magnetic Storage Device)

The following describes a method for controlling of the present embodiment for recording/reproducing with respect to a magnetic storage device using the aforementioned data.

In response to an instruction to record/reproduce information from a host or a higher-level system such as a PC, and under the control of the MPU 510 as a main controller of the magnetic storage device, the perpendicular magnetic recording medium 501 is rotated by the spindle motor 500 at a predetermined number of revolutions. Then, a magnetic head $H_k$, which is loaded on the perpendicular magnetic recording medium to perform recording/reproducing of predetermined information, detects a position on the medium using a reproducing signal from servo information on the perpendicular magnetic recording medium. Based on the positional signal, a trace to a target position is calculated, and the VCM drive controller of the drive controller 520 controls a Voice Coil Motor (VCM) 522, thus moving (seek operation) the high-rigidity actuator 506 and the magnetic head 505 to a predetermined recording track at a predetermined zone $Z_p$ of the perpendicular magnetic recording medium rapidly and precisely, thus allowing the magnetic head to follow to the track position. Then, recording/reproducing of information is performed as follows by a firmware program of the MPU at a predetermined sector $S_j$ on the track.

For information recording, the host interface controller 517 receives a recording instruction from the host and recording data. Then, the MPU 510 decodes the recording instruction, and stores the received data in buffer memory if needed. In the case of a RS channel, after the addition of Cyclic Redundancy Check (CRC) at the HDC 511 and conversion of Run-Length Limited (RLL) coding, ECC coding is added. Then, the addition of parity and write precompensation, for example, are performed by a recording/modulation system of the R/W channel 509, thus forming recording data. In the case of a non-RS channel, after the addition of CRC at the HDC and conversion of RLL coding, LDPC is added by a R/W channel and write precompensation, for example, is performed, thus forming recording data.

Next, a write gate to instruct the starting (recording timing) of data recording by the magnetic head $H_k$ 503 of the signal data 513 at sector $S_j$ on the perpendicular magnetic recording medium is issued from the HDC to the R/W channel 509, whereby a recording signal (recording current) corresponding to the signal data 513 supplied from the R/W channel 509 is generated in response to the input of the write gate, the recording current together with a STO driving signal (driving current signal or driving voltage signal) with a controlled current-application timing is supplied to the recording head part of the magnetic head $H_k$ via FPC wiring 507, and so recording is performed by microwave assisted magnetic recording at sector $S_j$ in the recording track of the predetermined zone on the perpendicular magnetic recording medium. Herein, the optimum values $SP_{TFC}(k,m)$, $SI_{WB}(k,m)$ and $SI_{STO}(k,m,n)$ of the TFC input power, the bias recording current and the STO driving current for magnetic head $H_k$ at zone $Z_p$, which are found by the above step, are stored in the register of the head driver from the memory, and the microwave assisted magnetic recording head is driven as follows using such data.

That is, in the present embodiment, bias recording current and STO driving current are set at A-mode parameters in Table 2 (FIG. 13) at a defective sector position, and at other sectors, recording is performed with B-mode parameters. To this end, their predetermined timing and parameters are copied from the memory to the register for storage, and recording/reproducing is performed therewith.

Figure 16:
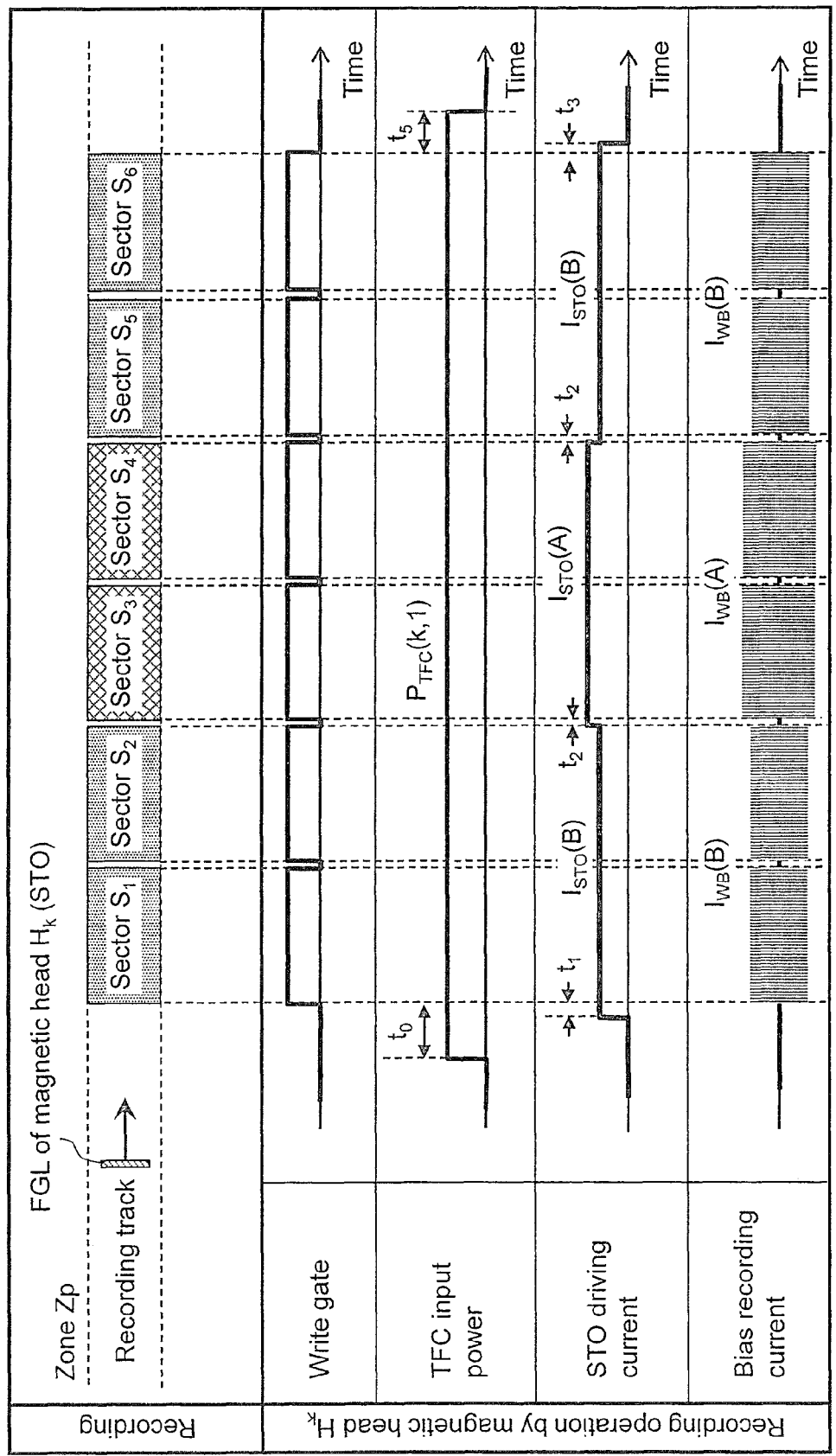
FIG. 16 is an exemplary timing chart for the step where data are recorded while adjusting the set of $I_{STO}$ and $I_{WB}$ for each sector.

Referring to FIG. 16, the following describes recording of data by the method of the present embodiment in response to an information recording instruction from the MPU. FIG. 16 shows the case where data of 24 kB for 6 sectors is recorded at data sectors $S_1$ to $S_6$ having the sector size of 4 kB (4096 B) at a predetermined data track of zone $Z_p$ using magnetic head $H_k$. The following exemplifies the case including the defective sectors that are sectors $S_3$ and $S_4$.

In the example of FIG. 16, bias recording current and STO driving current are averaged in the group of the defective sectors and in a group of other sectors, and their average values are called $I_{WB}(A)$ and $I_{STO}(A)$ for A-mode and $I_{WB}(B)$ and $I_{STO}(B)$ for B-mode. For starting of recording at the first sector $S_1$, the aforementioned predetermined TFC input power $P_{TFC}(k,p)$ is supplied $t_o$ before the write gate, thus adjusting clearance between the magnetic head and the perpendicular magnetic recording medium. Herein, $t_o$ is time required to substantially stabilize the clearance, and the magnetic head of the present embodiment has $t_0$ of 0.05 to 0.2 ms.

Next, STO driving current $I_{STO}(B)$ is applied $t_1$ before the write gate and bias recording current $I_{WB}(B)$ is applied at the timing of opening the write gate, thus recording information.

Herein $t_1$ is time required to stabilize the oscillation of the STO, which is preferably 0.3 ns or more. Since the present embodiment uses a circuit of 10 ns that is the rising time of the STO driving current, $t_1$ is set at 11 ns, which includes this time and 1 ns added as margin for the stabilization time. If needed, this time can be shortened using a STO drive circuit that can quickly rise. In the following present embodiment, TFC input power and STO driving current are kept ON until the recording of all information is finished, and bias recording current is turned ON and OFF in accordance with opening and closing of the write gate, whereby data are recorded at data sectors.

For starting of recording data at the first defective sector $S_3$, STO driving current is set at $I_{STO}(A)$ of A-mode $t_2$ before the opening of a write gate to $S_3$, and then bias recording current also is set at $I_{WB}(A)$ of A-mode in synchronization with the opening of the write gate for recording.

After recording at sectors $S_3$ and $S_4$ is finished, recording is then shifted to normal sector $S_5$. At this time, STO driving current is set at $I_{STO}(B)$ of B-mode $t_2$ before the opening of a write gate to start recording to sector $S_5$, and bias recording current also is set at $I_{WB}(B)$ of B-mode in synchronization with the opening of the write gate for recording. Herein $t_2$ is preferably 0.1 to 0.3 ns or more, and $t_2$ in the present embodiment is time corresponding to a sector gap.

Finally after finishing recording at normal sector $S_6$, $I_{STO}(B)$ of STO driving current is turned OFF $t_3$ after closing of the write gate, and then after $t_5$, TFC input power $P_{TFC}(B)$ is turned OFF. Herein $t_3$ may be 0.1 to 0.3 ns or more like $t_2$. Although $t_5$ may be zero or more, $t_5$ in this example is time equivalent to $t_0$ because simultaneous turning-off with bias current leads to large heat shock.

Another method of performing recording/reproducing using parameters of Table 2 for each sector is examined. Although load required to recording/reproducing operations becomes high, this method is especially preferable because characteristics can be improved greatly compared with the example using two conditions of A and B.

That is a description on the example where sector Sj is a data sector, and similar improvement effects can be obtained from the example where sector Sj is a servo sector. It is preferable, however, to optimize recording characteristics for each data sector because processes such as evaluation of a sector error rate can be simple when using a non-RS channel suitable for high-density.

For information reproducing, the host interface controller 517 receives a reproduction instruction from the host. Then, the magnetic head $H_k$ 503 selected and positioned similarly to the recording and having clearance controlled for reproduction reads a reproduction signal. The reproduction signal is then amplified by R/W-IC and is transferred to the R/W channel 509 such as a RS channel using Reed Solomon code or a non-RS channel using LDPC code. In the case of the RS channel, decoding by signal processing, decoding of parity and the like are performed, and then the HDC performs error correction by ECC, RLL decoding and checking the presence or not of an error by CRC. In the case of the non-RS channel, an error is corrected by LDPC in the R/W channel, and then the HDC performs RLL decoding and checking the presence or not of an error by CRC. Finally, such information is buffered in a buffer memory, and is transferred, as reproduction data, from the host interface controller 517 to the host.

(Advantageous Effects)

When a high-frequency magnetic recording signal (recording current) is applied to a magnetic core of a conventional main-pole shielding type perpendicular magnetic recording head, heat generated due to magnetic core loss makes a magnetic pole protrude, thus reducing clearance. If recording current is increased at a part with difficulty in recording as in the present embodiment, then (a) the improvement effect from the increased current is small because the perpendicular recording is near the recording limit, and (b) very large recording current has to be applied compared with a part of easy-recording for the equivalent effect, and heat generated by the magnetic core loss makes clearance very small, causing problems about durability reliability such as wear of the magnetic pole and damage of the medium, and causing failures up to 2 to 3% in the reliability test.

According to the present embodiment using the microwave assisting effect, such a saturation phenomenon can be suppressed greatly, and recording efficiency can be greatly improved by adding small recording current that is a fraction of the conventional one. Unlike the conventional technique of recording data at each sector without changing recording current, a recording condition is selected from at least two types of recording conditions in accordance with the sector characteristics, and information is recorded at each sector. That is, bias recording current is set slightly lower (B mode) than the average value of the entire track at a part of easy-reading, and the value is set slightly higher (A mode) at a part with difficulty in recording. Thereby sufficient recording can be performed at each sector, and clearance change can be suppressed to a practical sufficient range. As a result, the amount of δ that can maintain practically enough reliability can be obtained as margin of clearance, and a failure rate in the reliability test can be made zero.

Further, data are recorded at a medium area having difficulty in recording with the current of A-mode larger than the current for recording of one round of a track at a constant value, whereby more intense microwave assisted effect can be obtained as compared with the case of recording of one round of the perpendicular magnetic recording medium (entire zone) at a constant value, thus enabling ideal recording. Then compared with the conventional technique of recording at all sectors with a constant value, margin in terms of an error rate of the magnetic head, even when the margin thereof is at a barely acceptable level, can be improved by 0.4 digit when the parameters of Table 2 are averaged at the normal sectors and the defective sectors and by 0.6 digit when using parameters of Table 2 for each of all sectors.

In the case of recording at one round (entire zone) of the perpendicular magnetic recording medium with a constant value, excessing recording will be performed at a region where side recording easily occurs, thus expanding the area of side writing and side erasing. On the other hand, recording at an area of easy-recording at B mode with current smaller than the constant value enables optimum recording. Then, off-track margin of a magnetic head having the margin that is at a barely acceptable level can be improved by 0.5 nm (when the parameters of Table 2 are averaged at the normal sectors and the defective sectors) and by 0.7 nm (when using parameters of Table 2 for each of the sectors).

As stated above, the present embodiment can improve an error rate by 0.4 digit while keeping the off-track margin when averaging the parameters of Table 2 at B mode and A mode for normal sectors and defective sectors, respectively, and can improve an error rate by 0.6 digit while keeping the off-track margin when using the parameters of Table 2 for each sector. The error rate to determine the recording density of a magnetic storage device is determined by not the average property of the perpendicular magnetic recording medium but the area having the worst recording performance where the errors occur the most. Further in the case of a plurality of magnetic heads included in a magnetic storage device, the yield of the magnetic storage device is determined by the magnetic head having the worst characteristics. According to the present embodiment, the yield of the magnetic storage device can be improved by 4 or 6 points, thus leading to a favorable effect for mass production.

Such an effect is found when the distribution of characteristics of a perpendicular magnetic recording medium in the circumferential direction is 0.1% or more. The present embodiment, however, cannot deal with the case of the distribution of characteristics in the circumferential direction exceeding 10% and the reliability is degraded, and so the variations in characteristics of a perpendicular magnetic recording medium in the circumferential direction is preferably 10% or less and more preferably 5% or less.

[Embodiment 2]

Figure 17:
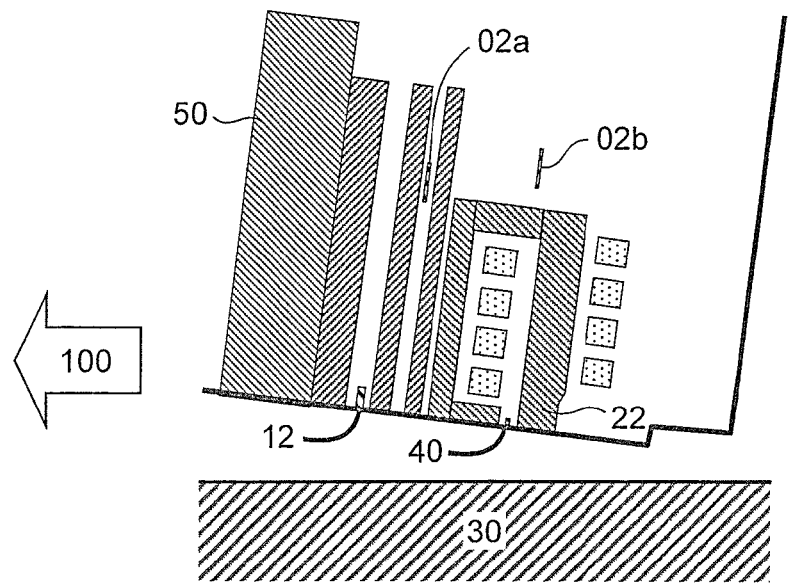
FIG. 17 shows an exemplary structure in the vicinity of a recording gap of a microwave assisted magnetic recording head.
Figure 18:
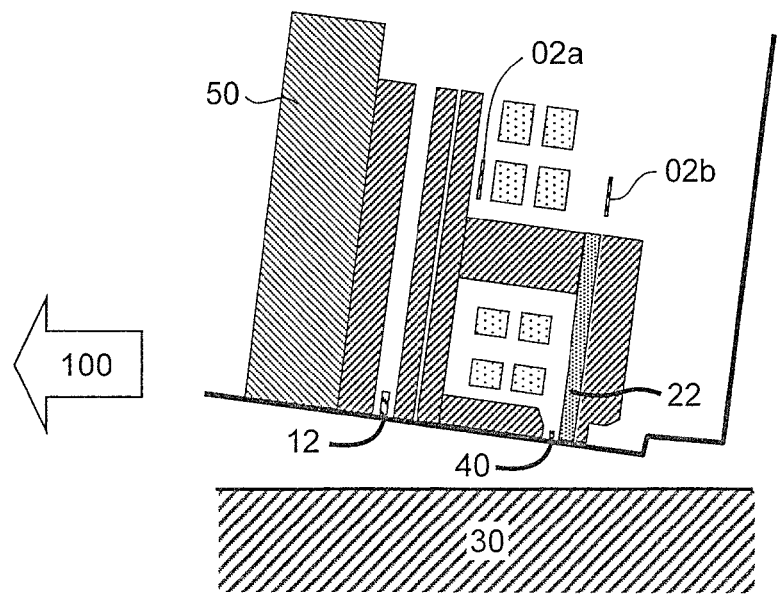
FIG. 18 shows an exemplary structure in the vicinity of a recording gap of a microwave assisted magnetic recording head.
Figure 19:
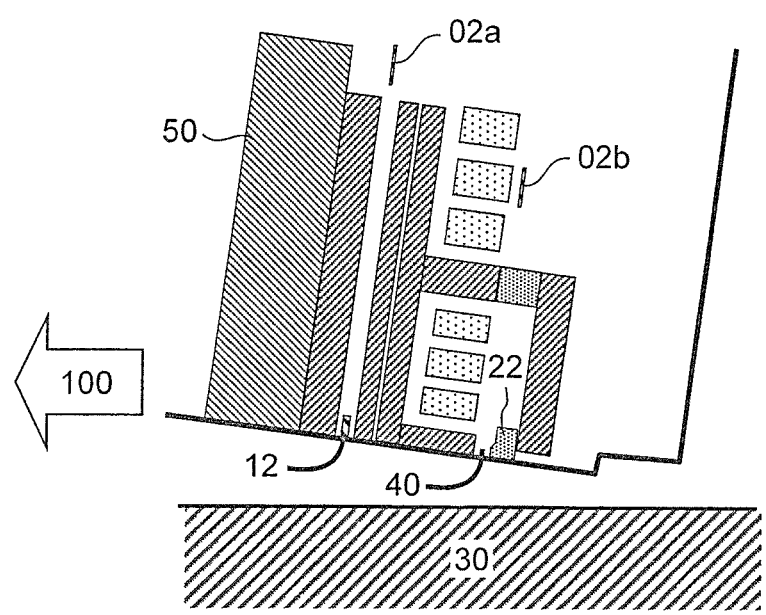
FIG. 19 shows an exemplary structure in the vicinity of a recording gap of a microwave assisted magnetic recording head.

FIGS. 17, 18 and 19 are schematic cross-sectional views of a magnetic head and a perpendicular magnetic recording medium in a magnetic storage device provided with a microwave assisted magnetic recording head of the present embodiment. The details are as follows:

(1) Structure of a magnetic storage device shown in FIG. 17
slider 50: thin long femto type (1×0.7×0.2 mm)
head protective film (FCAC): 1.8 nm
sensor element 12: TMR ($T_{wr}$=30 nm)
first magnetic recording pole 22: FeCoNi ($T_{ww}$=100 nm, 80 nm)
STO 40: CoFeGe (10 nm)/Cu (2.5 nm)/Co/Ni (10 nm)
FGL width: $W_{FGL}$=36 nm
medium substrate: 3.5-inch NiP plated Al alloy substrate
medium structure: lubricant film (1 nm)/C (2 nm)/CoCrPt (SiTi)O$_2$ (2 nm)/CoCrPtSiO$_2$C (10 nm)/Ru (10 nm)/ CoFeTaZr (10 nm)/Ru(0.5 nm)/CoFeTaZr (10 nm)

(2) Structure of a magnetic storage device shown in FIG. 18
slider 50: femto type (0.85×0.7×0.23 mm)
head protective film (FCAC):1.4 nm
sensor element 12:CPP-GMR ($T_{wr}$=23 nm)
first magnetic recording pole 22: CoFe ($T_{ww}$=100 nm, 65 nm)
STO 40: (Co/Fe) (11 nm)/Cu (3 nm)/(Co/Ni) (9 nm)
FGL width:$W_{FGL}$=28 nm
medium substrate: 2.5-inch glass substrate
medium structure: lubricant layer (0.8 nm)/C (1.6 nm)/ CoCrPt(SiTiNb)O$_2$C (11 nm)/Ru (10 nm)/CoFeTaZr (15 nm)/Ru (0.5 nm)/CoFeTaZr (15 nm)

(3) Structure of a magnetic storage device shown in FIG. 19
slider 50: thin long femto type (1×0.7×0.2 mm)
head protective film (FCAC):1 nm
sensor element 12:CPP-GMR ($T_{wr}$=16 nm)
first magnetic recording pole 22: CoFe ($T_{ww}$=100 nm, 50 nm)
STO 40: (Co/Fe) (12 nm)/Cu (2 nm)/(Ni/Co) (8 nm)
FGL width: $W_{FGL}$=20 nm
medium substrate: 2.5-inch glass substrate
medium structure: lubricant layer (0.6 nm)/C (1.1 nm)/ CoCrPtFe(SiTi)O$_2$C (3 nm)/CoCrPtAuSiO$_2$C (7 nm)/ Ru (10 nm)/CoFeTaZr (20 nm)/Ru (0.5 nm)/CoFeTaZr (20 nm)

As shown in FIGS. 17 to 19, each magnetic head slider is provided with thermal expansion elements (TFC) 02a and 02b including a W or NiCr thin film with resistance of 80 to 120Ω for clearance control. In these examples, each element is controlled independently for clearance control. The clearance may be controlled by adjusting the resistance values and connecting them in series.

Microwaves from the microwave assisted magnetic recording head of the present embodiment is circular polarized on both sides of the FGL film and is linear polarized just thereunder, and has typical oscillation frequency of 10 to 35 GHz and typical microwave magnetic intensity is 500 Oe to 3 kOe. The perpendicular magnetic recording media shown in FIGS. 17, 18 and 19 have the distribution of coercive forces in the circumferential direction of ±0.5%, ±1% and ±2%, respectively.

(Magnetic Storage Device and Adjusting Method Therefor)

The present embodiment uses the aforementioned high-coercivity perpendicular magnetic recording media accepted by predetermined examinations and test, and a recording/reproducing experiment and selection of magnetic heads are performed using the recording characteristics evaluation equipment similar to Embodiment 1 while setting clearance of the recording/reproducing part at 1.5 nm and 1 nm, respectively. Next, six, four and two of the microwave assisted magnetic recording heads of (1), (2) and (3) as stated above that are accepted by the test and three, two and one piece of the perpendicular magnetic recording media are mounted at 3.5", 2.5" and 2.5" type HDA or magnetic storage devices, respectively, and predetermined servo information as shown in FIG. 9 is recorded at a servo area 401 by a servo track writer or by a self servo write method.

Then squeeze characteristics, Adjacent Track Interference (ATI) characteristics, 747 characteristics and the like are evaluated for each magnetic head in the manufacturing process of a magnetic storage device, thus determining an optimum data track profile and such a linear recording density profile, and finding a conversion equation to a servo track profile. Finally, optimum track density for each zone and an optimum linear recording density profile are determined so that predetermined areal recording density is satisfied and the error rate becomes substantially uniform at the entire zone (adaptive formatting), and predetermined parameters necessary for the above conversion and recording/reproducing operations are stored in a memory, thus configuring a magnetic storage device having predetermined capacity.

Figure 20:
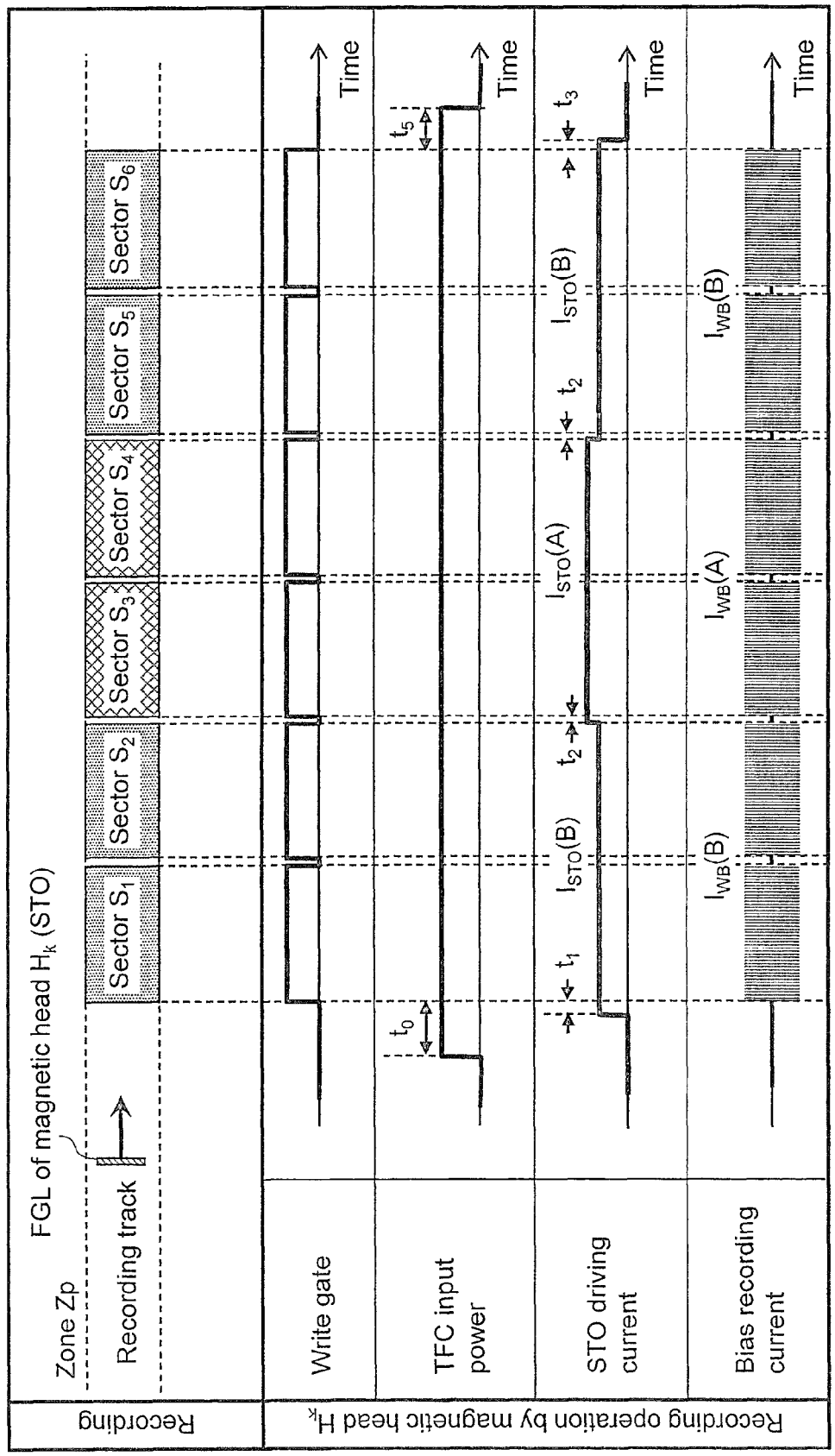
FIG. 20 is an exemplary timing chart for the step where data are recorded by adjusting $I_{STO}$ for each sector.

Then parameters of each magnetic head $H_k$ are adjusted by the process similar to the flowchart of FIG. 11. That is, similarly to Embodiment 1, a non-RS channel using LDPC code is used. In the present embodiment, the error correction ability is limited, and an error rate is evaluated under the condition where an error easily occurs. As shown in FIG. 20, parameters are adjusted in the present embodiment so that record-assisting is performed only by adjusting the STO driving current and not changing the bias recording current even at areas including sectors $S_3$ and $S_4$ having difficulty in recording. TFC input power shows sector dependence for the TFC element $O_2b$, and the same sector dependence is set for $02a$ as well (the absolute value thereof is adjusted). Then, similarly to Embodiment 1, timing such as $t_0, t_1, t_2, t_3$ and $t_5$ is adjusted. The thus obtained parameters of B mode (standard condition) and A mode (assist enhancement condition) are organized as shown in FIG. 21, which is stored in the memory as a parameter table (Table 3), thus configuring a magnetic storage device.

(Advantageous Effects)

Similarly to Embodiment 1, sufficient recording is performed in the present embodiment using A mode at a medium area having difficulty in recording. Then compared with the conventional technique of recording only using B mode, margin in terms of an error rate of the magnetic heads, having configurations of FIGS. 17, 18 and 19 and even when the margin thereof is at a barely acceptable level, can be improved by 0.5 digit, 0.5 digit and 0.6 digit, respectively. The present method is applied to servo information recording as well. As a result, the quality of servo signals also can be improved similarly, and selection yield of magnetic heads can be improved by 5 points, 5 points and 7 points, respectively.

Recording at one round (entire zone) of the perpendicular magnetic recording medium with A mode only causes excessing recording at an easy-recording area where recording is enabled with B mode, thus expanding the area of side writing and side erasing. Then, off-track margin at the easy-recording area is narrowed by 0.7 nm, 0.6 nm and 0.4 nm in the configurations of the above (1), (2) and (3), respectively. On the other hand, the present embodiment can improve the error rate by 0.4 digit, 0.5 digit and 0.6 digit, respectively while keeping the off-track margin, and so the device yield can be improved by about 5 points in all of the configurations.

[Embodiment 3]

Figure 22:
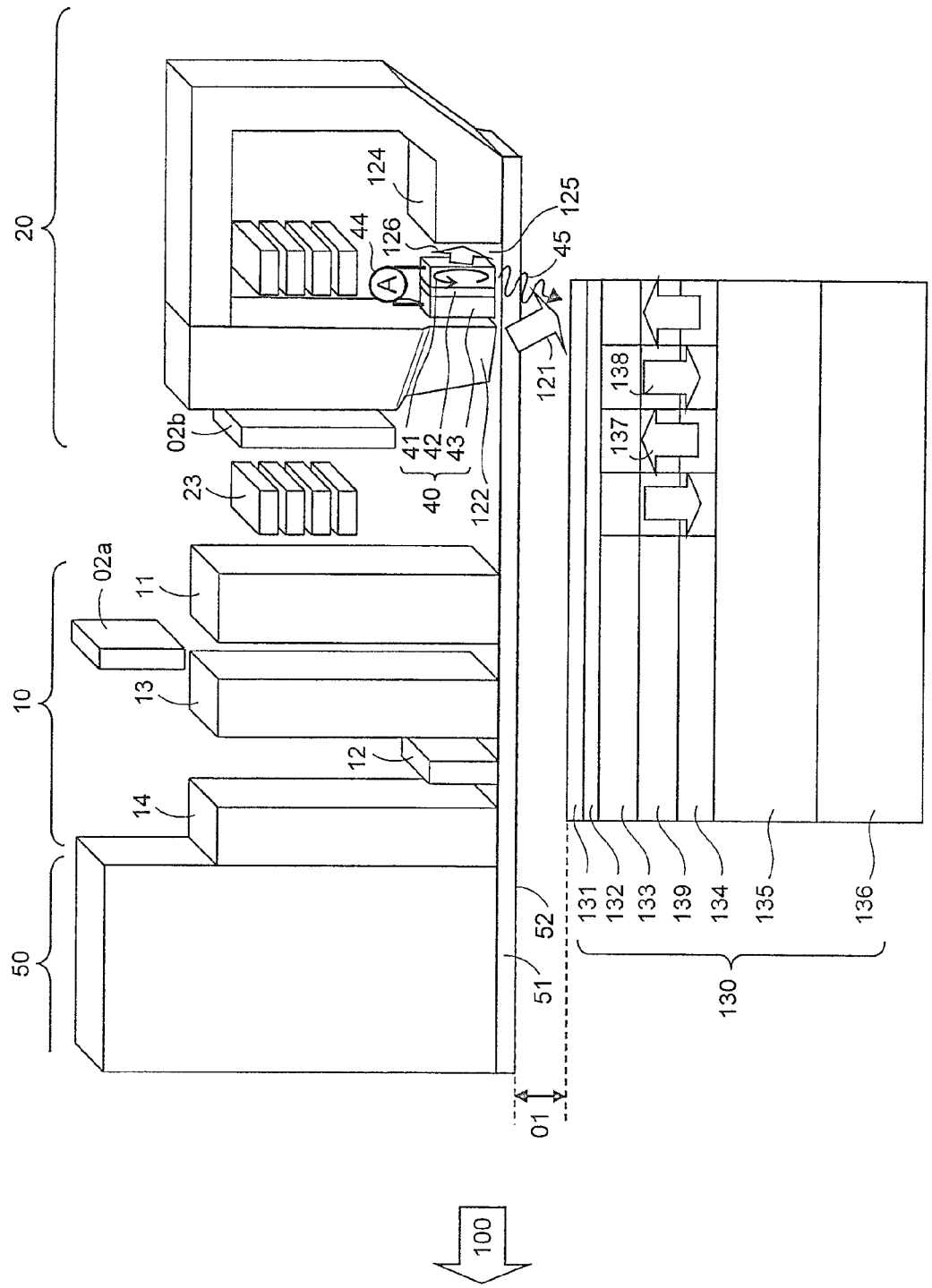
FIG. 22 is a conceptual diagram showing exemplary microwave assisted magnetic recording head and perpendicular magnetic recording medium.
Figure 23:
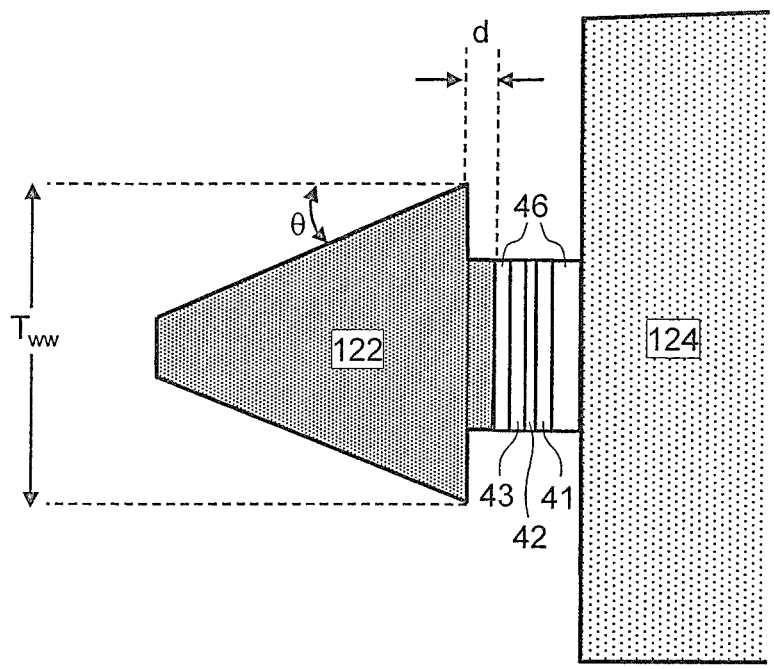
FIG. 23 shows a structure of a magnetic pole part of the microwave assisted magnetic recording head of FIG. 22 that is viewed from the ABS face.

Referring to FIGS. 22 and 23, the following describes an embodiment using a microwave assisted magnetic recording head having another configuration. FIG. 22 schematically shows a cross-section of a microwave assisted magnetic recording head of the present embodiment and a perpendicular magnetic recording medium, and FIG. 23 schematically shows a recording head part viewed from the ABS face.

(Microwave Assisted Magnetic Recording Head)

The microwave assisted magnetic recording head of the present embodiment basically has the same configuration as those of Embodiments 1 and 2 (FIG. 1) except for the magnetic recording pole. In the drawing, it includes a slider 50, a head protective layer 51, a floating face 52, a STO 40, a reproducing head part 10, a shield layer 11, a reproduction sensor element 12, upper and lower magnetic shields 13 and 14 and TFC element $02a$ and $02b$ and the like.

As shown in FIG. 23 that is a structure of a magnetic pole part viewed from the ABS face, a magnetic recording head part 20 includes: a magnetic recording pole (main pole) 122 that is formed by etching to have a substantially same width as the STO 40 and is shaped so as to generate perpendicular recording field 121 having a substantially same width as that of high-frequency magnetic field 45; a shield magnetic pole 124 to control a magnetization rotating direction or the like of the STO 40; and a coil 23 made of Cu or the like to excite the magnetic recording pole. The etching depth d that is to form a protrusion having the same width as that of the STO 40 on the STO side of the magnetic recording pole 122 is about 5 to 40 nm, preferably 10 to 20 nm in terms of balance between magnetic field distribution and magnetic field intensity. A magnetic gap 125 is provided between the magnetic recording pole 122 and the shield magnetic pole 124, and STO oscillation control magnetic field 126 controls the magnetization direction and the magnetization rotating direction of the STO 40.

The magnetic recording pole 122 includes a high-saturation magnetic flux density soft magnetic film made of FeCoNi, CoFe alloy or the like, which is formed by plating, sputtering or the like so as to have a trapezoidal shape having a bevel angle of 10 to 20 degrees and have a cross-sectional area decreasing with increasing proximity to the ABS face. The width $T_{ww}$ of the recording element on the wider side of the trapezoidal magnetic recording pole is designed and processed suitably for the target magnetic recording field and such recording density, and the size thereof is about 160 nm to 10 nm. The magnetic recording pole 122 may have a so-called Wrap Around Structure (WAS), in which the magnetic recording pole 122 and the shield magnetic pole 124 are formed with a soft magnetic alloy thin film such as CoNiFe alloy or NiFe alloy, and the magnetic recording pole 122 is surrounded via a non-magnetic layer.

A perpendicular magnetic recording medium 130 includes three magnetic layers of 133, 139 and 134, where the outermost face receiving the strongest microwave assist effect has large magnetic anisotropy field $H_k$, and elements and thickness of the magnetic films are adjusted so that recording cannot be performed sufficiently with magnetic recording field from the magnetic recording pole 122 and sufficient recording is enabled only when the STO 40 currently acts. The perpendicular magnetic recording medium of the present embodiment has the distribution of coercive force of ±2.5% depending on the circumferential position at the inner radius, middle radius and outer radius.

The following describes structures and elements of the microwave assisted magnetic recording head and the perpendicular magnetic recording medium of the present embodiment.

slider 50: thin long femto type (1×0.7×0.2 mm)
FCAC 51: 1.8 nm
sensor element 12: TMR ($T_{wr}$=30 nm)
magnetic recording pole 122: FeCoFe($T_{WW}$=60 nm), d=15 nm, θ=15°
shield magnetic pole 124: FeCoNi
STO 40: Ta (4 nm)/(Co/Fe) (12 nm)/Cu (2 nm)/(Ni/Co) (8 nm)/Cr (4 nm)
FGL width: $W_{FGL}$=34 nm
medium substrate: 3.5-inch NiP plated Al alloy substrate
medium structure: lubricant film (1 nm)/C (2 nm)/CoCrPtB(SiTi)$O_2$ (4 nm)/CoCrPt(SiTa)$O_2$ (4 nm)/CoCrPtSi$O_2$C (4 nm)/Ru (10 nm)/CoFeTaZr (10 nm)/Ru (0.5 nm)/CoFeTaZr (10 nm)

The lamination of high-melting point metal such as Ta, Ru and Cr, a FGL and a spin injection layer improves electromigration resistance of the STO element, and the magnetic pole is common to the electrode for STO drive power supply. As shown in FIG. 22, the magnetic head slider 50 is provided with thermal expansion elements TFCs 02a, 02b including a NiCr thin film with resistance of 80Ω for clearance control. Microwaves from the microwave assisted magnetic recording head of the present embodiment is circular polarized on both sides of the FGL 41 and is linear polarized just thereunder, and has typical oscillation frequency of 20 to 30 GHz and typical microwave magnetic intensity is 1 kOe to 2 kOe.

(Magnetic Storage Device and Adjusting Method Therefor)

Using the recording characteristics evaluation device similar to Embodiments 1 and 2, recording/reproducing characteristics are evaluated while setting clearance of the recording/reproducing part at 1.5 nm and 1 nm, respectively. Ten of the microwave assisted magnetic recording heads that are accepted by a predetermined characteristics test and five pieces of the perpendicular magnetic recording media are mounted at a 3.5" type magnetic storage device, and they are adjusted in the manufacturing process similarly to Embodiment 2, thus manufacturing a magnetic storage device. As shown in FIG. 20, similarly to Embodiment 2, record-assisting is performed only by adjusting the STO driving current and not changing the bias recording current even at areas including sectors $S_3$ and $S_4$ having difficulty in recording. TFC input power shows sector dependence for the TFC element 02b, and the same sector dependence is set for 02a as well (the absolute value thereof is adjusted). Then, similarly to Embodiment 1, timing such as $t_0$, $t_1$, $t_2$, $t_3$ and $t_5$ is adjusted. The thus obtained parameters of A mode and B mode are organized as shown in FIG. 21, which is then stored in the memory as a parameter table (Table 3).

The parameter table (Table 3) registers, as initial values, the control values at a room temperature (30° C.) in the device. Actually, however, the value of clearance changes due to thermal expansion when the temperature changes. Further, coercivity of perpendicular magnetic recording has large temperature dependence of about 20 Oe/° C., meaning that coercivity increases as the temperature decreases, and so it becomes difficult to record. On the other hand, at a high temperature, the coercivity decreases, meaning easy recording, so that side writing and side erasing increase, and resistance for adjacent squeeze and ATI deteriorates. Then the present embodiment performs temperature correction. That is, clearance evaluation test and recording/reproducing characteristics test are performed at various temperatures beforehand using a magnetic storage device separately assembled, and a conversion equation to a control value per unit temperature is found by experiments. Finally, this parameter is incorporated into the parameter table of the magnetic recording device, and then a firmware program is created for temperature correction in accordance with such a table.

Figure 24:
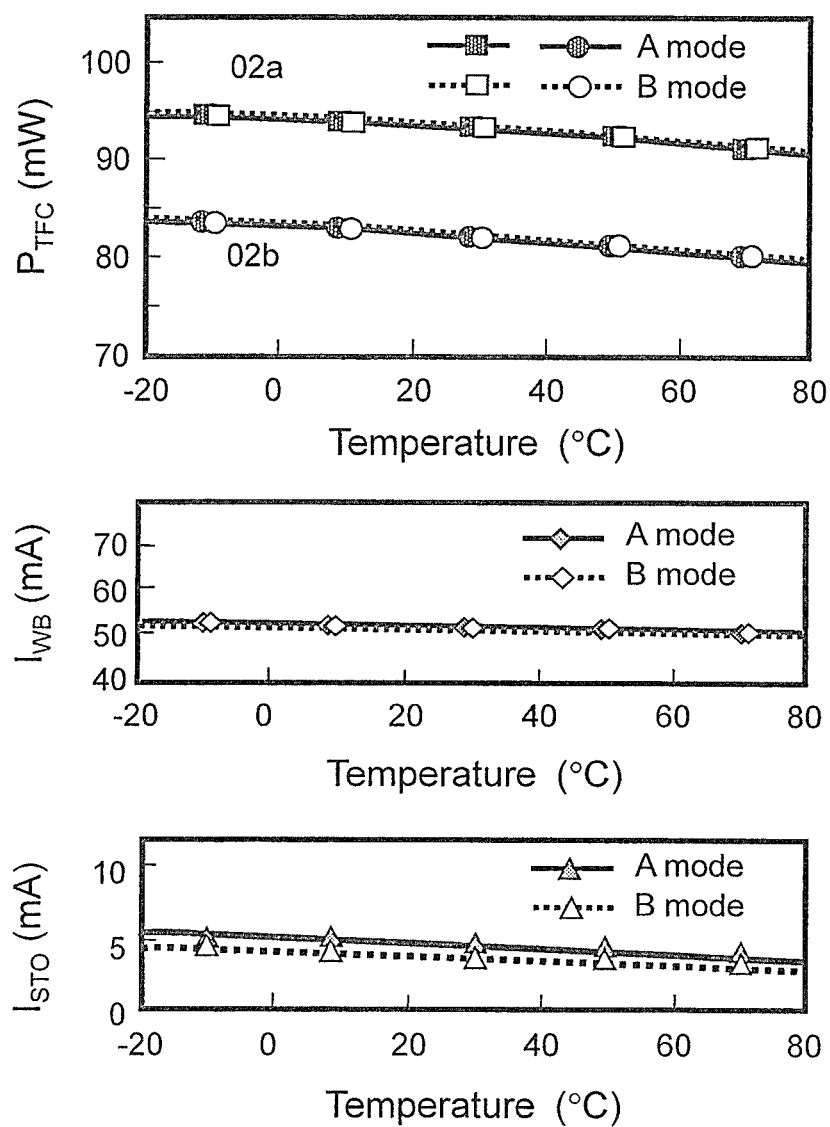
FIG. 24 shows exemplary temperature dependence of $P_{TFC}$, $I_{WB}$ and $I_{STO}$ in the controlling method to record data while adjusting $I_{STO}$ for each sector.

When the environment temperature of the magnetic storage device in actual operation changes, a temperature sensor provided in the device reads a temperature T, and a temperature difference Δ from the room temperature is calculated. Then, the temperature correction value is added to the initial value for temperature correction as shown in FIG. 24. That is, although the TFC input power and the bias current are kept at the same values irrespective of modes, the TFC input power has temperature dependence such that the value increases as the temperature drops and the value decreases as the temperature rises, and the bias current is made substantially constant. The STO driving current is set larger at A mode than at B mode, and further has temperature dependence such that the value increases as the temperature drops and the value decreases as the temperature rises in any mode. Resonance of the mechanical system also changes greatly with temperatures, and so a thermal notch filter having characteristics changing with temperatures is currently introduced so as to suppress influences of Non-repeatable Run-Out (NRRO), thus learning as needed and thus configuring a more stable control system to position magnetic heads.

(Advantageous Effects)

Unlike Embodiment 1, the present embodiment sets the same bias recording current, which greatly affects the clearance, for A mode and B mode. This can make the clearance constant for the entire round of zones, and so the margin δ described in Embodiment 1 (FIG. 11) can be made smaller by 0.4 nm. As a result, the setting value of a critical value CL(c) of the clearance can be made smaller by 0.2 nm. Then, the average error rate can be decreased by about 0.2 digit and the yield of the magnetic storage device can be increased by about 6 points.

Since the present embodiment includes the STO that is the lamination of high melting-point metals such as Ta, Ru and Cr, crystalline grain boundary of the FGL film and the spin injection layer film is fixed, and so electromigration resistance can be increased to 1.5 times that of the lamination with Cu or the like.

The aforementioned temperature correction further can improve recording performance at a low temperature, and so a magnetic material having higher magnetic performance (having higher coercivity) can be used and the flexibility of design can be greatly improved. Actually the Pt content of the perpendicular magnetic recording medium can be increased and a magnetic material having high coercivity by 5 points can be used, and so the average error rate can be improved by about 0.5 digit, availability (yield) of the magnetic head can be improved by about 5 points and the yield of the magnetic storage device can be improved by about 5 points in any configuration. Even considering variations in manufacturing, margin for squeeze and ATI can be obtained at a high temperature of 70° C., or recording/reproducing can be performed without problems at −10° C. as well, and so the reliability of the magnetic storage device can be achieved in the wide temperature range of −10° C. to +70° C.

[Embodiment 4]

The present embodiment describes another method of adjusting the 3.5" magnetic storage device including the microwave assisted magnetic recording head and the perpendicular magnetic recording medium described in Embodiment 3.

(Magnetic Storage Device and Adjusting Method Therefor)

Similarly to Embodiment 3, ten of microwave assisted magnetic recording heads that are accepted by a predetermined characteristics test by the magnetic recording/reproducing characteristics evaluation device and five pieces of the perpendicular magnetic recording media are mounted at a 3.5" magnetic storage device, and they are adjusted in the manufacturing process similarly to Embodiment 3, thus manufacturing a magnetic storage device of the present embodiment.

Figure 25:
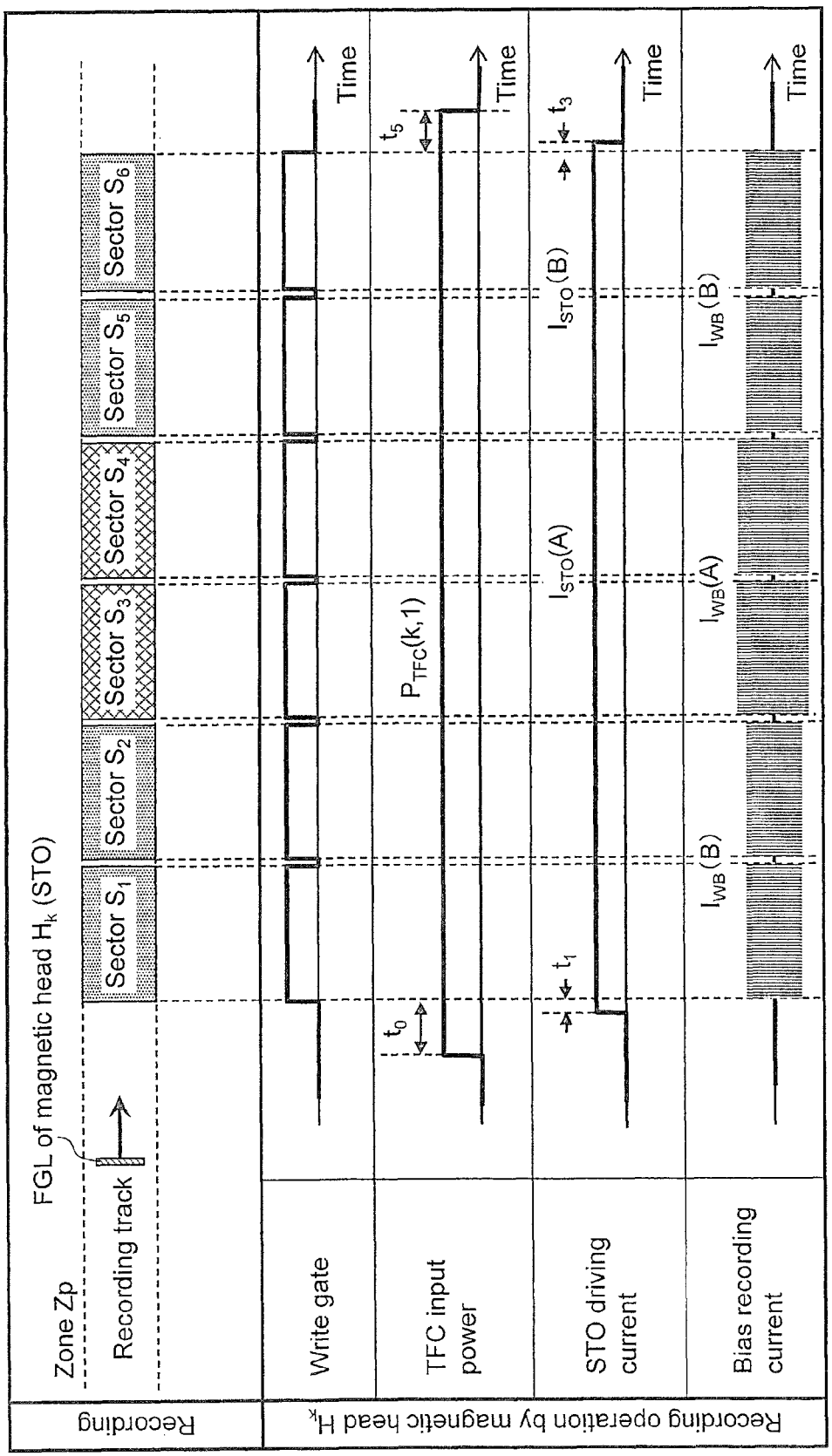
FIG. 25 is an exemplary timing chart for the step where data are recorded by adjusting $I_{WB}$ for each sector.

As shown in FIG. 25, the present embodiment is configured so that parameters are adjusted for record-assisting by making the STO driving current constant at the entire sector and increasing the bias recording current at areas including sectors $S_3$ and $S_4$ having difficulty in recording. TFC input power in FIG. 25 shows sector dependence for the TFC element 02b, and the same sector dependence is set for 02a as well (the absolute value thereof is adjusted). Then, similarly to Embodiment 1, timing such as $t_0$, $t_1$, $t_3$ and $t_5$ is adjusted. The thus obtained parameters of A mode and B mode are organized in a parameter table (Table 4) as shown in FIG. 26, which is then stored in nonvolatile memory and is then stored in memory or a register for use as needed.

Figure 27:
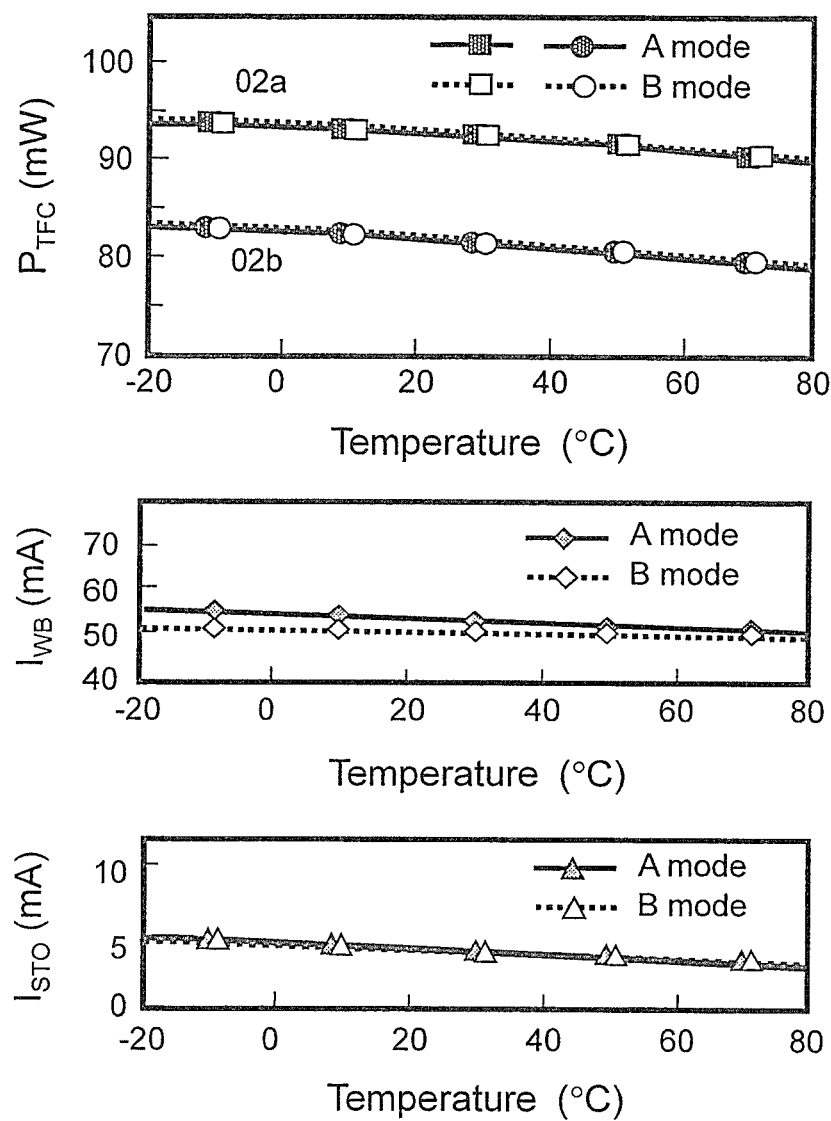
FIG. 27 shows exemplary temperature dependence of $P_{TFC}$, $I_{WB}$ and $I_{STO}$ in the controlling method to record data while adjusting $I_{WB}$ for each sector.

Similarly to Embodiment 3, temperature dependence of the parameters is controlled in accordance with the environment temperature of the device as shown in FIG. 27. That is, all of the TFC input power, the bias current and the STO driving current have temperature dependence so that their values increases as the temperature drops and they decreases as the temperature rises irrespective of modes. A difference in bias current between the both modes decreases as the temperature rises.

(Advantageous Effects)

In the present embodiment, the STO driving current is constant and the bias recording current is adjusted among sectors. In this respect, since the recording ability is greatly improved due to the microwave assisting effect compared with the conventional perpendicular magnetic recording, just a slightly increased bias recording current is enough for the sectors having difficulty in recording as well. Further since the difference is decreased at a high temperature and the STO driving current is constant at all sectors, clearance can be made substantially constant at the entire round of the zones, and so compared with the case where parameters are not adjusted for each sector, the margin δ described in Embodiment 1 (FIG. 11) can be made smaller by 0.2 nm. As a result, the setting value of a critical value CL(c) of the clearance can be made smaller by 0.1 nm than Embodiment 1. Then, the average error rate cay be decreased by about 0.1 digit and the yield of the magnetic storage device can be increased by about 3 points.

Environment stress test at the environment temperature from −15° C. to +75° C. of the magnetic storage device of the present embodiment does not show any failures for reliability.

[Embodiment 5]

Although recording performance can be improved by the assistance such as the microwave assisting effect and the thermal assisting effect as in Embodiment 1 to 4, a microwave assisted element has to operate at high current density of about $10^8$ A/cm$^2$. For magnetic storage devices to cover a wide range of guaranteed environment temperature, such as Consumer Electronics (CE) and car navigation usage, it is important to provide the life against electromigration at a high operating environment temperature and to perform sufficiently favorable recording at a low operating environment temperature, i.e., even when the distribution of coercivity is increased.

Figure 28:
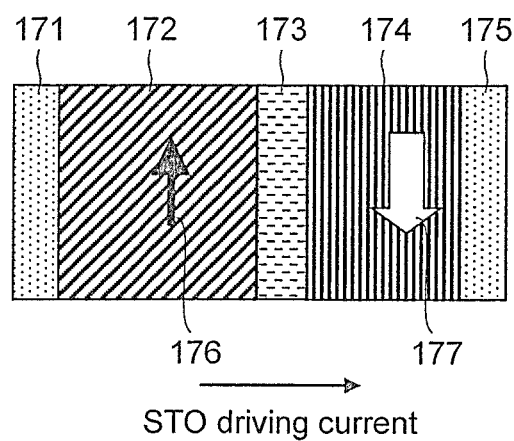
FIG. 28 is a schematic cross-sectional view showing a STO having an anti-ferromagnetically coupled type structure.

The present embodiment describes 2.5" type magnetic storage device including a microwave assisted magnetic recording head having the basic configuration of Embodiment 3 (FIGS. 22 and 23) and including a STO element having the configuration of FIG. 28, where another method for controlling recording parameters for each sector is introduced.

A STO shown in FIG. 28 is configured as follows. That is, the STO includes: a FGL 172 made of magnetic alloy having negative perpendicular magnetic anisotropy such as $Fe_{0.4}Co_{0.6}$, $Fe_{0.01}Co_{0.99}$ or $Co_{0.8}Ir_{0.2}$, Heusler alloy such as CoFeGe, CoMnGe, CoFeAl, CoFeSi or CoMnSi or magnetic artificial super-lattice such as Co/Fe, Co/Ir, Co/Ni or CoFeGeGa/CoMnGeGa, the magnetization of the FGL being likely to be oriented effectively in a plane even considering demagnetizing field; and a spin injection layer 174 configured so that magnetization is oriented in the in-plane direction, in which magnetization 176 of the FGL 172 and magnetization 177 of the spin injection layer 174 are coupled anti-ferromagnetically via a non-magnetic intermediate layer 173 of 1 to 4 nm in thickness, made of a non-magnetic conductive material such as Au, Ag, Pt, Ta, Nb, Ir, Al, Si, Ge, Ti, Cu, Pd, Ru, Rh, Cr, Mo or W. This is configured, contrary to Embodiment 3 and typical STOs, so that STO driving current flowing from the FGL 172 to the spin injection layer 174 allows antiferromagnetic coupling of the magnetization and high-speed rotation of not only the FGL 172 but also the spin injection layer 174.

The spin injection layer is made of a material similar to that of the FGL and has a thickness smaller than that of the FGL. The FGL is designed so that the magnitude of magnetic anisotropic field resulting from materials and the magnitude of the effective demagnetizing filed in the direction perpendicular of the film surface of the spin injection layer are substantially the same in opposite directions. It is confirmed that such a configuration enables more stable oscillation at a high frequency as well. The spin injection layer 174 and the FGL 172 have thicknesses of 3 to 30 nm preferably because such thicknesses enable stable coupling and high-speed rotation. In the drawing, 171 and 175 denote an under layer and a cap layer including a single-layer thin film, an alloy thin film made of Pt, Ir, Ru, Cr, Ta, Nb or Zr, or a lamination thin film of the foregoing. These layers 171 and 175 preferably have a larger film thickness, and appropriate thicknesses are set therefor with consideration given to balance with the recording gap length, which may be 1 to 15 nm for sufficient effects.

The perpendicular magnetic recording medium includes three magnetic layers of 133, 139 and 134, where the outermost face 133 has small magnetic anisotropy field $H_k$ to enable the magnetic field from the main magnetic pole to contribute to the recording, and elements and thickness of the magnetic films are adjusted so that the intermediate layer $H_k$ can be regarded as the outermost surface for the microwave assisted magnetic field and the characteristics are adjusted so that recording is enabled only with the magnetic field from the main magnetic pole. The perpendicular magnetic recording medium has the distribution of coercive force of ±4% in the circumferential direction.

The following describes structures and elements of the microwave assisted magnetic recording head and the perpendicular magnetic recording medium of the present embodiment.

slider 50: thin long femto type (1×0.7×0.2 mm)
FCAC 51: 1.8 nm
sensor element 12: TMR ($T_{wr}$=38 nm)
magnetic recording pole 122: FeCoFe ($T_{WW}$=50 nm), d=15 nm, θ=20°
shield magnetic pole 124: FeCoNi
STO 40: Ta (4 nm)/(Co/Fe) (12 nm)/Cu (3 nm)/(Ni/Co) (9 nm)/Pt (4 nm)
FGL width: $W_{FGL}$=50 nm
medium substrate: 2.5-inch NiP plated Al alloy substrate
medium structure: lubricant film (1 nm)/C (2 nm)/ CoCrPtB (3 nm)/CoCrPt(SiTa)$O_2$ (5 nm)/CoCrPtSi$O_2$C (4 nm)/Ru (10 nm)/CoFeTaZr (10 nm)/Ru (0.5 nm)/ CoFeTaZr (10 nm)

As shown in FIG. 22, the magnetic head is provided with thermal expansion elements (TFC) 02a and 02b including a W, NiCr thin film with resistance of 80 and 100Ω for clearance control, and then each element is controlled independently. The STO element including the lamination of high melting point metals such as Pt, Ta, Nb and the like, the FGL and the spin injection layer, which is electrically connected to the side face of the STO, allows the magnetic poles 122 and 124 to be common to the electrode to supply STO drive power, and similarly to Embodiment 3, electromigration resistance of the STO element can be enhanced. For common use of the magnetic poles and the electrode, the recording head is magnetically coupled at the rear end but is insulated electrically.

(Magnetic Storage Device and Adjusting Method Therefor)

Figure 29:
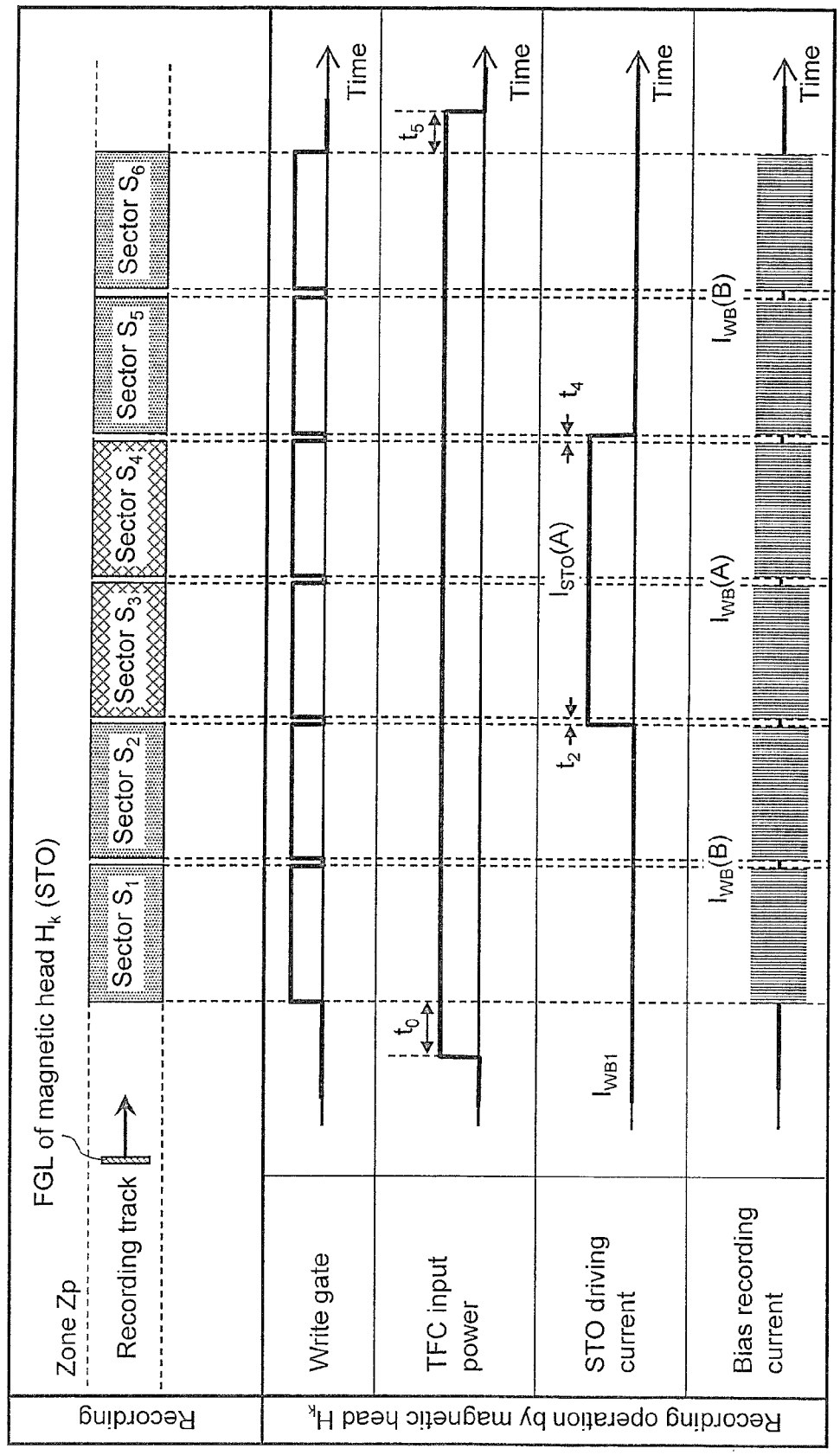
FIG. 29 is an exemplary timing chart for the step where data are recorded by adjusting $I_{STO}$ for each sector.

Similarly to Embodiments 1 to 4, two of the microwave assisted magnetic recording heads that are accepted by a predetermined characteristics test by the magnetic recording/ reproducing characteristics evaluation device and one piece of the perpendicular magnetic recording medium are mounted at a 2.5" type magnetic storage device, and they are adjusted in the manufacturing process similarly to Embodiment 2, thus manufacturing a magnetic storage device of the present embodiment. Since the present embodiment uses the perpendicular magnetic recording medium enabling recording with magnetic field from the main magnetic pole only, as shown in FIG. 29, parameters are adjusted for record-assisting so that STO driving current is applied to the STO only at an area including sectors $S_3$ and $S_4$ having difficulty in recording. Similarly to Embodiment 1, timing such as $t_0$, $t_2$, $t_4$ and $t_5$ is adjusted. Herein $t_4$ in the present embodiment is set so as to lengthen the STO driving current application duration to $S_3$, which is preferably 0.3 ns or longer similarly to $t_2$, and in the present embodiment it is time corresponding to a sector gap. The thus obtained parameters of A mode and B mode are organized as shown in FIG. 30, which is then stored in predetermined memory as a parameter table (Table 5).

Figure 31:
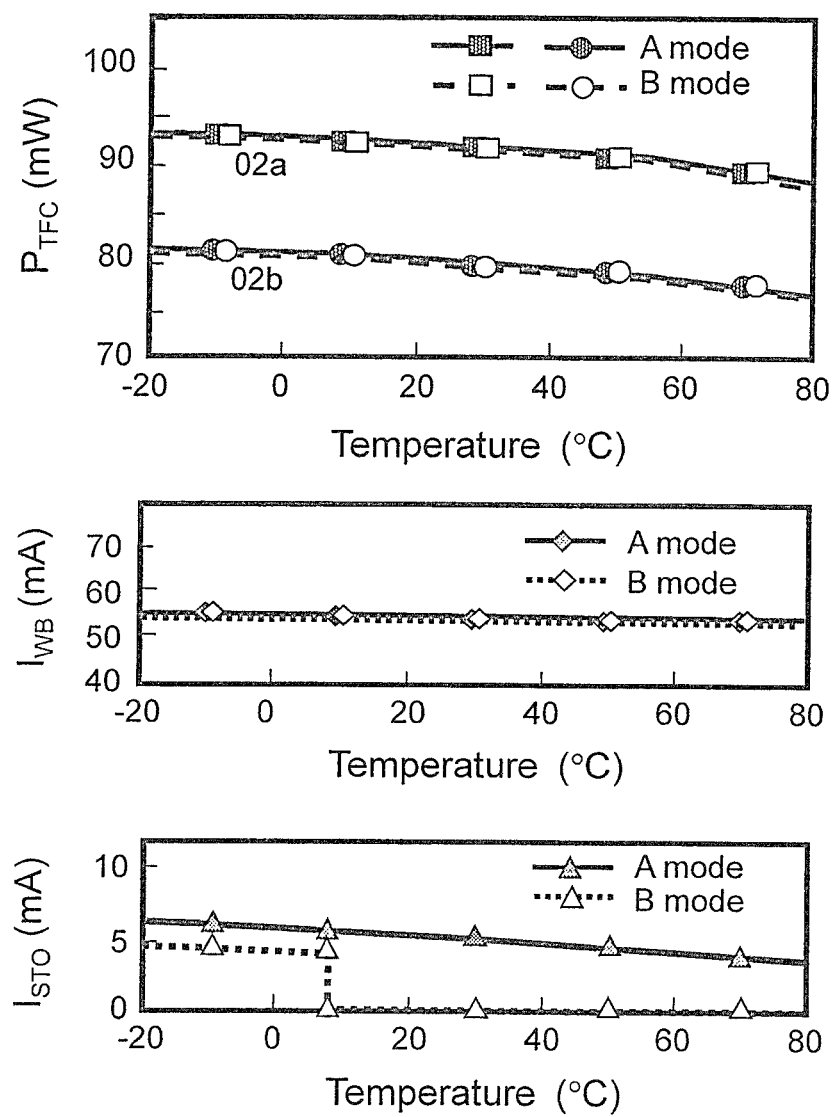
FIG. 31 shows exemplary temperature dependence of $P_{TFC}$, $I_{WB}$ and $I_{STO}$ in the controlling method to record data while adjusting $I_{STO}$ for each sector.

Then similarly to Embodiment 3, temperature adjustment of the parameters is performed as shown in FIG. 31 to cope with the environment temperature change of the device. In B mode as well, the STO driving current of about 4 mA is applied at temperatures of 10° C. or less for assisting magnetic recording. TFC input power of the thermal expansion element 02b is decreased by a few mW in such a temperature range.

(Advantageous Effects)

The microwave assisted magnetic recording head of the present embodiment is configured so that not only the magnetization of the FGL but also that of the spin injection layer are rotated at a high speed, and so has high-frequency oscillation magnetic field intensity that is close to linear polarization and is higher by about 10% immediately below the STO and magnetic field gradient higher by about 10 to 20%. The typical oscillation frequency thereof also shows high performance of 25 to 35 GHz.

The microwave assisted recording technique by the microwave assisted magnetic recording head of the present embodiment expands design margin of a conventional perpendicular magnetic recording medium configured to perform recording with magnetic recording field from a main magnetic pole only, and adjustment of the composition of the perpendicular magnetic recording medium can increase the level of coercivity to high, which is difficult by the conventional technique. The present embodiment further can make the application time of driving current to the STO element ½ or less, and so locally increasing temperature due to continuous current-application can be suppressed and electromigration can be reduced. As a result, the STO driving current that is higher than those of Embodiments 1 to 4 by about 20% can keep the reliability of the microwave assisted element, and the thus improved microwave assisting effect leads to the improvement of the average error rate of the magnetic storage device by about 1.2 digit and off-track margin also can be improved by about 1 nm. Then, the recording density of the magnetic storage device even including the conventionally structured perpendicular magnetic recording medium can increase the recording density of the magnetic storage device by about 20%. Environment stress test in the temperature range from −15° C. to +75° C. does not show any failures due to weak write or wearing of the magnetic head, for example, and the device can operate favorably.

[Embodiment 6]

In Embodiments 1 to 5, the TFC input power is constant for all sectors. Referring now to the timing chart of FIG. 32, the present embodiment describes a method of reducing average clearance by decreasing margin δ of the clearance to improve recording density while keeping reliability, and describes the case of adjusting the TFC input power in conjunction with A mode.

(Magnetic Storage Device and Adjusting Method Therefor)

After receiving bias current applied thereto, a magnetic recording pole generates heat in accordance with the recording frequency due to magnetic core loss and expands thermally, thus protruding (clearance reduction). After applying current to a coil, time reaching a steady state of the temperature in the vicinity of a magnetic recording pole typically is about 0.01 to 0.1 ms, which depends on the recording condition. It is then necessary to adjust the delay time to allow the temperature surrounding a recording/reproducing element to reach a substantially steady state for stable recording depending on the external environment of the device, the circumferential velocity and the transfer rate. In the case of the present embodiment, when the recording part shifts from normal sector $S_2$ to defective sector $S_3$, the amount of change in bias recording current from $I_{WB}$(B) to $I_{WB}$(A) can be sufficiently smaller than the case of a change from the current zero, and so the amount of shifting of the clearance is not so large and minor adjustment of TFC input power suffices.

That is, the present embodiment uses the microwave assisted magnetic recording head and the perpendicular magnetic recording medium having the configuration of FIG. 18 described in Embodiment 2, and the basic sequence of recording is similar to Embodiments 1 and 2. On the other hand, for recording at defective sectors $S_3$ and $S_4$, TFC input power is changed from $P_{TFC}(B)$ to $P_{TFC}(A)$ with the time constant $t_6$ similar to $t_0$ after finishing of the recording at $S_2$. Then, when the magnetic head moves from defective sector $S_4$ to record normal sector $S_5$, TFC input power is returned from $P_{TFC}(A)$ to $P_{TFC}(B)$ with the time constant $t_7$ similar to $t_0$. Such sequence can prevent excess protrusion of the magnetic pole at $S_3$ and $S_4$ areas and accordingly collision accident of the magnetic head, thus keeping durability reliability. Timing such as $t_0$, $t_1$, $t_2$, $t_3$, $t_5$, $t_6$ and $t_7$ is adjusted similarly to Embodiment 1.

Figure 33:
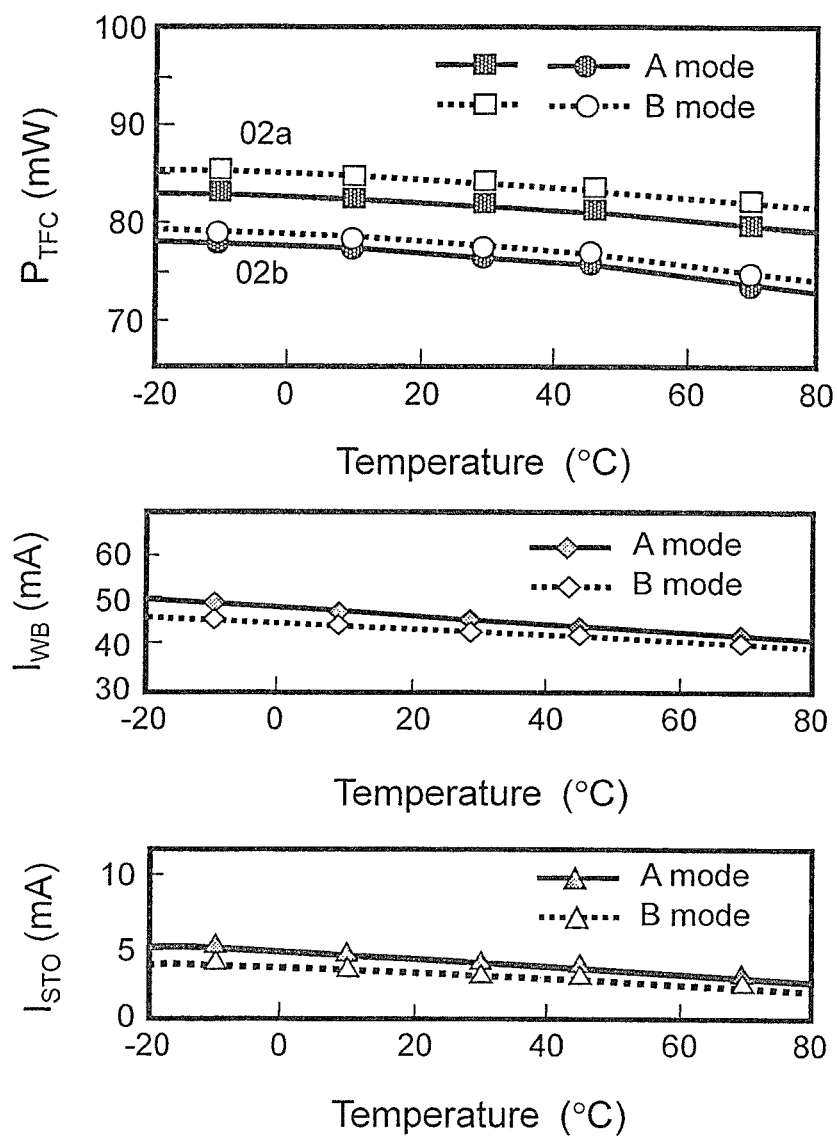
FIG. 33 shows exemplary temperature dependence of $P_{TFC}$, $I_{WB}$ and $I_{STO}$ in the controlling method to record data while adjusting a set of $P_{TFC}$, $I_{STO}$ and $I_{WB}$ for each sector.

Similarly to Embodiment 3, recording parameters are adjusted in accordance with the environment temperature as shown in FIG. 33. That is, values of the bias recording current and the STO driving current are larger in A mode than in B mode, while the value of TFC input power is smaller in A mode than in B mode to suppress protrusion of the magnetic pole and the STO. All of the parameters are set so as to intensely act at a low temperature. Then, such parameters are organized in a parameter table and are stored in non-volatile memory, which are then stored in memory or a register for use as needed.

(Advantageous Effects)

The present embodiment can reduce margin δ (FIG. 11) during clearance adjustment at the defective sector area by 0.3 nm compared with Embodiment 1 (FIG. 16). Thereby, the clearance or the magnetic spacing can be made smaller by 0.15 nm, and as compared with the magnetic storage device of Embodiment 1, the error rate can be improved by about 0.2 digit, and the off-track margin can be improved by about 0.1 nm. As a result, the recording density of the magnetic storage device can be increased by about 2 points, and then the yield of the magnetic head and the magnetic storage device also can be improved by 3 points.

Environment stress test at the environment temperature from −10° C. to +65° C. of the magnetic storage device of the present embodiment does not show any failures, and it is confirmed that the magnetic storage device has very large recording margin and such reliability for changes in environment temperature.

[Embodiment 7]

As a result of the examination by the present inventors, the life in the energized state of a microwave assisted element mainly depends on electromigration, and its temperature acceleration factor is about twice at 10° C. That is, as the temperature rises by 50° C., the life in the energized state becomes 1/30 to 1/40. In order to make use of microwave assisted elements, then high melting-point metals such as Ta, Nb, Pt and Cr are laminated to enhance the electromigration resistance as in Embodiments 3 and 4, and at a high-temperature area where recording on a perpendicular magnetic recording medium is easy but the life of the element easily deteriorates, operation of the microwave assisted element is suppressed (adjustment methods in FIG. 16, FIG. 20, FIG. 29 and FIG. 32). On the other hand, at a low-temperature area where the life of a microwave assisted element hardly deteriorates but recording on a perpendicular magnetic recording medium is difficult, magnetic recording field and the assisted effect are enhanced (adjustment methods in FIG. 25 and FIG. 32). In this way, the adjustment method for the TFC input power, the bias recording current and the STO driving current is optimized for each temperature area, whereby performance of the microwave assisted element is improved while keeping the reliability in the energized state.

The present embodiment describes an example where temperature parameters are adjusted in more detail, thus improving performance while keeping the reliability.

(Magnetic Storage Device and Adjusting Method Therefor)

Six magnetic heads and three perpendicular magnetic recording media having the configuration shown in FIG. 19 are mounted at a 2.5" type magnetic storage device, and learning is performed similarly to Embodiments 1 to 6. That is, at a high-temperature area where the temperature in the device is 45° C. or higher, operation of the microwave assisted element is minimized, and at a low-temperature area where the temperature in the device is 10° C. or lower, magnetic recording field and the assisted effect are enhanced. In this way, the STO driving current of B mode and A mode is controlled, thus controlling the recording operation. Then similarly to Embodiment 1, timing such as $t_0$, $t_1$, $t_2$, $t_3$, $t_4$, $t_5$, $t_6$ and $t_7$ is adjusted appropriately.

Figure 32:
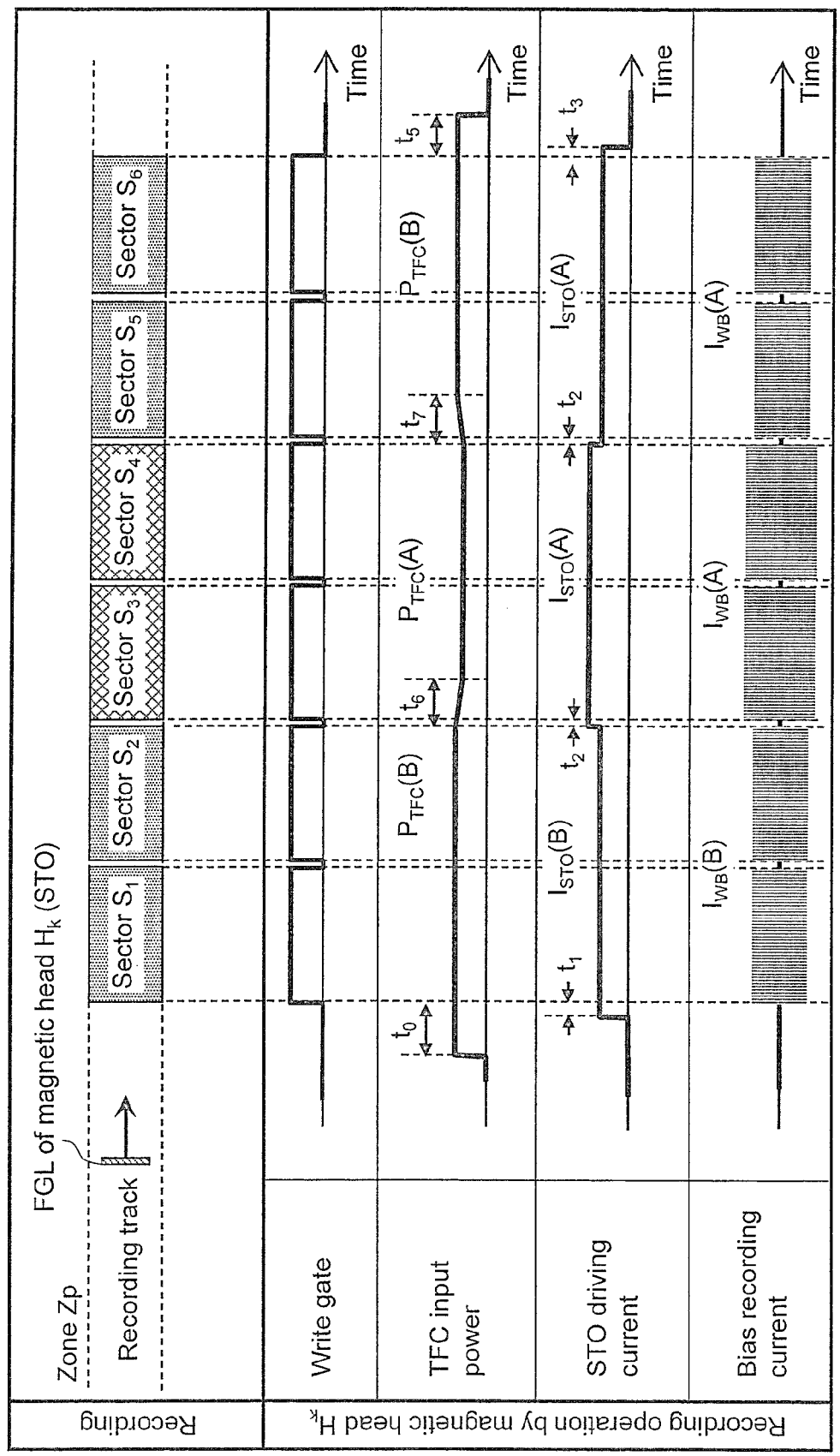
FIG. 32 is an exemplary timing chart for the step where data are recorded by adjusting a set of $P_{TFC}$, $I_{STO}$ and $I_{WB}$ for each sector.
Figure 34:
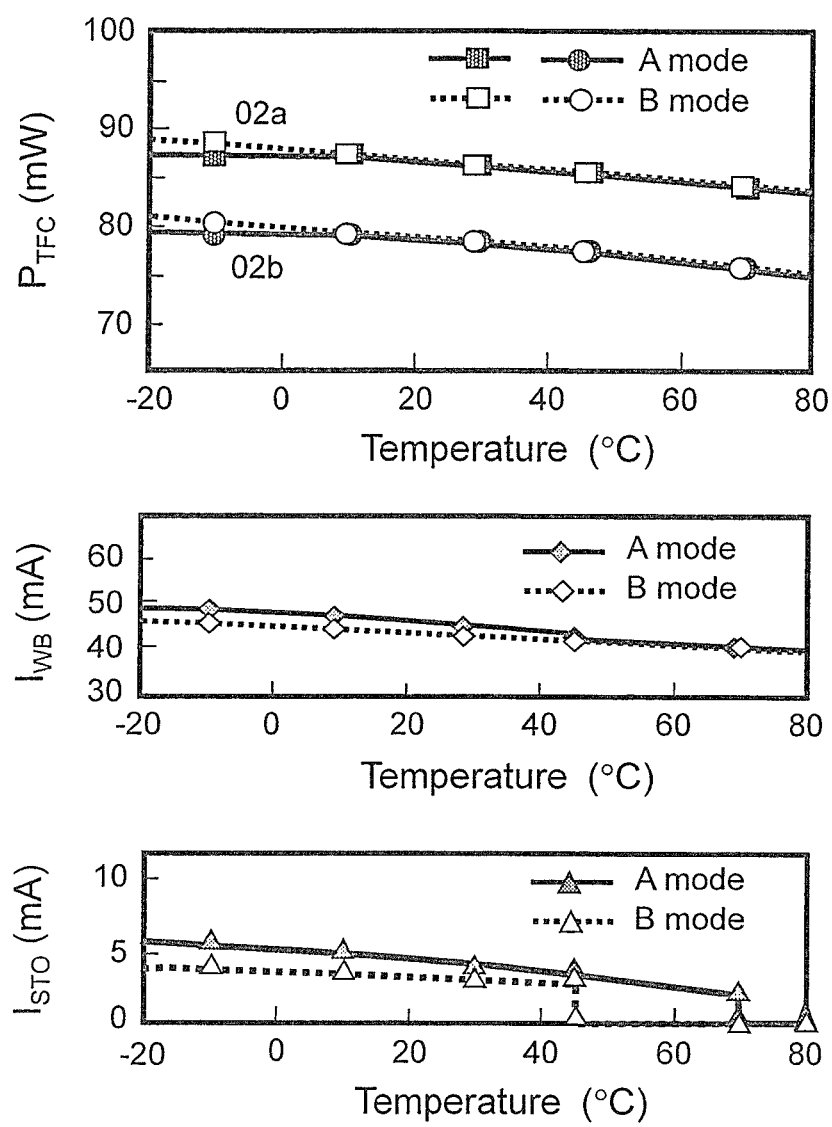
FIG. 34 shows exemplary temperature dependence of $P_{TFC}$, $I_{WB}$ and $I_{STO}$ in the controlling method to record data while adjusting a set of $P_{TFC}$, $I_{STO}$ and $I_{WB}$ for each sector.

FIG. 34 shows the example where at a high-temperature area where the temperature in the device is 45° C. or higher, the STO driving current of B mode and A mode is controlled as in FIG. 20 or FIG. 29, at a low-temperature area where the temperature in the device is 10° C. or lower, the STO driving current of B mode and A mode is controlled as in FIG. 32, and at a room-temperature area other than those, the STO driving current of B mode and A mode is controlled as in FIG. 16, thus controlling their recording operations. That is, at a sector of easy-recording, the STO driving current is zero at a high-temperature area of 45° C. or higher and then is increased gradually by about 4 mA at the temperature area of 45° C. or lower as the temperature drops for driving. On the other hand, at a sector having difficulty in recording, the STO driving current is zero at a high-temperature area of 70° C. or higher, is set at about 3 mA at 70° C., and then is increased gradually to about 6 mA as the temperature drops to −20° C. for driving. Then, the bias recording current is driven by gradually increasing the current value as the temperature drops, and at a temperature area of 45° C. or lower, the current value is increased with drop in temperature, where the gradient is larger at the sector having difficulty in recording (A mode) than at the sector of easy-recording (B mode). The TFC input power is driven by gradually increasing its value as the temperature drops, and at a temperature area of 10° C. or lower, the value is adjusted so that the temperature gradient is smaller or slightly positive (slightly decrease with the temperature) at the sector having difficulty in recording (A mode) than at the sector of easy-recording (B mode).

(Advantageous Effects)

The present embodiment can further suppress an increase of side writing and side erasing at a sector of easy-recording on the high-temperature side as compared with Embodiments 1 to 6, while keeping the life in the energized state, and enables further favorable recording at a sector having difficulty in recording on the low-temperature side as well. The present embodiment particularly enables fine-adjustment of the recording assist performance at a low-temperature and of the clearance and the off-track margin (side writing and side erasing) at a high-temperature. For instance, compared with the magnetic storage device of Embodiment 1, the error rate can be further improved by about 0.5 digit, and the off-track margin can be further improved by about 0.2 nm. As a result, the recording density of the magnetic storage device can be improved by about 5%, and the yield of the magnetic head and the magnetic storage device also can be improved by 2 points and 5 points, respectively.

Environment stress acceleration test at the environment temperature from −15° C. to +75° C. of the magnetic storage device of the present embodiment does not show any failures, and so it is confirmed that the magnetic storage device has very high recording margin for changes in environment temperature as compared with a method without recording correction for each sector having the failure rate of 5%.

[Embodiment 8]

The present embodiment describes the case of forming servo information on the perpendicular magnetic recording medium of FIG. 17 with the microwave assisted magnetic recording head of FIG. 17 by the method described in Embodiments 1 to 7, thus configuring a magnetic storage device.

(Process to Form Servo Information)

Static magnetic properties as well as characteristics by magnetic recording/reproducing characteristics evaluation equipment are evaluated for the microwave assisted magnetic recording heads and the perpendicular magnetic recording media described in Embodiments 1 to 7. The evaluation shows that the distribution of characteristics at all zones of the inner radius, the middle radius and the outer radius, an area of easy-recording (normal area) and an area having difficulty in recording (defective area) are specific to the manufacturing devices and the conditions, and all of the magnetic disks have generally the distribution as shown in FIGS. 2 and 15, that is, the distribution of the entire radius can be estimated precisely from the distribution of the inner radius, for example. It is further confirmed that a substantially same optimum recording condition can be applied at a boundary area between a normal area and a defective area, and the aforementioned approximation can be used practically without problems. Then, the present embodiment is configured as follows so that the defective sector distribution at the inner radius at each face of the perpendicular magnetic recording medium and a relationship expression (profile) between TFC input power and clearance of each magnetic head are found, which is then extrapolated so as to determine their parameters for all zones of the inner radius, middle radius and outer radius.

Firstly, magnetic heads are evaluated for their recording/reproducing characteristics by reproducing/reproducing characteristics evaluation equipment for selection of magnetic heads, where a high-coercivity perpendicular magnetic recording medium accepted by predetermined examinations and test is used, and the clearance is set at 1.5 nm and 1 nm for recording and reproducing, respectively. Then, four magnetic heads and two magnetic disks satisfying the specifications are mounted a 2.5" type or 3.5" type HDA shown in FIG. 4.

Next, the magnetic storage device (HDA) 1102 is placed at a servo track writer STW (FIG. 35) provided with a sealed chamber 1108 capable of sealing the HDA as a whole. The sector track write of the present embodiment has a configuration similar to that of a conventional STW including a clock head, and a clock head 1104 used is a microwave assisted magnetic recording head of the present invention, which is driven by the servo information recording/reproducing controller of the present invention and the driving means of the present invention shown in FIG. 4 or the like. A mechanical unit may be configured as in conventional techniques, for example, using an external position detection/positioner such as an encoder motor (rotary encoder) or laser length measurement equipment and a push-pin for positioning.

Firstly, a predetermined signal is recorded at a predetermined track of zone $Z_p$ (p=1, ..., P) of a perpendicular magnetic recording medium with TFC input power $P_{TFC}(0, p)$ (clearance) and predetermined linear recording density while changing bias recording current and STO driving current, where the recording is performed while pressing the HSA against a crash stop 1101 disposed on the innermost radius side of the magnetic disk device and similarly to the sequence of FIG. 11 described in Embodiment 1. Then, squeeze characteristics, Adjacent Track Interference (ATI) characteristics, 747 characteristics and the like are evaluated for each sector, and then areas of the magnetic disk are divided into areas of easy-recording and areas having difficulty in recording. Next, bias recording current and STO driving current, from which the most favorable squeeze characteristics can be obtained at the areas having difficulty in recording, are selected as $AI_{WB}(0, p, n)$ and $AI_{STO}(0, p)$ from the above sets of the bias recording current and the STO driving current. Then bias recording current, from which the most favorable squeeze characteristics can be obtained at the areas of easy-recording, is then selected as $BI_{WB}(0, p, n)$ from the sets having the same STO driving current $AI_{STO}(0, p)$. Finally, the current value is selected as $Cl_{WB}(0, p, n)$ from current values smaller than these bias recording current values, the selected current value $Cl_{WB}(0, p, n)$ being the current that divides areas of the magnetic disk into the same areas of easy-recording and areas having difficulty in recording as stated above during the recording/reproducing characteristics evaluation at the recording track.

The present embodiment is configured so that the STO driving current is constant at zones and the bias recording current is adjusted. This is for simplification of parameters for timing adjustment because the recording timing and phases are especially important for servo information.

Next, a perpendicular magnetic disk is rotary-driven and a predetermined signal is recorded thereon by each magnetic head with $Cl_{WB}(0, p, n)$ and $AI_{STO}(0, p)$ (C mode), and the distribution of reproduction output thereof is found, thus determining an area of easy-recording (area including normal data sectors) and an area having difficulty in recording (area including defective data sectors) for each face of the perpendicular magnetic recording medium. When a HSA is mounted at a magnetic storage device, the floating posture of the magnetic head (HGA) typically changes, and so clearance at this time is evaluated at the same time, thus correcting the relational expression between clearance and TFC input power for each magnetic head. Such an evaluation result is organized in a parameter table (Table 6) of FIG. 36, which is then stored in memory of a STW drive controller 1103 of FIG. 35.

Figure 35:
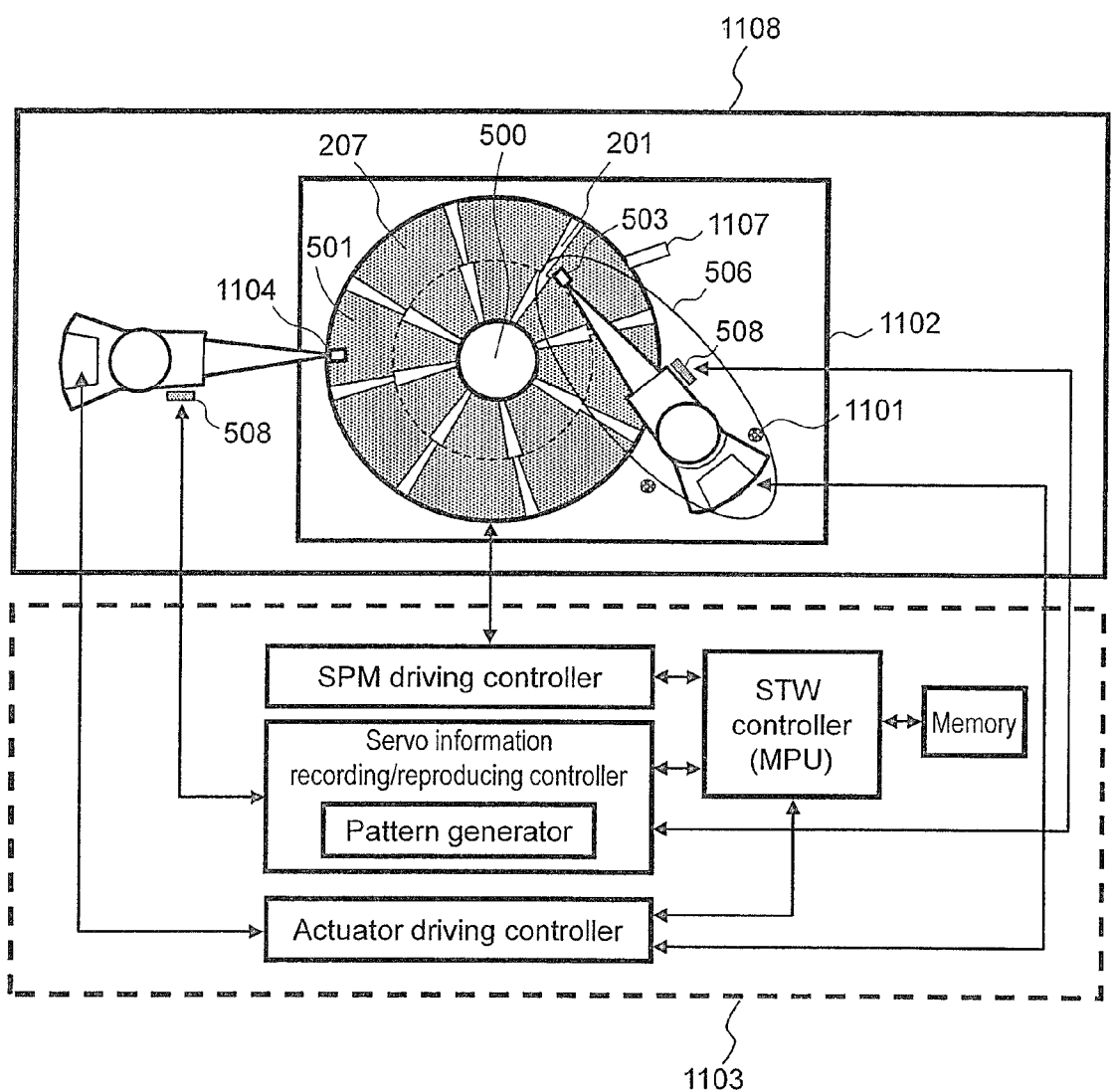
FIG. 35 is a schematic diagram showing an exemplary servo track writer.

Based on the above result and using the relational expression found beforehand by experiment, the distribution of defective data sectors at all zones of the inner radius, the middle radius and the outer radius and the relational expression (profile curve) between TFC input power and clearance of each magnetic head are determined by extrapolation. The data in Table 6 is converted using this distribution and a predetermined relationship expression, which is then overwrite-saved in Table 6 as control parameters of each magnetic head. Then, based on the positional relationship between the data sectors and servo sectors, recording current $I_{WB}(k, p, j)$ and STO driving current $I_{STO}(k, j)$ of B mode and A mode are found as in FIG. 16 or FIG. 25 at normal servo sectors and at defective servo sectors, and a recording condition is selected from at least two types of recording conditions for each servo sector in accordance with characteristics of the servo sectors for recording of servo information (servo track). Then, a servo area 201 having a predetermined servo track profile as shown in FIG. 35 or FIG. 9 is formed on the entire face of the magnetic disk. Then the recording parameters of Table 6, sector related information and the like are recorded at a predetermined area of the perpendicular magnetic recording medium. The HDA may be provided with memory, in which data may be stored. Although FIG. 35 simply shows the case of two zones of inner radius and outer radius, considering the upper limit of the number of tracks per zone, 1.8", 2.5" and 3.5" devices having the zone number of 15 to 20, 20 to 25, and 20 to 40, respectively, are considered in the present embodiment.

(Magnetic Storage Device and Adjusting Method Therefor)

Next, a control board of a HDD is mounted at the HDA, thus configuring a magnetic disk device, and during its manufacturing and testing, the above-mentioned recording parameters, positional information on sectors and the like are read from the predetermined area of the perpendicular magnetic recording medium, which is stored in predetermined memory of the magnetic storage device, and then these parameters (parameter table of Table 6) are read in registers 514 of the driving controller 508. The number of the registers prepared corresponds to the number of magnetic heads. Next, squeeze characteristics, Adjacent Track Interference (ATI) characteristics, 747 characteristics and the like of the magnetic heads are evaluated using these recording parameters, thus determining an optimum data track profile and such a linear recording density profile and finding a conversion equation from the servo track profile. Next, in accordance with this conversion equation, a track profile of a data sector is determined for each zone (see FIG. 9) that divides the perpendicular magnetic medium in an annular form. Then optimum track density and an optimum linear recording density profile are determined for each zone (adaptive formatting) by the recording process similar to Embodiments 1 to 7 so that the error rate becomes substantially uniform at all zones and so as to satisfy predetermined areal recording density, and the parameters of the above conversion equation and the like are stored in non-volatile memory, thus configuring a magnetic storage device having predetermined capacity. The magnetic storage device is configured so as to enable temperature correction in a similar manner to Embodiments 3 to 7. Such data may be preferably compressed and stored in the non-volatile memory of the magnetic storage device, which may be decompressed before the activation of the device and be stored in the memory for usage, whereby memory capacity required can be preferably reduced. The present embodiment uses Table 6 as the parameter table for recording. Instead, servo information may be recorded as stated above, and then recording parameters may be set as in Table 4.

That is a description on the example where the sectors to be evaluated about the initial characteristics are data sectors, and the sectors to be evaluated about the initial characteristics may be servo sectors, from which similar improvement effects can be obtained. Herein, it is more preferable that the recording characteristics are optimized for each data sector because various procedures such as evaluation of the sector error rate can be simplified in the case of using a non-RS channel suitable for high-density.

For determination of servo areas, as described referring to FIGS. 14 and 15, an adjacent track may be recorded at a self-track for squeezing, thus determining a defective sector, and then the sector error rate may be evaluated by the method shown in FIG. 11 to determine the optimum recording condition for servo information recording at each area.

(Advantageous Effects)

A conventional magnetic disk device including a main-pole/shielding type perpendicular magnetic recording head generates side recording and side erasing at an area of easy-recording and generates a servo signal of a poor quality (S/N) at an area having difficulty in recording. As a result, a magnetic disk device by conventional perpendicular magnetic recording cannot provide sufficient positioning margin with the recording density of 500 kTPI or more, and so rotational delay due to writing errors and reading errors occur often, and especially due to disturbance such as speaker vibration, performance deteriorates often. For the magnetic storage devices of Embodiments 1 to 7 where the recording condition on servo information is not optimized for each sector, such a problem of deterioration can be suppressed to a practically acceptable level, but the yield thereof would be improved further if margin can be obtained against other disturbances such as rotating vibrations from a device installed adjacently in the configuration including a plurality of magnetic storage devices installed close to each other.

On the other hand, compared with the conventional technique of performing recording at a servo area under a fixed condition, the present embodiment can improve the servo signal S/N at an area having difficulty in recording by 1.5 dB for medium 1 and by 0.7 dB for medium 2 especially for a magnetic head that has positioning margin at a barely acceptable level, and can improve the off-track margin at an area of easy-recording by 0.6 nm for medium 1 and 0.3 nm for medium 2. This can suppress the frequency of rotational delay due to writing errors and reading errors and can suppress deterioration of performance due to high margin against external disturbances. Failure rates in the speaker vibration testing as well as rotational vibration testing favorably can be made substantially zero. Reduced positioning error can improve the manufacturing yield of the magnetic disk device relating to squeezing by 5 points and the selection yield of the magnetic heads by 2 points. It is further confirmed that the magnetic storage device of the present embodiment has high reliability in environment stress test at the environment temperature from −10° C. to +65° C.

[Embodiment 9]

The present embodiment describes a method of forming servo information by a media servo writer on the perpendicular magnetic recording medium described referring to FIG. 17 with the microwave assisted magnetic recording head shown in FIG. 17.

(Media Servo Writer)

Figure 37:
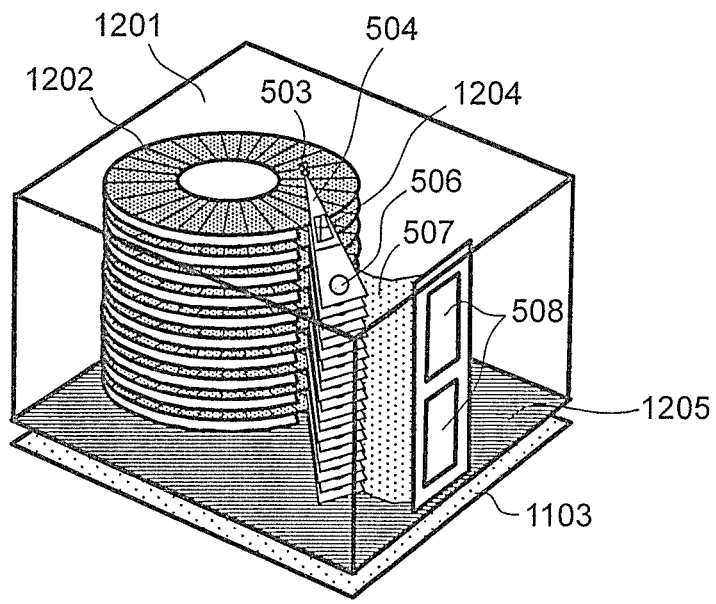
FIG. 37 is a schematic diagram showing an exemplary media servo writer.
Figure 38:
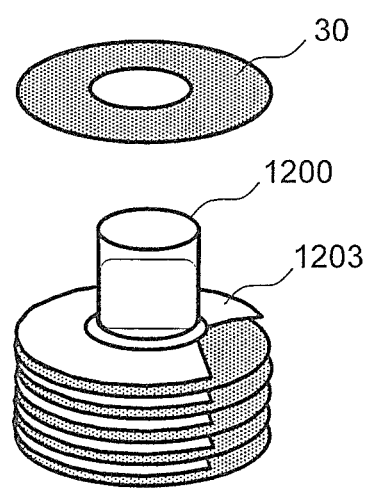
FIG. 38 schematically shows a state where a magnetic disk is fixed to a spindle of a media servo writer.

The media servo writer of the present embodiment has a basic configuration similar to the servo writer shown in FIG. 35, including an external positioning mechanism called a rotary positioner (encoder motor) or a laser length measurement machine, a clock head that supplies a reference signal or a reference time signal and the like. Herein as shown in FIGS. 37 and 38, the part corresponding to a HDA mechanical system 1102 (FIG. 35) may be configured uniquely so as to vibrate less, whereby high-quality servo information can be recorded at one time on a large number of magnetic recording media at low cost.

That is, similarly to FIG. 35, this media servo writer is directly coupled with the HSA 506. The rotary positioner (not illustrated) with a rotary encoder built therein to measure the rotary angle of the overall magnetic head detects the position of the actuator, and an error between the detected position and a target position is fed-back to the rotary positioner, thus making the microwave assisted magnetic recording head 503 follow the target position. In such a following state, the magnetic head 503 records servo information as follows, the servo information being generated by a pattern generator of a servo information recording/reproducing controller while being in synchronization with a clock signal read from a clock pattern disk (not illustrated) provided beforehand at the lowermost part of a spindle 1200 using a clock head (not illustrated) similar to FIG. 35. In this example, the encoder may be directly coupled with the spindle 1200 and a spindle motor driving the same to measure the rotating angle of the perpendicular magnetic recording medium.

The media servo writer of the present embodiment at least includes: a base 1205; a He filling mechanism; a He sealing cover 1201; the microwave assisted magnetic recording head 503 having the same degree of MCW, MWW and MRW, having an ABS face stably floating with the floating amount of 4 nm or more and 12 nm or less under a He environment and including a TFC element; a microwave assisted magnetic recording magnetic head driving control apparatus 508; a STW driving controller 1103 including a controller for servo information recording/reproducing by a microwave assisted magnetic recording head; and a spindle 1200 capable of fixing 5 to 50 pieces of magnetic disks 30 via a disk flutter suppression board 1203. The spindle 1200 preferably is both-end supporting structured. This configuration can suppress windage vibrations of a suspension of the magnetic head, thermal variations of an arm or the like and flutter vibrations of the magnetic disk during servo information recording and so can suppress AC vibration components and DC deviations from being recorded on the perpendicular magnetic recording medium.

The microwave assisted magnetic recording head has small degree of side writing and fringe, and further can suppress various vibrating factors as stated above in combination with a suspension with damper for vibration suppression, a dual stage actuator, a micro-actuator and the like. Further since the media servo writer can have uniform characteristics such as production output E, MWW, MCW, MRW and the like of all magnetic heads by strict selection performed beforehand, thus enabling ideal recording of a servo pattern free from variations.

The present embodiment describes the example in the following, where magnetic heads having parameters such as MCW, MWW, MRW and the like leading to the highest device manufacturing yield and having uniform characteristics are selected as microwave assisted magnetic recording heads for media servo writer, and the servo writer includes 100 pieces of such magnetic heads.

(How to Form Servo Pattern)

Figure 39:
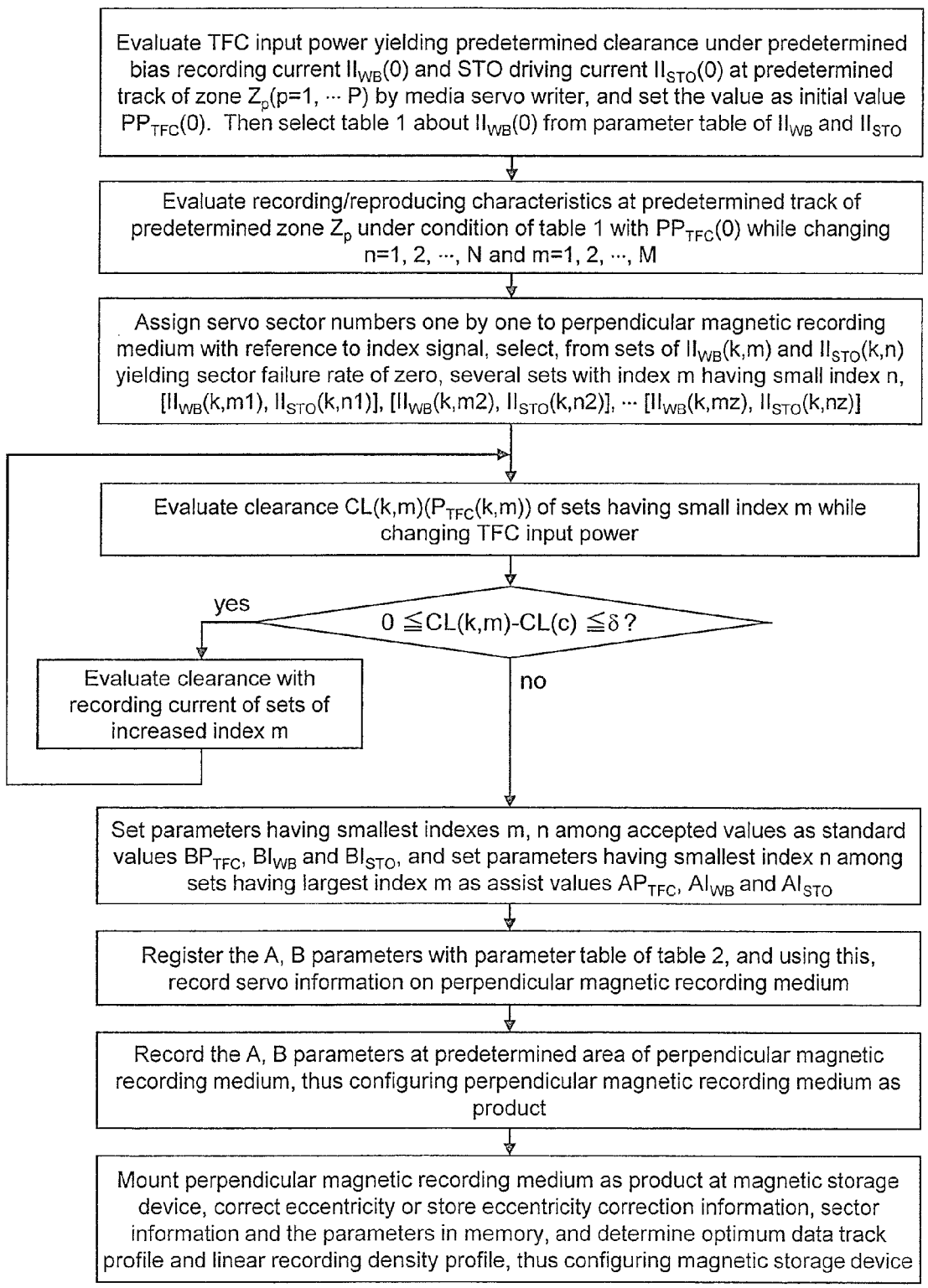
FIG. 39 is an exemplary flowchart to set parameters when servo information is written on a perpendicular magnetic recording medium by a media servo writer and mount the medium to a magnetic storage device.
Figure 40:
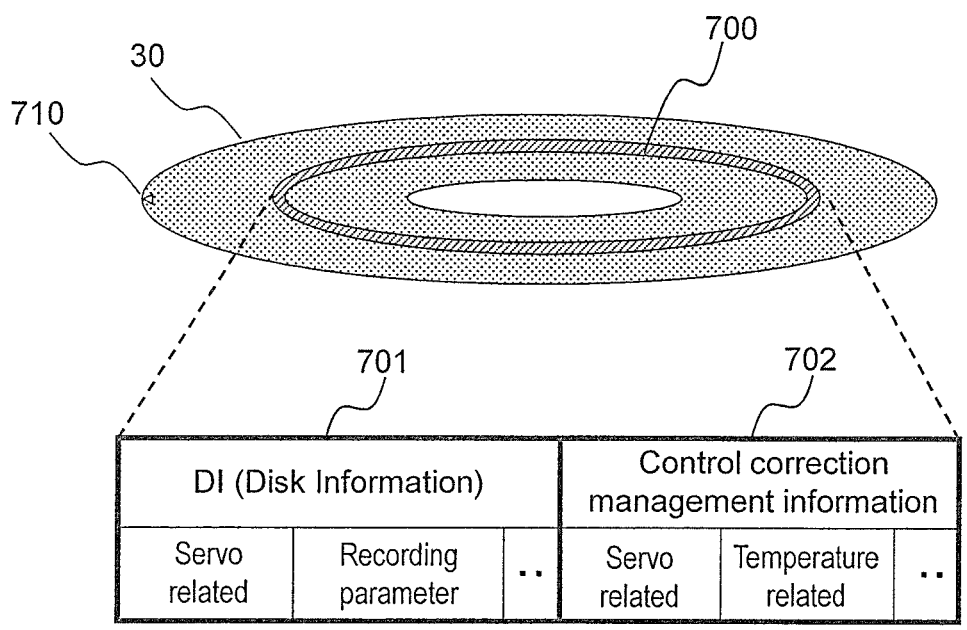
FIG. 40 schematically shows exemplary management information and information structure of the management information on a perpendicular magnetic recording medium.

50 pieces of 2.5" perpendicular magnetic recording media are mounted at the media servo writer of the present embodiment while recording the eccentricity and a microwave assisted magnetic recording head is made to follow the target position. In this tracking state, servo sector numbers are assigned one by one with reference to an index, and similarly to Embodiment 8, correlation between the distribution of defective data sectors and the distribution of recording/reproducing characteristics (such as overwrite characteristics, reproduction output when recording with low recording current) is clarified. The perpendicular magnetic recording medium of the present embodiment is configured, so as to enable the detection of the angular position (phase position) during film formation of the perpendicular magnetic recording medium, an optical mark is provided beforehand as shown with 710 of FIG. 40, for example, and adjustment is made so as to substantially align this position with the index position, thus mounting the perpendicular magnetic recording medium at the media servo writer. Then similarly to FIG. 11 for Embodiment 1, as shown in FIG. 39, the bias recording current, the STO driving current and the TFC control power are optimized. In the present embodiment, parameter control is selected so that the bias recording current is constant in a zone and the STO driving current is adjusted, and these recording parameters are stored in predetermined memory of the media servo writer. Then, such parameters are copied in the register of the head driver and similarly to Embodiment 8, servo information is recorded on the perpendicular magnetic recording medium using optimum recording parameters depending on the characteristics of the sectors, thus configuring servo sectors and servo tracks. Finally, servo related information such as characteristics information on servo sectors and patterns to find the servo center of the perpendicular magnetic recording medium as well as recording parameter information are recorded at a predetermined area of the perpendicular magnetic recording medium as needed. As shown in FIG. 40, for example, such servo related information, recording parameter information and the like can be recorded at a Disk Information (DI) part 701 in a management area 700 that is separately provided from a user data area where a user can write data of a perpendicular magnetic recording medium 30. Although firmware information is recorded at a management area of the middle radius separately from data, the DI information is recorded at this area in the present embodiment. This management area may be provided at the innermost radius or the outermost radius.

A few to a few hundreds of spiral pattern (multi-spiral pattern) may be formed on the perpendicular magnetic recording medium by the media servo writer of the present embodiment as a seed pattern (base pattern) as a reference for positioning to record concentric servo information. Then the perpendicular magnetic recording medium may be mounted at a HDA or a HDD, and servo information may be formed using the multi-spiral pattern as a seed under the optimum recording condition for each sector as in data recording of Embodiments 1 to 8 by the HDD servo writer or self-servo writing.

(Magnetic Storage Device and Adjusting Method Therefor)

Two perpendicular magnetic recording media with the servo information provided thereon are mounted, together with four microwave assisted magnetic recording heads of the present invention, at a 2.5" type magnetic storage device. The perpendicular magnetic recording media are positioned using the optical mark for phase position detection so that the rotating reference position (phase) used for recording of the servo information by the media servo writer substantially agrees with the rotating reference position (index) of the magnetic storage device. Next, using the DI information and servo information during servo pattern recording for each perpendicular magnetic recording medium and magnetic head, centering, eccentricity correction, or adjustment for eccentricity non-following controlling (see FIG. 10) as well as rotating phase correction and the like of the perpendicular magnetic recording medium are performed in the manufacturing process of the magnetic storage device, and the recording parameter information is read from the DI information, which is then stored in the memory.

Next similarly to Embodiment 8, at the final manufacturing step of the magnetic storage device, characteristics such as 747 characteristics and squeeze characteristics of the microwave assisted magnetic recording heads are evaluated using the recording parameters during servo pattern recording and using the optimum recording parameters for each sector, thus determining an optimum data track profile and such a linear recording density profile and configuring a magnetic storage device having predetermined capacity by adapting formatting. The magnetic storage device is configured so as to enable temperature correction in a similar manner to Embodiments 3 to 7. Such control correction information related to servo and temperatures is recorded as control correction management information in the part 702 of the management area 700 as shown n FIG. 40. Such DI information and control correction management information are read before the activation of the device as needed, is recorded in the memory of the magnetic storage device and is used to control the operation of the magnetic storage device.

(Advantageous Effects)

A main pole/auxiliary pole type perpendicular magnetic recording by conventional techniques have large fringe effects, side writing and side easing on the outer radius and the inner radius sides of the perpendicular magnetic medium, and so it is very difficult to form a servo pattern for track density of about 500 kTPI or more even with a high-performance media servo writer.

On the other hand, a media servo writing by the microwave assisted magnetic recording head in combination with the optimum recording for each sector of the present embodiment enables the formation of servo information with a more uniform width than Embodiment 8, which is free from the characteristics distribution of the perpendicular magnetic recording medium, the servo track and sectors. Since the microwave assisted magnetic recording heads used for servo writing have uniform characteristics and dimensions, margin to absorb dimensional variations of the magnetic heads can be made smaller than Embodiment 8, and so the STO width and the read element width of the microwave assisted magnetic recording heads to be mounted at the HDD can be designed wider than Embodiment 8. As a result, compared with Embodiment 8, synchronous vibrations RRO can be reduced by about 5%, there is no variation among media, and high data track density up to 560 kTPI can be achieved. Due to increased positioning accuracy, the manufacturing failure rate relating to squeezing of the magnetic disk device can be suppressed by 20% compared with Embodiment 8, and the selection failure rate of the magnetic heads also can be suppressed by 5 points.

Failure rates in the speaker vibration testing as well as rotational vibration testing of the present embodiment can be made substantially zero. Environment stress test at the environment temperature from −10° C. to +65° C. also shows high reliability similar to Embodiment 8.

As stated above, servo information is recorded by the media servo writing using a microwave assisted magnetic recording head in combination with appropriate recording for each sector, whereby without using a servo track writer requiring enormous equipment investment, a magnetic storage device can have much higher performance than the conventional techniques and achieve high yields, and a magnetic recording medium with high-quality servo information can be manufactured at low manufacturing cost.

[Embodiment 10]

The present embodiment relates to the perpendicular magnetic recording medium and the method for manufacturing a magnetic storage device described in Embodiment 8, and describes a method of forming high-quality servo information on a perpendicular magnetic recording medium by moving a microwave assisted magnetic recording head at a pitch smaller than a narrower width between the recording track width and the FGL element width thereof. The present embodiment further describes a method of mounting such a perpendicular magnetic recording medium on a magnetic storage device and adjusting the same.

(Microwave Assisted Magnetic Recording Head for Servo Writing and for Magnetic Recording)

A microwave assisted magnetic recording head for servo information recording having the configuration of FIG. 19 is prepared, where the width $T_{ww}$ of the magnetic recording pole 22 of the magnetic head is 80 nm, the FGL width $W_{FGL}$ is 45 nm and the read element width $T_{wr}$ is 15 nm, and then a microwave assisted magnetic recording head to be mounted at a magnetic storage device is prepared, where $T_{ww}$ is 100 nm, $W_{FGL}$ is 37 nm and $T_{wr}$ is 15 nm. The STO has the configuration of FIG. 28. To assemble the magnetic storage device of the present embodiment, microwave assisted magnetic recording heads for servo writing and for magnetic recording are selected from these magnetic heads as follows using a high-coercivity perpendicular magnetic recording medium for magnetic head selection test having the characteristics distribution of ±0.5% or less and using a magnetic recording/reproducing characteristics evaluation device.

A magnetic storage device including a plurality of magnetic heads mounted thereon has to have a servo track pitch smaller than a data track pitch by the amount that is not less than a value required for the linearity of the servo information during positioning because the microwave assisted magnetic recording head mounted thereon has variations in track width. Since the present embodiment performs shingled recording of servo information, the servo track pitch thereof can be increased to a data track pitch as a limit value thereof. This means that MRW can be wider by the half of the increase of TP. The present embodiment selects read elements having this value for use. It is important to provide linearity of a servo signal with reference to positional deviation. To this end, a servo pattern typically is recorded to be dense in the track width direction as possible, and so in order to provide linearity with the track density of 500 kTPI or more, the conventional technique has to use a servo track pitch that is smaller than a data track pitch by about 15 to 20%.

Firstly, using a magnetic recording/reproducing characteristics evaluation device having a function of performing recording appropriately by adjusting TFC input power, STO driving current and bias recording current of a magnetic head, which is prepared by setting $W_{FGL}$ 37 nm, $T_{wr}$ 15 nm and $T_{ww}$ 100 nm as targets, in a tracking state to servo information formed by itself, and of performing reproducing/decoding for each sector by a non-RS channel using LDPC code, 747 characteristics, adjacent squeeze characteristics and microtrack of the microwave assisted magnetic recording head are evaluated similarly to FIGS. 5 to 8, FIG. 14 and FIG. 15 of Embodiment 1, so that microwave assisted magnetic recording heads to be mounted at a magnetic storage device are selected, having MWW 39 nm, MCW 42 nm and MRW 19 nm and having excellent error rates.

Then, similar selection is performed for magnetic heads that are prepared by setting $T_{ww}$ 80 nm, $W_{FGL}$ 45 nm and $T_{wr}$ 15 nm as targets, and magnetic heads are selected, having MWW 47 nm, MCW 50 nm and MRW 19 nm and having excellent error rates.

(Perpendicular Magnetic Recording Medium and Servo Information Recording Step)

Static magnetic properties as well as recording/reproducing characteristics by the magnetic recording/reproducing characteristics evaluation equipment of Embodiment 1 of the perpendicular magnetic recording media described referring to FIG. 19 are evaluated, and the perpendicular magnetic recording media having the characteristics distribution of ±0.1 to ±5% (0.1% or more and 5% or less), free from failures and having predetermined performance, are selected.

40 pieces of such perpendicular magnetic recording media are mounted at a media servo track writer while suppressing their eccentricity, and characteristics of sectors are evaluated similarly to Embodiments 1 to 9 using a wide microwave assisted magnetic recording head as mentioned above having MCW 50 nm and MWW 47 mm and using the aforementioned recording parameters. Then, a recording condition is selected for each sector from at least two types of recording conditions in accordance with their characteristics and a servo pattern is recorded on a perpendicular magnetic recording medium similarly to Embodiment 9 by shingled recording with the track pitch $TP_{op}$ of 38 nm that is the same as the data track pitch of the magnetic storage device as a target. Finally, sector dependence of recording characteristics of the perpendicular magnetic recording medium is recorded at a predetermined area as needed, thus configuring a perpendicular magnetic recording medium of the present embodiment.

(Magnetic Storage Device and Adjusting Method Therefor)

Figure 41:
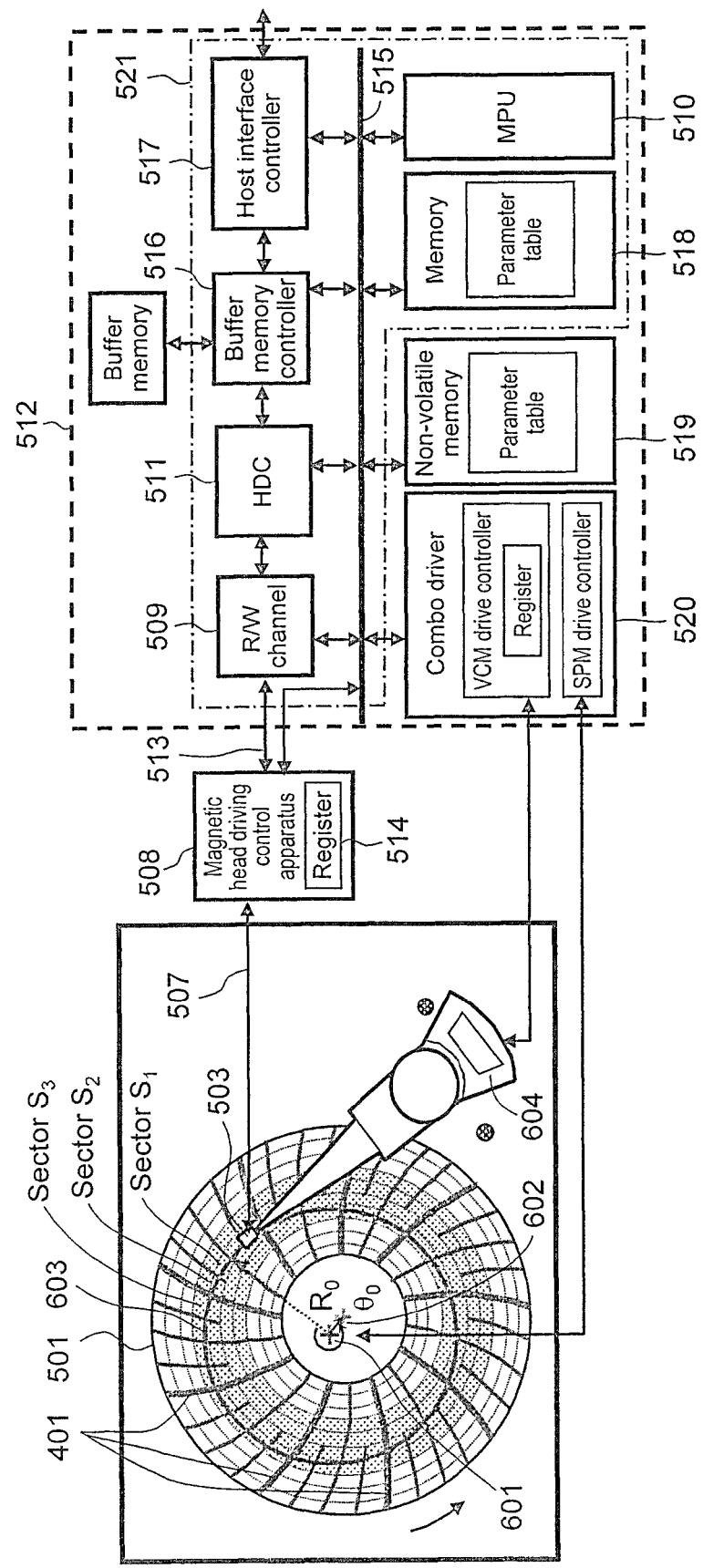
FIG. 41 is a conceptual diagram of a magnetic storage device, to which a perpendicular magnetic recording medium with servo information written thereon by a media servo writer is mounted.

Six of the microwave assisted magnetic recording heads selected for magnetic storage device and three of 2.5" perpendicular magnetic recording media provided with the above-mentioned servo pattern are mounted at the magnetic storage device of FIG. 4, to which the following adjustment is made, thus configuring a magnetic storage device of the present embodiment shown in FIG. 41.

Firstly in the manufacturing step of the magnetic storage device, centering of the perpendicular magnetic recording media is performed. In this step, however, adjustment for perfect accuracy will increase the cost and so is not practical, and eccentricity (corresponding to several tracks) that cannot be corrected by the centering will be inevitably generated. Then, in FIG. 41, a perpendicular magnetic recording medium is rotated while pressing the magnetic head (HSA) against a crash stop, and then a signal at a leading position of each servo sector when the magnetic head passes through the servo sector, i.e., the leading coordinates of the servo sector recorded by a media servo writer and aligned on the servo track $_{STW}$ having the center at 601 is measured. Recording/reproducing so as to let the magnetic head pass through the coordinates position enables recording/reproducing of information that follows precisely the servo track $_{HDD}$ (in FIG. 41, concentric trace 603) having the center at the rotation center 601 of the perpendicular magnetic recording medium mounted at the magnetic storage device even when fixing the magnetic head at a substantially constant state. In this way, eccentricity non-following control recording/reproducing based on the eccentricity correction information uses a servo track $_{HDD}$ and not a servo track $_{STW}$ that determines the data track by the conventional technique.

As can be understood from this, a servo related signal at the leading position of each servo sector making up the above-mentioned servo track $_{STW}$, which is detected when the magnetic head passes through the servo sector, can be used as a servo signal to let the magnetic head follow the servo track $_{HDD}$. This signal contains, in addition to an eccentricity variation component, a variation component of a higher-order than the rotating frequency of the magnetic storage device because of vibrations of the media servo writer during servo information recording, for example. Such an eccentricity variation component $RRO_L(\theta_k)$ at the position of servo sector $S_k$ can be found by making a servo band lower than the rotating frequency to find a positional error signal PES at the servo sector $S_k$ of the angular position $\theta_k$ and performing summation of a large number of times of this signal for averaging, and such a high-order variation component $RRO_H(\theta_k)$ can be found by summation of a large number of times of the signals through a predetermined high-pass filter for averaging. The high-pass filter has a cutoff frequency that is 1 to 2 times the rotating frequency $f_0$. Herein in order to prevent excessive control resulting from interference due to delay of a control signal, it is especially preferable to control $RRO_L$ and $RRO_H$ separately.

Such evaluation is performed for each magnetic head and for each servo track, and as shown in FIG. 42, $RRO_L(\theta_k)$ and $RRO_H(\theta_k)$ signals are found so as to correspond to the servo sector areas (numbers), which is used as a parameter table (Table 7) for adding/subtracting operations and controlling servo signals. These parameters may be recorded, as RRO related information, at a post servo part of a servo area of each servo sector as needed, or the parameter table may be stored at a data area for system or in a non-volatile memory, which then may be read properly and stored in memory as needed for positioning control by VCM.

The perpendicular magnetic disk is further rotary-driven while pressing the magnetic head (HSA) against the crash stop, and clearance and optimum recording/reproducing parameter conditions are clarified for each magnetic head and each servo sector. Then, the relational expression between clearance and TFC input power is corrected for each magnetic head, and servo sector characteristics information, recording/reproducing parameters and the like are stored in a non-volatile memory as a predetermined parameter table as shown in Table 2 and Table 6.

Next, in the manufacturing/testing step, squeeze characteristics, adjacent interference (ATI) characteristics, 747 characteristics and the like of the magnetic heads are evaluated for each data sector similarly to Embodiment 1 and the like, while using servo track $_{HDD}$ as reference information, thus determining an optimum data track profile and such a linear recording density profile in accordance with MCW and squeeze characteristics of each magnetic head. In the present embodiment, for a magnetic head having the worst performance (error rate), BPI profile thereof is lowered by one rank, and instead BPI profile of the magnetic head having the best performance is increased by one rank. In this way, BPI profile of the magnetic heads is adjusted so that the error rate becomes substantially the same among all of the magnetic heads and so as to satisfy a predetermined areal recording density, thus configuring a magnetic storage device (adapting format).

Most preferably, for TFC profile or the like, TFC may be adjusted to be smooth for each servo track $_{HDD}$ by interpolation among zones with an approximate expression, and then conditions are optimized for each servo sector as stated above for recording. Adjustment is made for temperature correction as well similarly to Embodiments 3 to 7.

Such eccentricity non-following control recording/reproducing is preferable because, due to precise following of a data track using servo information across a plurality of tracks, a recording condition can be optimized for each servo sector, influences from characteristics variations in the circumferential direction and the radial direction of the perpendicular magnetic recording medium can be suppressed, and the uniformity of servo information can be improved. The eccentricity non-following control recording/reproducing of the present embodiment has a similar effect when servo information is recorded by the method described in Embodiment 9 as well.

(Advantageous Effects)

The servo information recording step in shingled recording manner by a media servo write of the present embodiment can narrow, similarly to Embodiment 9, gap areas at the servo track boundary and the servo track center to absorb the distribution of the FGL width and the positioning error of a plurality of microwave assisted magnetic recording heads, and enables high-quality seamless servo information to be recorded without waste using substantially the entire servo track width. Especially in the combination with a method of recording servo information under the optimum condition for each sector, the quality of servo information reproduction signal at the preamble part or the servo burst part can be improved by about 0.5 dB compared with a method without adjustment for each sector. This method is especially preferable because it enables higher degree of linearity of the positioning signals. Thus the magnetic storage device with the perpendicular magnetic recording medium mounted thereon can eliminate rotational delay due to reading errors or writing errors when rotation vibrations being applied externally as well. Herein, when servo information is recorded by the method of Embodiment 9 and not the shingled recording, the signal quality can be improved by about 0.2 dB.

The method of the present embodiment is configured to let a microwave assisted magnetic recording head follow the data track $_{HDD}$ centering around the rotating center, the method being capable of correcting a high-order variation that slightly remains in the servo signal formed by a media servo writer enabling recording of high-quality servo information, while suppressing synchronous and asynchronous vibrations relating to the rotation of a perpendicular magnetic recording medium. As such, this method enables an optimum recording condition for each data track $_{HDD}$ and each data sector, whereby information can be recorded in a substantially ideal state for the positioning condition and the recording condition. When a magnetic head has to be changed to record/reproduce information on a recording surface of another perpendicular magnetic recording medium, the method can eliminate the stand-by until a magnetic head follows a servo track $_{STW}$ (of the perpendicular magnetic recording medium in another eccentricity state during the assembly), thus enabling quick access in the magnetic recording device having a plurality of perpendicular magnetic recording media especially, and so compared with the magnetic storage devices of Embodiments 1 to 9 and the conventional perpendicular magnetic recording, the performance can be preferably improved by 2 to 8%.

The perpendicular magnetic recording medium of the present embodiment is mounted at a magnetic storage device, and correction information $RRO_L$ and $RRO_H$ are compressed and are stored in the non-volatile memory 519 of the magnetic storage device, which is then demodulated before the activation of the device and is stored in the memory 518 for use. Thereby, format efficiency can be improved by about 1 point and load on the magnetic storage device can be reduced. Environment stress test at the environment temperature from −5° C. to +65° C. also shows high reliability similarly to Embodiment 9 and the like.

[Embodiment 11]

The present embodiment describes a servo pattern for shingled recording, a perpendicular magnetic recording medium with such a servo pattern recorded thereon and a magnetic storage device.

(Magnetic Storage Device and Adjusting Method Therefor)

A microwave assisted magnetic recording head described in Embodiment 10 and a perpendicular magnetic recording medium in a demagnetization state in which no servo information is recorded are assembled to 2.5" and 3.5" type magnetic storage devices, and similarly to Embodiments 1 to 9, although servo information is recorded by shingled recording similar to Embodiment 10, similar adjustment is performed, thus making a shingle-recording type magnetic storage device.

(Advantageous Effects)

Although the microwave assisted magnetic recording heads mounted at the magnetic storage device have variations in FGL width, shingled recording can optimize a recording condition for each sector with a wide FGL for recording/reproducing. Then compared with the case without such optimization, the error rate of recording data can be increased by 0.3 digit irrespective of variations in FGL width, and as a result, the yield of the magnetic head and the device can be increased by 4 points and 2 points, respectively, for the same capacity compared with the case without optimization of data recording for each sector.

[Embodiment 12]

The present embodiment describes the case where a perpendicular magnetic recording medium with no servo information recorded thereon is mounted at a magnetic storage device and servo information is recorded in the magnetic storage device by the method of Embodiment 8, and then recording/reproducing is performed by the eccentricity non-following controlling method of Embodiment 10, by way of the example of a magnetic disk device.

(Magnetic Storage Device and Adjusting Method Therefor)

The magnetic storage device of Embodiment 8 is configured so that a perpendicular magnetic recording medium is mounted at a HDA or a HDD, and servo information is recorded by a servo track writer (STW) or a self servo write method (SSW), and so can improve the distribution of intensity and width of a servo signal. On the other hand, unlike the media servo writer of Embodiment 9, such a device cannot suppress vibrations of a spindle motor mechanism system, the HGA and the like, so that the servo information includes positional distribution having a frequency component higher than the rotating frequency $f_0$. To solve this, the present embodiment is configured, so as to alleviate the influences of such positional distribution, so that recording/reproducing is performed as follows in the magnetic storage device of Embodiment 8 by the eccentricity non-following controlling method of Embodiment 10.

Firstly, a servo related signal at the leading position of each servo sector making up the above-stated servo track $_{STW}$ is detected by a magnetic head, and the positional signal distribution of low-order, middle-order and high-order is extracted as follows. That is, signals are firstly averaged and an intra-track pitch is evaluated, whereby a low-order variation component $RRO_L(\theta_k)$ at the position of the sector $S_k$ of the angular position $\theta_k$ is found. Then, signals passing through a predetermined bandpass filter are averaged, thus finding a middle-order variation component $RRO_M(\theta_k)$ and signals passing through a highpass filter are averaged, thus finding a high-order variation component $RRO_H(\theta_k)$. In the present embodiment, $RRO_L(\theta_k)$ is extracted from a signal component from 0 to 1.5 $f_0$, $RRO_M(\theta_k)$ is extracted from a signal component from 1.5 $f_0$ to 10 $f_0$, and $RRO_H(\theta_k)$ is extracted from a signal component from 10 $f_0$ to 100 $f_0$.

Herein, the $RRO_L(\theta_k)$ component originally does not exist when a perpendicular magnetic recording medium with no servo information recorded thereon is mounted at a magnetic storage device and servo information is recorded. However, when a servo signal self-propagates as in SSW, a variation component at low-frequency from 0 to $f_0$ may be included due to thermal expansion during recording, positional sensitivity variation of the reproducing head and the like. To remove this, these parameters are used. The middle-order variation component $RRO_M(\theta_k)$ corresponds to a variation component due to torque disturbance (torque noise) generated from a voice coil motor (VCM), and the high-order variation component $RRO_H(\theta_k)$ corresponds to a vibration component due to resonance of a mechanical unit. Similarly to Embodiment 10, the present embodiment controls $RRO_L$, $RRO_M$ and $RRO_H$ separately to prevent excessive control resulting from interference due to delay of these control signals. Similarly to Table 7 of Embodiment 10, these parameters corresponding to the servo sector areas (numbers) are compressed and are stored as a parameter table for servo control in non-volatile memory, which is then demodulated before the activation of the device and is stored in the memory 518 for positioning control by the VCM. Then, a recording condition is selected from at least two types of recording conditions in accordance with the characteristics of each sector for recording/reproducing.

Herein, more preferably, since the vibration components of the mechanical system include components at about 15 $f_0$ and about 40 $f_0$, the signal components $RRO_H(\theta_k)$ at 10 $f_0$ to 100 $f_0$ are further divided into two including $RRO_{H1}(\theta_k)$ at 10 $f_0$ to 30 $f_0$ and $RRO_{H2}(\theta_k)$ at 30 $f_0$ to 100 $f_0$, to which similar evaluation is performed, and parameters are stored to be used for control properly.

(Advantageous Effects)

Unlike signals formed by the conventional technique, servo signals recorded by the method of Embodiment 8 in the magnetic storage device have reduced distribution of intensity of servo signals and the track width. However, such a method cannot solve unfavorable recording of variation components due to sensitivity variations of the magnetic head reproduction element, VCM torque noise, mechanical system vibrations and the like during servo information recording.

On the other hand, the present embodiment is configured so as to correct a high-order variation component of the servo information at a servo track in the magnetic storage device of Embodiment 8, thus controlling positional information, and further optimizes recording parameters for each sector for recording/reproducing. Thereby, compared with Embodiment 8, the present embodiment can reduce failure rates of the magnetic heads by 10% and 15% and can reduce failure rates of the magnetic storage devices by 30% and 40% when the band of positional signal is divided into three areas and four areas, respectively, for control, and thus high improvement effects can be obtained. Further similarly to Embodiment 11, performance thereof can be especially preferably improved by 5% and 7%, respectively, compared with Embodiment 8.

Conventionally an enormous amount of control parameters are necessary to divide the band into three to four areas and compensate and control their variations separately, and storage of these parameters at a RRO field of the perpendicular magnetic recording medium causes deterioration of format efficiency, which is not practical. In the method of the present embodiment, however, the quality of servo signal is improved, and the absolute value of variations also becomes small, so that the memory capacity required for such information can be small. Then, the parameter table of the present embodiment can be compressed and be stored in non-volatile memory having the same capacity as that of Embodiment 11, and so the format efficiency can be improved by about 1 point similarly to Embodiment 11. The amount corresponding to expanded format efficiency can be used to reduce recording density, and so the operation margin and the yield can be expanded by about 2 points.

Compared with Embodiment 8, although cost for the non-volatile memory and additional memory to store the variation information is increased, the yield of the magnetic heads and the magnetic storage device can be improved, so that the total cost can be reduced, which is favorable practically.

The present invention is not limited to the above-described embodiments, and may include various modification examples. For instance, the entire detailed configuration of the embodiments described above for explanatory convenience is not always necessary for the present invention. A part of one embodiment may be replaced with the configuration of another embodiment, or the configuration of one embodiment may be combined with the configuration of another embodiment. The configuration of each embodiment may additionally include another configuration, or a part of the configuration may be deleted or replaced.

Reference Signs List

02: Thermal expansion element (TFC)
12: Sensor element
22: First magnetic recording pole
24: Second magnetic recording pole
26: STO oscillation control magnetic field
30: Perpendicular magnetic recording medium
40: High-frequency oscillator unit (STO)
41: High frequency magnetic field generation layer (FGL)
43: Spin injection layer
45: High frequency magnetic field
50: Slider
100: Magnetic head traveling direction
130: Perpendicular magnetic recording medium
500: Spindle motor
505: Head Gimbal Assembly (HGA)
506: Head Stack Assembly (HSA)
522: Voice Coil Motor (VCM)
601: Center of servo track recorded by media servo writer
602: Rotating center of perpendicular magnetic recording medium mounted at HDD
1101: Crash stop
1102: Head Disk Assembly (HDA)
1103: Servo Track Writer (STW) driving controller
1201: He sealing cover

What is claimed is:

1. A magnetic recording method, comprising the steps of:
acquiring a recording condition on a perpendicular magnetic recording medium including sectors and having distribution of characteristics, the recording condition being for each sector and depending on the distribution of characteristics, the recording condition including a set of a recording current and a driving current for a microwave assisted magnetic recording head including a magnetic recording pole and a high-frequency magnetic field oscillator, the recording current exciting the magnetic recording pole, and the driving current being applied to the high-frequency magnetic field oscillator, the set of the recording current and the driving current for each sector being determined to suppress variations in the characteristics and being stored in a table beforehand;
setting a set of at least two types of conditions including a recording current and a driving current for each sector in accordance with the recording condition, the recording current and the driving current being read from the set stored in the table; and
performing a recording operation with the set recording current and driving current.

2. The magnetic recording method according to claim 1, wherein the sectors include: a sector to be recorded with a first recording current and a first driving current and a sector to be recorded with a second recording current larger than the first recording current and a second driving current larger than the first driving current in accordance with the recording condition.

3. The magnetic recording method according to claim 1, wherein the sectors include: a sector to be recorded with a first recording current and a first driving current and a sector to be recorded with a recording current having a same magnitude as the first recording current and a second driving current larger than the first driving current in accordance with the recording condition.

4. The magnetic recording method according to claim 1, wherein the sectors include: a sector to be recorded with a first recording current and a first driving current and a sector to be recorded with a second recording current larger than the first recording current and a driving current having a same magnitude as the first driving current in accordance with the recording condition.

5. The magnetic recording method according to claim 1, wherein the sectors include a sector to be recorded with a first recording current and a sector to be recorded with combination of the first recording current and a first driving current in accordance with the recording condition.

6. The magnetic recording method according to claim 1, wherein the perpendicular magnetic recording medium includes zones, and input power to a thermal expansion element for clearance control is set for each zone.

7. The magnetic recording method according to claim 1, further comprising the steps of:
- detecting an environment temperature; and
- correcting the recording current and the driving current in accordance with the environment temperature.

\* \* \* \* \*